United States Patent
Gordon

(10) Patent No.: US 11,889,155 B2
(45) Date of Patent: Jan. 30, 2024

(54) METHOD AND SYSTEM FOR PRESENTING ADDITIONAL CONTENT AT A MEDIA SYSTEM

(71) Applicant: Roku, Inc., San Jose, CA (US)

(72) Inventor: Donald F. Gordon, Morgan Hills, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 16/017,900

(22) Filed: Jun. 25, 2018

(65) Prior Publication Data

US 2018/0310058 A1 Oct. 25, 2018

Related U.S. Application Data

(63) Continuation of application No. 15/375,698, filed on Dec. 12, 2016, now Pat. No. 10,506,291, which is a
(Continued)

(51) Int. Cl.
*H04N 21/4722* (2011.01)
*H04N 21/81* (2011.01)
(Continued)

(52) U.S. Cl.
CPC ............ *H04N 21/4722* (2013.01); *H04N 21/23418* (2013.01); *H04N 21/23892* (2013.01);
(Continued)

(58) Field of Classification Search
CPC ....... H04N 21/44213; H04N 21/23892; H04N 21/8358; H04N 21/812; H04N 21/278;
(Continued)

(56) References Cited

U.S. PATENT DOCUMENTS

| 6,240,555 B1 | 5/2001 | Shoff et al. |
| 8,863,165 B2 | 10/2014 | Gordon |

(Continued)

FOREIGN PATENT DOCUMENTS

| WO | 2010/084713 A1 | 7/2010 |
| WO | 2010/103848 A1 | 9/2010 |

OTHER PUBLICATIONS

"U.S. Appl. No. 13/286,138, Examiner Interview Summary dated Jun. 6, 2014", 3 pgs.
(Continued)

*Primary Examiner* — John W Miller
*Assistant Examiner* — Akshay Doshi
(74) *Attorney, Agent, or Firm* — Sterne, Kessler, Goldstein & Fox P.L.L.C.

(57) ABSTRACT

A media system, receives a received sequence of media content, for presentation at the media system and generates a comparison fingerprint of the received sequence of media content. The comparison fingerprint is for comparison with a plurality of reference fingerprints so as to identify the received sequence of media content. The media system sends a request for identification of additional content to a server system. The request is based at least in part on the comparison fingerprint. The media system receives a response to the request, including information enabling additional content to be selected for display at the media system based at least in part on the identification of the received sequence of media content, and presents a displayed sequence of media content that includes at least a portion of the received sequence of media content and at least a portion of the additional content.

21 Claims, 40 Drawing Sheets

Related U.S. Application Data continuation of application No. 14/475,971, filed on Sep. 3, 2014, now abandoned, which is a continuation of application No. 13/286,138, filed on Oct. 31, 2011, now Pat. No. 8,863,165.

(60) Provisional application No. 61/409,018, filed on Nov. 1, 2010.

(51) Int. Cl.

| | | |
|---|---|---|
| *H04N 21/234* | (2011.01) | |
| *H04N 21/44* | (2011.01) | |
| *H04N 21/4402* | (2011.01) | |
| *H04N 21/278* | (2011.01) | |
| *H04N 21/442* | (2011.01) | |
| *H04N 21/658* | (2011.01) | |
| *H04N 21/2389* | (2011.01) | |
| *H04N 21/8358* | (2011.01) | |
| *H04N 21/254* | (2011.01) | |

(52) U.S. Cl.
CPC ......... *H04N 21/254* (2013.01); *H04N 21/278* (2013.01); *H04N 21/4402* (2013.01); *H04N 21/44008* (2013.01); *H04N 21/44213* (2013.01); *H04N 21/6581* (2013.01); *H04N 21/812* (2013.01); *H04N 21/8133* (2013.01); *H04N 21/8358* (2013.01)

(58) Field of Classification Search
CPC ............. H04N 21/254; H04N 21/6581; H04N 21/8133; H04N 21/4402; H04N 21/4722
See application file for complete search history.

(56) References Cited

U.S. PATENT DOCUMENTS

| | | | |
|---|---|---|---|
| 10,097,880 B2 * | 10/2018 | Gharaat | G06Q 30/0244 |
| 2003/0174837 A1 | 9/2003 | Candelore et al. | |
| 2004/0057536 A1 | 3/2004 | Kasper et al. | |
| 2004/0158858 A1 | 8/2004 | Paxton et al. | |
| 2004/0163106 A1 | 8/2004 | Schrempp et al. | |
| 2004/0189873 A1 | 9/2004 | Konig et al. | |
| 2004/0194130 A1 | 9/2004 | Konig et al. | |
| 2004/0237102 A1 * | 11/2004 | Konig | G06Q 30/02 |
| | | | 725/36 |
| 2005/0144455 A1 * | 6/2005 | Haitsma | G06F 16/634 |
| | | | 713/176 |
| 2005/0149968 A1 | 7/2005 | Konig et al. | |
| 2005/0172312 A1 | 8/2005 | Leinhart et al. | |
| 2005/0177847 A1 | 8/2005 | Konig et al. | |
| 2006/0062474 A1 | 3/2006 | Paschalakis et al. | |
| 2006/0093215 A1 | 5/2006 | Paschalakis et al. | |
| 2006/0187358 A1 * | 8/2006 | Lienhart | G06K 9/00711 |
| | | | 348/661 |
| 2007/0055500 A1 | 3/2007 | Bilobrov | |
| 2007/0124796 A1 * | 5/2007 | Wittkotter | H04N 7/17309 |
| | | | 725/136 |
| 2007/0157224 A1 | 7/2007 | Pouliot et al. | |
| 2007/0250901 A1 * | 10/2007 | McIntire | H04N 21/8586 |
| | | | 725/146 |
| 2008/0201731 A1 | 8/2008 | Howcroft | |
| 2008/0209465 A1 | 8/2008 | Thomas et al. | |
| 2008/0256115 A1 | 10/2008 | Beletski et al. | |
| 2008/0306814 A1 | 12/2008 | Hudson | |
| 2009/0077580 A1 | 3/2009 | Konig et al. | |
| 2009/0328125 A1 | 12/2009 | Gits et al. | |
| 2010/0083306 A1 | 4/2010 | Dempski et al. | |
| 2010/0100449 A1 * | 4/2010 | Broberg | G06Q 30/02 |
| | | | 705/14.68 |
| 2010/0153993 A1 | 6/2010 | Konig et al. | |
| 2010/0166389 A1 | 7/2010 | Knee et al. | |
| 2010/0306791 A1 * | 12/2010 | Deng | G06F 16/7847 |
| | | | 725/19 |
| 2011/0015989 A1 | 1/2011 | Tidwell et al. | |
| 2011/0063317 A1 | 3/2011 | Gharaat et al. | |
| 2011/0078729 A1 | 3/2011 | LaJoie et al. | |
| 2011/0135283 A1 | 6/2011 | Poniatowki et al. | |
| 2011/0289098 A1 * | 11/2011 | Oztaskent | G06F 17/30026 |
| | | | 707/769 |
| 2012/0020647 A1 | 1/2012 | Vogel | |
| 2012/0079518 A1 | 3/2012 | Wan et al. | |
| 2012/0110608 A1 * | 5/2012 | Berkowitz | H04N 21/25435 |
| | | | 725/14 |
| 2012/0117584 A1 | 5/2012 | Gordon | |
| 2012/0167133 A1 | 6/2012 | Carroll et al. | |
| 2015/0089526 A1 | 3/2015 | Gordon | |

OTHER PUBLICATIONS

"U.S. Appl. No. 13/286,138, Final Office Action dated Sep. 11, 2013", 25 pgs.
"U.S. Appl. No. 13/286, 138, Non Final Office Action dated Feb. 4, 2014", 25 pgs.
"U.S. Appl. No. 13/286,138, Non Final Office Action dated Mar. 4, 2013", 24 pgs.
"U.S. Appl. No. 13/286,138, Notice of Allowance dated Jun. 6, 2014", 20 pgs.
"U.S. Appl. No. 14/475,971, Examiner Interview Summary dated May 20, 2015", 3 pgs.
"U.S. Appl. No. 14/475,971, Final Office Action dated Sep. 21, 2016", 32 pgs.
"U.S. Appl. No. 14/475,971, Non Final Office Action dated Mar. 9, 2016", 31 pgs.
"U.S. Appl. No. 15/375,698, Non Final Office Action dated Apr. 6, 2018", 23 pgs.
"U.S. Appl. No. 15/375,698, Examiner Interview Summary dated Jun. 21, 2018", 3 pgs.
"U.S. Appl. No. 16/017,910, Non Final Office Action datled Oct. 16, 2018", 24 pgs.
"U.S. Appl. No. 15/375,698, Final Office Action dated Oct. 19, 2018", 18 pgs.

* cited by examiner

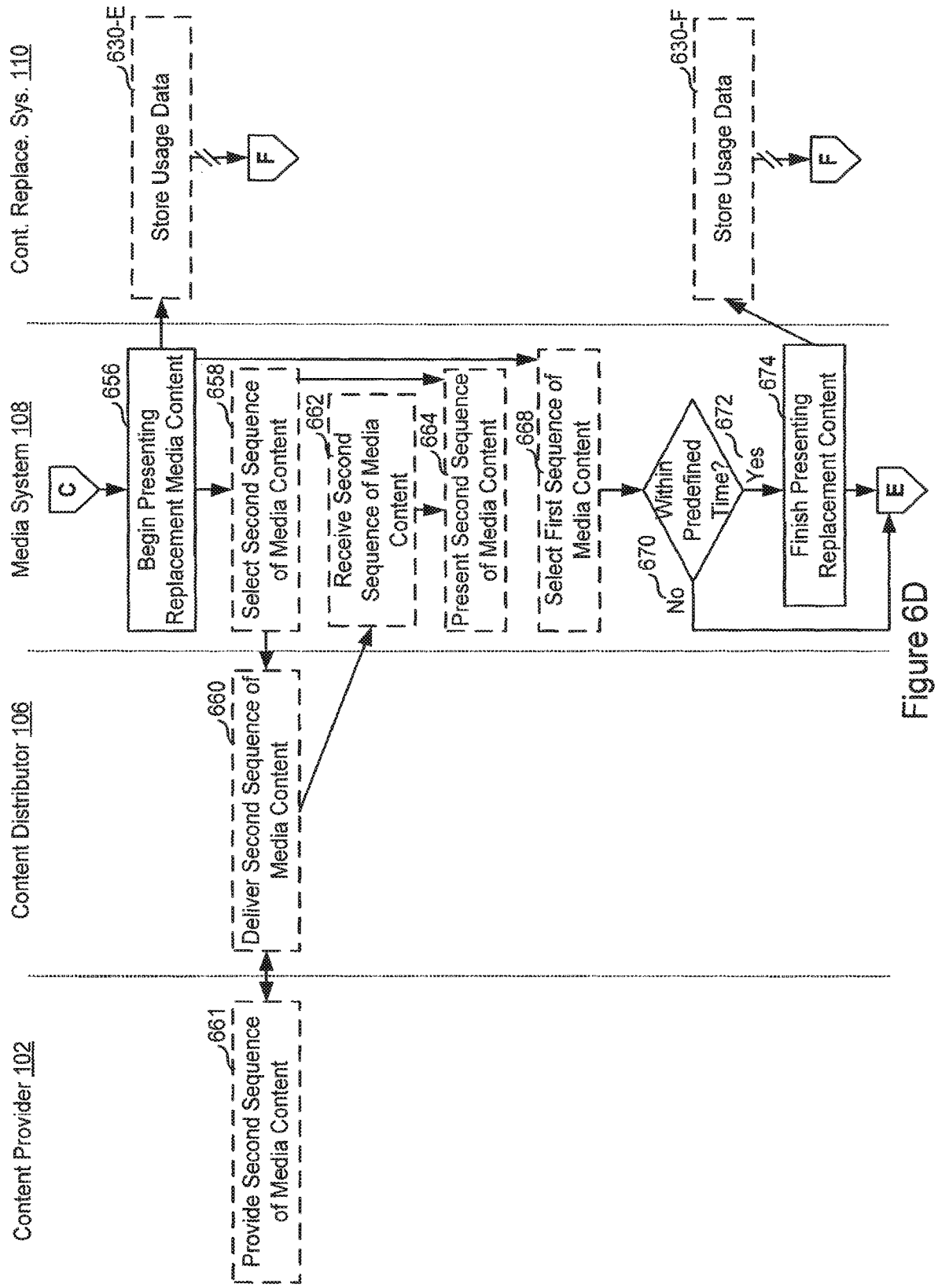

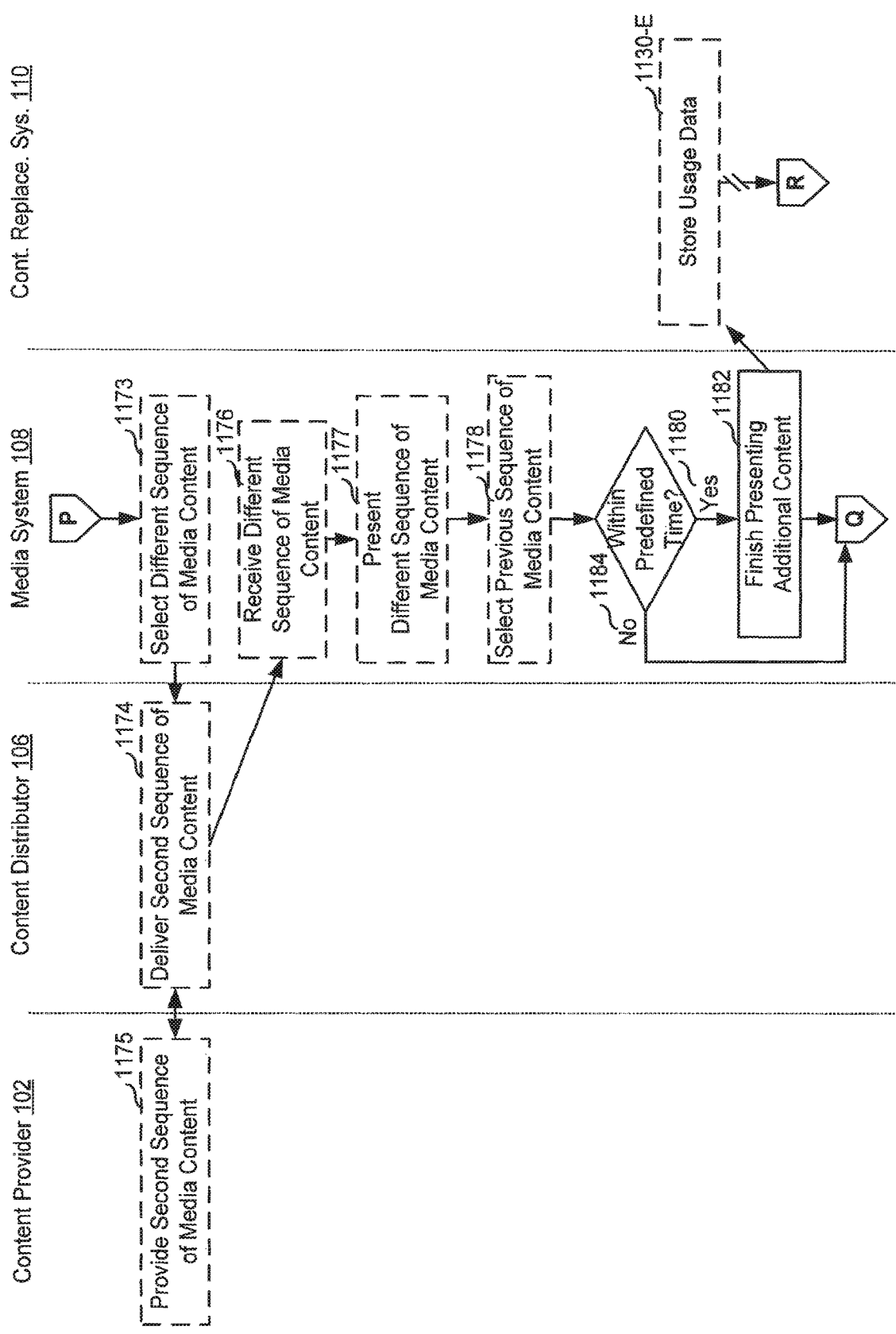

Compare the comparison fingerprint with a first plurality of reference fingerprints for a plurality of reference sequences of media content so as to identify the unknown sequence of media content as an identified reference sequence of media content — 1308

When the comparison fingerprint matches a single respective reference fingerprint in the first set of reference fingerprints, identify a corresponding sequence of media content that corresponds to the single respective reference fingerprint as the identified sequence of media content — 1316

When none of the reference fingerprints in the first set of reference fingerprints match the comparison fingerprint, identify a second set of reference fingerprints in accordance with the set of heuristics and comparing the comparison fingerprint to reference fingerprints in the second set of reference fingerprints so as to identify the unknown sequence of media content — 1318

The first set of reference fingerprints consists of fingerprints that correspond to portions of sequences of media content that are within a current broadcast window. The second set of reference fingerprints includes fingerprints that correspond to portions of sequences of media content that are outside of the current broadcast window. — 1320

The first set of reference fingerprints consists of fingerprints that correspond to sequences of media content that have been broadcast within a geographic area associated with the media system. The second set of reference fingerprints includes fingerprints that correspond to sequences of media content that are outside of the geographical area associated with the media system. — 1322

The first set of reference fingerprints consists of fingerprints that correspond to sequences of media content are associated with a usage history of the media system. The second set of reference fingerprints includes fingerprints that correspond to sequences of media content that are not associated with the usage history the media system. — 1324

Figure 13B

METHOD AND SYSTEM FOR PRESENTING ADDITIONAL CONTENT AT A MEDIA SYSTEM

RELATED APPLICATIONS

This disclosure is a continuation of U.S. patent application Ser. No. 15/375,698, filed Dec. 12, 2016, which is a continuation of U.S. patent application Ser. No. 14/475,971, filed Sep. 3, 2014, which is a continuation of U.S. patent application Ser. No. 13/286,138, filed Oct. 31, 2011, which claims priority to U.S. Provisional Patent App. No. 61/409,018, filed Nov. 1, 2010, the entirety of each of which is hereby incorporated by reference.

TECHNICAL FIELD

The disclosed embodiments relate generally to selecting additional content for display at a media system, and more particularly to selecting additional content for display at a media system based on a sequence of media content received at the media system.

BACKGROUND

In recent years, the replacement of television advertisements with targeted television advertisements has become an increasingly important advertising method. Content providers such as television networks routinely insert generic advertisements into streamed network television content. For example, a content provider (e.g., a national cable television network such as ESPN) provides a network feed that contains embedded interstitial advertisements to content distributors (e.g., a cable affiliates such as Comcast. Time Warner Cable). Such advertisements routinely include advertisements for credit cards, national retailers or other products with broad appeal. A content distributor or a content provider may, want to be able to substitute a replacement advertisement for the advertisement inserted in the broadcast feed. Merely substituting in a replacement advertisement for local businesses, such as a car dealership or a real estate agent does not provide sufficient targeting for the advertisements. While the advertisement is local it still may have no relevancy to an individual viewer. Thus, conventional methods of providing replacement content (e.g., inserting targeted advertisements) fail to provide sufficiently sophisticated and accurate targeting of replacement media content while maintaining the simplicity of media systems. Rather, it would be valuable to advertisers and thus to content providers to be able to insert highly targeted advertisements based on other specific information about the likely viewer of the advertisement.

Additionally, producers and distributors of content are looking for new ways to add value to provided content and to monetize the content. End-users will typically find more added value and be more receptive to supplemental information that is related to the content being displayed on a media system. However, conventional methods of identifying content being displayed at a media system are slow, inaccurate or require excessive processing power. Thus, it would also be valuable to producers and distributors of content to have a way to quickly, accurately and efficiently determine the content that is to be displayed at a media system and customize the content so as to provide additional value to end-users and/or provide new ad impressions for advertisers that are likely to be viewed by the end-users.

SUMMARY

The above deficiencies and other problems associated with conventional methods of replacing and/or supplementing content displayed at a media system are addressed by the disclosed system and method for presenting additional content at a media system. In accordance with one embodiment, the distribution system disclosed herein supports identifying content that is currently being displayed or prepared for display at a media system and identifies additional content to be displayed instead of or in addition to the content that is currently being displayed or prepared for display.

Some embodiments provide, a method for, at a media system having one or more processors and memory storing one or more programs for execution by the one or more processors so as to perform the method: receiving a received sequence of media content, for presentation at the media system and generating a comparison fingerprint of the received sequence of media content. The comparison fingerprint is for comparison with a plurality of reference fingerprints so as to identify the received sequence of media content. The method further includes sending a request for identification of additional content to a server system, wherein the request is based at least in part on the comparison fingerprint and receiving a response to the request, where the response includes information enabling additional content to be selected for display at the media system and the additional content is selected based at least in part on the identification of the received sequence of media content. The method also includes presenting a displayed sequence of media content at the media system, where the displayed sequence of media content includes at least a portion of the received sequence of media content and at least a portion of the additional content.

Some embodiments provide, a method for, at a server system having one or more processors and memory storing one or more programs for execution by the one or more processors so as to perform the method: receiving, a comparison fingerprint that was generated at a media system based on at least a portion of an unknown sequence of media content at the media system. The method further includes comparing the comparison fingerprint with a first plurality of reference fingerprints for a plurality of reference sequences of media content so as to identify the unknown sequence of media content as an identified reference sequence of media content and sending, to the media system, a second plurality of reference fingerprints for the identified reference sequence of media content.

Some embodiments provide, a method for, at a at a computer system (e.g., a media system or a server system) having one or more processors and memory storing one or more programs for execution by the one or more processors so as to perform the method: providing a plurality of sample locations for sampling an optical property, and for each of a plurality of respective units of reference sequences of media content, generating a reference fingerprint. The generating includes: determining a set of sample values including a sample value of the optical property at each sample location of the respective reference unit of media content and determining one or more statistical measures of the set of sample values. The method further includes storing a plurality of the reference fingerprints and receiving a comparison fingerprint of an unknown unit from an unknown sequence of media content for comparison with the plurality of reference fingerprints. The comparison fingerprint includes: a sample value for each of the sample locations in the unknown unit of media content, and one or more statistical measures of the set of sample values. The method also includes comparing the comparison fingerprint with the reference fingerprints so as to identify the unknown sequence of media content as one of the reference sequences of media content.

In accordance with some embodiments, a computer system (e.g., a media system or a server system) includes one or more processors, memory, and one or more programs; the one or more programs are stored in the memory and configured to be executed by the one or more processors and the one or more programs include instructions for performing the operations of the method described above. In accordance with some embodiments, a computer readable storage medium has stored therein instructions which when executed by one or more processors, cause a computer system (e.g., a media system or a server system) to perform the operations of the methods described above.

Thus, the systems and methods described herein provide an improvement over conventional methods of providing additional content by quickly, accurately and efficiently determining content being presented or prepared for presentation at a media system and providing additional content for display on the media system (e.g., to replace and/or supplement at least a portion of a received sequence of media content).

BRIEF DESCRIPTION OF THE DRAWINGS

FIG. 6A-6E include a flow diagram of a process for remotely controlling media systems using embedded control data in accordance with some embodiments.

FIGS. 11A-11F include a flow diagram of a process for monitoring media content being presented at a media system and presenting a displayed sequence of media content at a media system in accordance with some embodiments.

FIGS. 13A-13D include a flow diagram of a process for monitoring media content being presented at a media system in accordance with some embodiments.

Like reference numerals refer to corresponding parts throughout the drawings.

DESCRIPTION OF EMBODIMENTS

Figure 1:
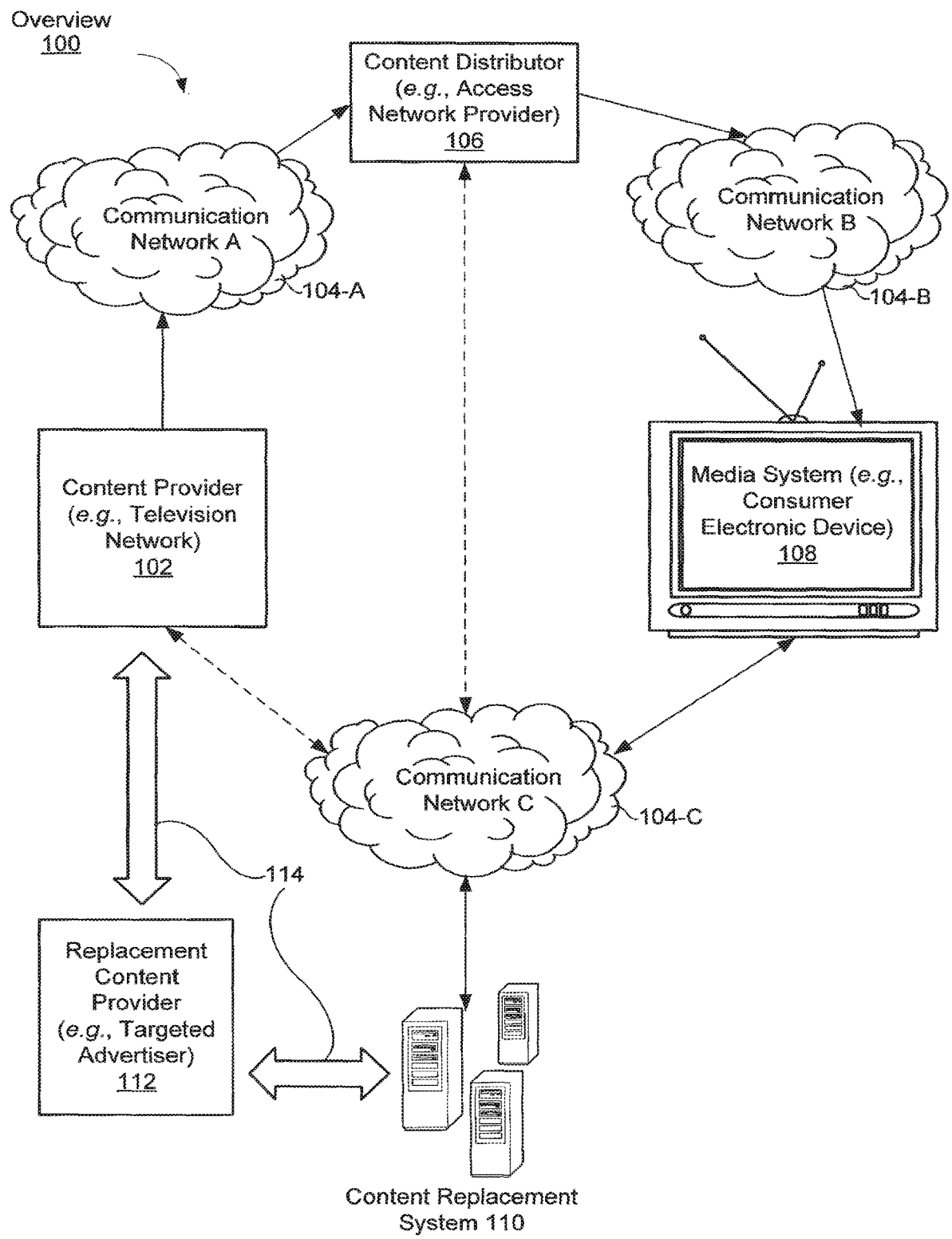
FIG. 1 is a block diagram of a distributed system for providing media content to a media system in accordance with some embodiments.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The apparatus and methods disclosed herein supplement the ordinary provision of a sequence of media content (e.g., one or more television feeds, streams or channels) to a media system (e.g., a television). As used herein, a sequence of media content is any media content (e.g., audio, video, image or text) that is dynamically presented (e.g., changes with time) by a media system. For example, a single television (or radio) advertisement is a sequence of media content. Likewise, a television show with embedded interstitial advertisements is a sequence of media content. In accordance with some embodiments, at least a portion of the sequence of media content is replaced with additional content (e.g., supplemental content is displayed overlaid over a portion of the sequence of media content, or the sequence of media content is partially or entirely replaced for a predetermined period of time). In accordance with some embodiments, the replacement of a sequence of media content includes replacing an entire sequence of media content (e.g., replacing an entire television advertisement). In accordance with some embodiments, the replacement of a sequence of media content includes replacing a portion of a sequence of media content (e.g., replacing a single embedded interstitial advertisement in a television show). In accordance with some embodiments, the display of additional content includes displaying a small image or advertisement at a predefined location (e.g., a corner) of a sequence of media content (e.g., a television broadcast or a displayed movie, etc.). Similarly, "media content" or "replacement media content" may be used to refer to a single sequence of media content (e.g., a single advertisement or segment of a television show that is not interrupted by other interstitial advertisements).

The relevant functional components may be implemented using standard and/or custom computer hardware and/or software (e.g., a cable set-top box) in combination with software, and may be provided by the content provider (e.g., television network) the content distributor (e.g., local network affiliate) or by a contractor or vendor hired to perform the relevant function. In accordance with some embodiments a content provider is a computer system which assembles media content into a sequence of media content (e.g., a broadcast network feed). In accordance with some embodiments a content distributor is a computer system which receives the sequence of media content (optionally modifying the sequence of media content) and distributes the sequence of media content to a plurality of media systems (e.g., a cable box in a cable customer's home).

Functional components used to facilitate operation of a content provider, content distributor, media system or content replacement system that are not otherwise relevant to embodiments of this invention are omitted for clarity. As used herein, video signals include either: 1) both audio and video signals, 2) video signals alone. In accordance with some embodiments, media content includes a transmission that includes only an audio signal (e.g., a radio signal). The distribution system disclosed herein supports the insertion of one or more replacement sequences of media content (e.g., an advertisement or a series of advertisements) into one or more original sequences of media content (e.g., a broadcast television feed), across unmanaged networks (e.g., the Internet) without the need for complex delivery, arbitraging, or switching systems at the media system.

Attention is now directed to FIG. 1, which illustrates an overview 100 of a distributed system for providing media content to a media device in accordance with some embodiments. The Distributed System 100 includes at least: a Content Provider 102, a Content Distributor 106, a Media System 108, a Content Replacement System 110 and a Replacement Content Provider 112. These components are linked together through one or more communication networks 104-A, 104,-B, 104-C (e.g., the Internet, other wide area networks, local area network, managed content distribution network, etc.) so that the various components can communicate with each other.

The Content Provider 102 (e.g., a television network or radio network) is any party that has access to and provides source media content (e.g., movies, television shows, video advertisements, radio shows, music). The Content Provider 102 creates one or more sequences of media content (e.g., television streams, feeds or channels) and provides these sequences of media content through communication network A 104-A to the Content Distributor 106 (e.g., a network access provider). In some embodiments, communication network A 104-A is a dedicated communication channel (e.g., a satellite link or a fiber optic data link). In some embodiments the Content Provider 102 and the Content Distributor 106 are combined, under the control of the same entity or otherwise closely related. In this embodiment, the communication network A 104-A could be any type of data link connecting a content source such as a video-on-demand server or locally originated programming, represented in the Distributed System 100 as the Content Provider 102, and the Content Distributor 106.

The Content Distributor 106 is any party that distributes sequences of media content received from the Content Provider 102 through communication network B 104-B to a Media System 108. In some embodiments the Content Distributor 106 modifies the one or more sequences of media content and provides the modified content to the Media System 108. In some embodiments, communication network B is a managed network (e.g., a cable television network having cable trunks and branch nodes, an internet protocol television network, a network of satellites and ground stations, a wide area computer network, a radio frequency broadcast network with broadcast towers, a satellite distribution network, or the Internet.) As one example, the Content Distributor 106 is a cable company and it receives an ESPN feed from the content provider, substitutes a replacement advertisement for a local real estate agent for an original advertisement in the ESPN feed and then distributes the television channel to a set-top box in the Media System 108.

The Media System 108 is connected both to communication network B 104-B and communication network C 104-C. In accordance with some embodiments, communication network C 104-C is an unmanaged network (e.g., the Internet). In some embodiments the Media System 108 is configured to communicate through communication network C 104-C with a Content Replacement System 110. In response to communications from the Media System 108, the Content Replacement System 110 provides replacement sequences of media content to replace at least a portion of the sequence of media content provided by the Content Distributor 106.

Either the Content Provider 102 or the Content Distributor 106 or both are connected to the Content Replacement System 110 through communication network C. The Content Provider 102 and/or the Content Distributor 106 share data with the Content Replacement System 110 to coordinate media content replacement and, in some embodiments, to share usage data. The Content Provider 102, Content Distributor 106, and or the Content Replacement System 110 have relationships 114 with the Replacement Content Provider 112 (e.g., targeted advertiser). The Replacement Content Provider 112 provides the Content Replacement System 110 with replacement content, and in some embodiments provides the Content Provider 102 and the Content Distributor 106 with an original sequence of media content (e.g., an untargeted advertisement) that is replaced with the replacement media content (e.g., a sequence of media content such as a targeted advertisement). In accordance with some embodiments, Replacement Content Provider 112 includes a plurality of distinct content providers (e.g., advertisers or other entities who create and/or provide replacement media content). In accordance with some embodiments, the Content Provider 102 and the Replacement Content Provider 112 are under the control of the same entity or otherwise closely related (e.g., owned by the same corporation). In this embodiment, the communication network C 104-C is used to communicate or otherwise transfer the Content Replacement System 110 to the Replacement Content Provider 112.

For example, a car manufacturer pays for a television station to insert an advertisement for a minivan into an advertisement slot during a television show. In this example, the car manufacturer also provides a targeted advertisement for a convertible to an advertisement replacement system to be substituted for the minivan advertisement only when displaying the advertisement to television viewers between the ages of 18 and 25. In this example the Replacement Content Provider 112 (e.g., the car manufacturer) provides the original media content (e.g., minivan advertisement) to the Content Provider 102 and the replacement content (e.g., targeted convertible advertisement) to the Content Replacement System 110. When the minivan advertisement is about to be played on a television owned by a 20 year old, the Content Replacement System 110 replaces the advertisement for the minivan with the advertisement for the convertible car and reports the replacement to the advertiser. In some embodiments the Replacement Content Provider 112 also has a relationship with the Content Distributor 106 similar to its relationship with the Content Provider 102.

It should be understood that the communication networks have been divided merely for convenience. In one embodiment, the communication network C 104-C is distinct from communication network B 104-B, and communication network C 104-C is the internet and communication network-B is a managed network (e.g., a cable network). In an alternate embodiment communication network C 104-C is the same as communication network B 104-B, and the Content Replacement System 110 is located at the Content Distributor 106. Additionally, in some embodiments the Content Replacement System 110 is combined with the Content Provider 102 or the Content Distributor 106. In some embodiments, the Content Distributor 106 is the Internet. In some embodiments, the communication network C is the Internet, a local area network (LAN), or a wide area network (WAN), or a different content distributor. Embodiments of the invention disclosed herein may use various alternative distribution networks known in the art. In some embodiments, various ones of the previously described components are connected to one or more of the communication networks 104 using cables such as wires, optical fibers and other transmission mediums. In other embodiments, one or more of these components are connected to one or more of the communication networks 104 through one or more wireless networks using radio signals, satellite links, or the like.

The Media System 106 (sometimes called the "client device," "client computing device," or "client computer") may be any computer, television, radio, set-top box, decoder, or similar device that is capable of receiving the sequences of media content, and preparing the sequences of media content (e.g., audio or video) for display to an end-user. Examples of suitable Media Systems 106 include, without limitation, desktop computers, notebook computers, tablet computers, mobile devices such as mobile phones and personal digital assistants, direct to home satellite receivers, radios, set-top boxes, and televisions.

In some embodiments, the one or more Content Replacement Systems 110 is a computer server. In other embodiments the Content Replacement Systems 110 include a plurality of servers such as a web interface (front end server) one or more application servers and one or more database servers which are connected to each other through a network (e.g., a LAN, WAN or the like), and which exchange information with other components of the distributed system described above through a common interface (e.g., one or more web servers, also called front end servers). In some other embodiments, the front end server and the back end server are merged into one software application and/or hosted on one physical server.

It should be understood that, in accordance with some embodiments, the one or more Content Replacement Systems 110 may include a plurality of distinct content replacement systems. In some embodiments each of the distinct content replacement systems provides content replacement services to a distinct class of media systems (e.g., one content replacement system provides replacement content for mobile devices, while a second content replacement system provides replacement content for televisions). In some embodiments each of the distinct content replacement systems provides content replacement services associated with a distinct content provider or content distributor (e.g., one content replacement system provides content for ESPN and one content replacement system replaces content for HBO).

Figure 2:
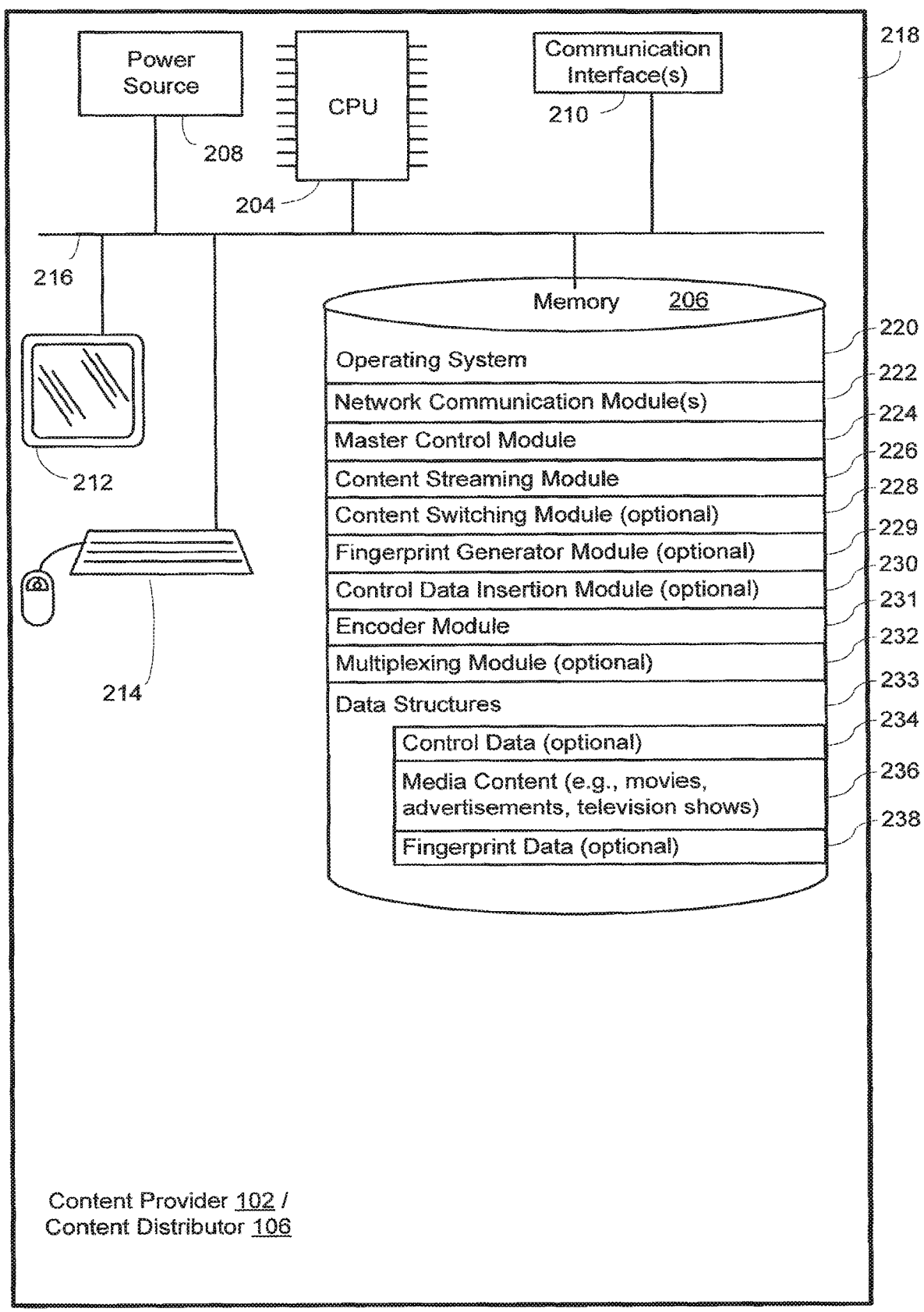
FIG. 2 is a block diagram of a content provider or a content distributor in accordance with some embodiments.

FIG. 2 is a block diagram illustrating a Content Provider System 102 or Content Distributor System 106 in accordance with one embodiment. The Content Provider 102 or Content Distributor 106 typically includes one or more processing units (e.g., CPUs) 204, one or more power sources 208, one or more network or other communications interfaces 210 (e.g., a coaxial cable port, an Ethernet port, and/or a wireless port), memory 206, one or more communication buses 216 for interconnecting these components, and a housing 218. The Content Provider 102 or Content Distributor 106 optionally may include a user interface comprising a display device 212 and a keyboard 214. The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 204. The memory 206, or alternately the non-volatile memory device(s) within memory 206, comprises a non-transitory computer readable storage medium. In some embodiments, memory 206 or the computer readable storage medium of memory 206 stores the following programs, modules and data structures, or any subset thereof:

An operating system 220 that includes procedures for handling various basic system services and for performing hardware dependent tasks.
  One or more network communication module(s) 222 that are used for connecting the Content Provider 102 or the Content Distributor 106 to other computers via the communication network interface(s) 210 (wired or wireless) to one or more communication networks, such as the Internet, other wide area networks, local area networks, metropolitan area networks, satellite links, cable networks, and so on. For a Content Provider 102, the network communication module(s) 222 connect the Content Provider 102 to the Content Distributor 106 through communication network A (104-A in FIG. 1), and the Content Replacement System 110 through communication network C (104-C in FIG. 1). For a Content Distributor 106, the network communication module(s) 222 connect the Content Distributor 106 to communication network A (104-A in FIG. 1), communication network B (104-B in FIG. 1) and communication network C (104-C in FIG. 1). It should be understood that each of the plurality of network communication modules 222 may have a separate communication interface (e.g., an Ethernet port, a cell phone antenna, and a cable port), or two or more of the network communication modules 222 may share a communication interface.

A master control module 224 that creates and/or modifies a sequence of media content by combining and/or reordering media content from one or more sources by controlling a content streaming module 226, a content switching module 228, and/or a control data insertion module 230.

One or more content streaming modules 226 for retrieving content (e.g., movies, television shows and advertisements) from one or more sources including remotely located content providers and local data structures 234.

A content switching module 228 (optional) for switching between a plurality of content streaming modules 226 (e.g., to switch between a primary content stream containing a movie and a secondary content stream containing an advertisement).

A fingerprint generator module 229 (optional) for generating fingerprints of the media content for use by the Content Replacement System 110 and the Media System 108 to identify media content to replace.

A control data insertion module 230 (optional) for inserting control data into the stream of media content (e.g., by adding steganographic data to the stream of media content), the control data including one or more of: an advertiser identifier, an advertisement campaign identifier, advertisement duration, advertisement pre-roll period or advertisement start time, current date and time, and/or a unique identifier.

An encoder module 231 for encoding sequences of media content transferred from the Content Provider 102 to the Content Distributor 106 and encoding sequences of media content transferred to the Media System 108 from the Content Distributor 106 and/or the Content Provider 102.

A multiplexer 232 (optional) for multiplexing and/or demultiplexing a plurality of sequences of media content.

Data structures 233 for storing control data 234 (optional) for use by the control data insertion module 230, media content 236 (e.g., movies, advertisements, television shows), and fingerprint data 238 (optional) including the fingerprints generated by the fingerprint generator module 229.

Each of the above identified programs, modules and/or data structures may be stored in one or more of the previously mentioned memory devices, and corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, the memory 206 may store a subset of the modules and data structures identified above. Furthermore, the memory 206 may store additional modules and data structures not described above. Similarly, while the above identified memory devices are shown in a single computing device in a single housing, it should be understood that each of the modules could be implemented on a separate hardware device (e.g., the master control module could be a separate master control server and the content streamer module could be a separate content streaming server).

Additionally, discussion of the Content Provider 102 and the Content Distributor 106 has been consolidated into a single section for the sake of clarity. However, one having ordinary skill in the art would readily understand that, in some embodiments, the Content Distributor 106 is distinct from the Content Provider 102 in that the Content Provider 102 creates an initial sequence of media content, which is then provided directly to the Content Distributor 106. The Content Distributor 106 receives the sequence of media content from the Content Provider 102 and, in some embodiments modifies the sequence of media content by adding or replacing advertisements and then distributes the content to the Media System 108 (e.g., a consumer electronic device) for presentation to an end-user of the Media System 108. Alternatively, in some embodiments, the Content Provider 102 and the Content Distributor 106 are combined into a single content provider/distributor which acquires source media content and delivers it directly to the Media System 108.

Figure 3:
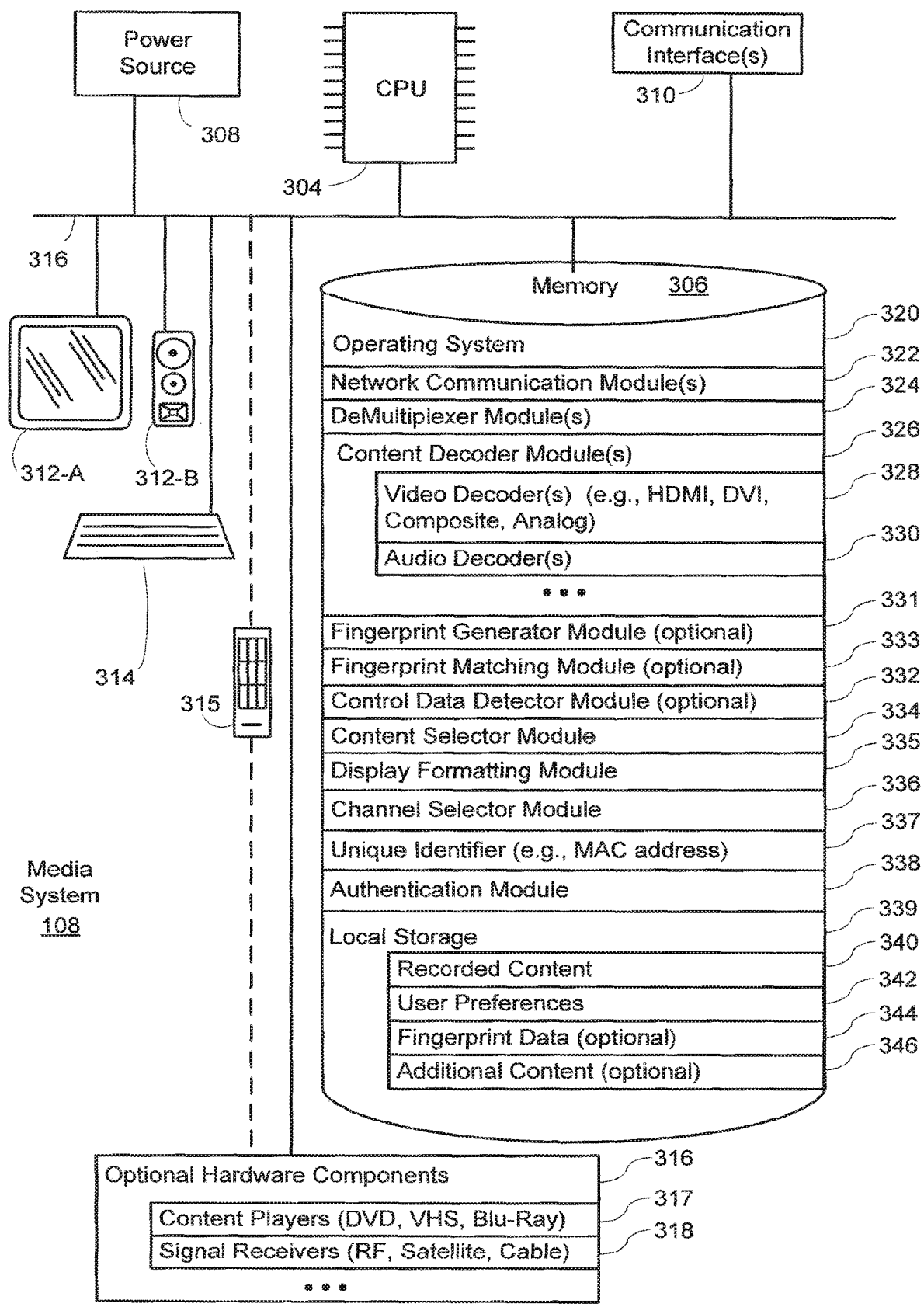
FIG. 3 is a block diagram of a media system for presenting media content in accordance with some embodiments.

FIG. 3 is a block diagram illustrating a Media System 108 (also referred to as a "client device" or "client computing device," or "consumer electronic device") in accordance with one embodiment. The Media System 108 typically includes one or more processing units (CPUs) 304, one or more power sources 308, one or more network or other communications interfaces 310 (e.g., a coaxial cable port, an Ethernet port, and/or a wireless port), memory 306 and one or more communication buses 316 for interconnecting these components. The Media System 108 optionally may include user interface devices including a display device 312-A (for providing visual output), a speaker device 312-B (for providing audio output), a wireless or wired keyboard 314, and a remote 315 for detecting user inputs various components of the Media System 108 including the display (e.g., television) and other optional hardware components 316 such as content players 317 (e.g., DVD, VHS, Blu-Ray, Digital Video Recorder) and signal receivers 318 (e.g., cable box, satellite dish, etc.). Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 304. Memory 306, or alternately the non-volatile memory device(s) within the memory 306, comprises a non-transitory computer readable storage medium. In some embodiments, memory 306 or the computer readable storage medium of the memory 306 stores one or more of the following programs, modules and data structures, or a subset thereof:

An operating system 320 that includes procedures for handling various basic system services and for performing hardware dependent tasks.

One or more network communication module(s) 322 that are used for connecting the Media System 108 to other computers via the communication network interface(s) 310 (wired or wireless) to one or more communication networks, such as the Internet, other wide area networks, local area networks, metropolitan area networks, satellite links, cable networks, and so on. In particular, the network communication module(s) 322 connect the Media System 108 to the Content Distributor 106 through communication network B (104-B in FIG. 1), and the Content Replacement System 110 through communication network C (104-C in FIG. 1). It should be understood that each of the plurality of network communication modules 322 may have a separate communication interface (e.g., an Ethernet port, a cell phone antenna, and a cable port), or two or more of the network communication modules 322 may share a communication interface.

One or more demultiplexer module(s) 324 for demultiplexing a sequence of media content from a plurality of multiplexed sequences of media content (e.g., selecting a single television channel from a plurality of multiplexed television channels).

One or more content decoder modules 326 for decoding content, including video decoders 328 (e.g., MPEG2, H.264, HDMI, DVI, composite and analog) and audio decoders 330. In some embodiments, the decoders act primarily as interfaces to process component signals or serial digital uncompressed content. It should be understood that in some embodiments, one or more of the content decoders is implemented as a separate memory device with a firmware decoder. In some embodiments, the Media System 108 continues to monitor the decoded content (e.g., from the Content Provider 102 or the Content Distributor 106), for changes that represent a change of some aspect of the decoded content (e.g., channel, volume, signal source, or other state) as it comes from one of the optional hardware components 316 that are feeding the signal to the Media System 108 that is otherwise not in communication with the CPU 304 that controls the control data detector module 332.

A fingerprint generator module 331 (optional) for generating fingerprints of the media content for use in coordination with the Content Replacement System 110 to identify media content to replace.

A fingerprint matching module 333 (optional) for comparing fingerprints received from the Content Replacement System 110 to content fingerprints generated by the fingerprint generator module 331.

A control data detector module 332 (optional) for detecting control data inserted into the sequence of media content by the Content Provider 102 and/or the Content Distributor 106.

A content selector module 334 for automatically switching between sequences of media content from a plurality of distinct sources (e.g., an original sequence of media content from the Content Distributor 106 and replacement media content from the Content Replacement System 110). In some embodiments this switching is performed in accordance with timing information included in the control data (e.g., by counting presentation frames such as NTSC video presented at 30 frames/60 fields per second). In some embodiments the timing information is based on information about the uncompressed media content (e.g., relative video flame distance from the first bits of a field in one of the data headers of the sequence of media content) rather than on information about the compressed media content (e.g., the rate of the compressed bits delivered to the Media System 108).

A display formatting module 335 (optional) which converts the sequence of media content into a standardized content presentation format (e.g., for video media content: NTSC, ATSC, SECAM, PAL, RGN, etc.).

Figure 5:
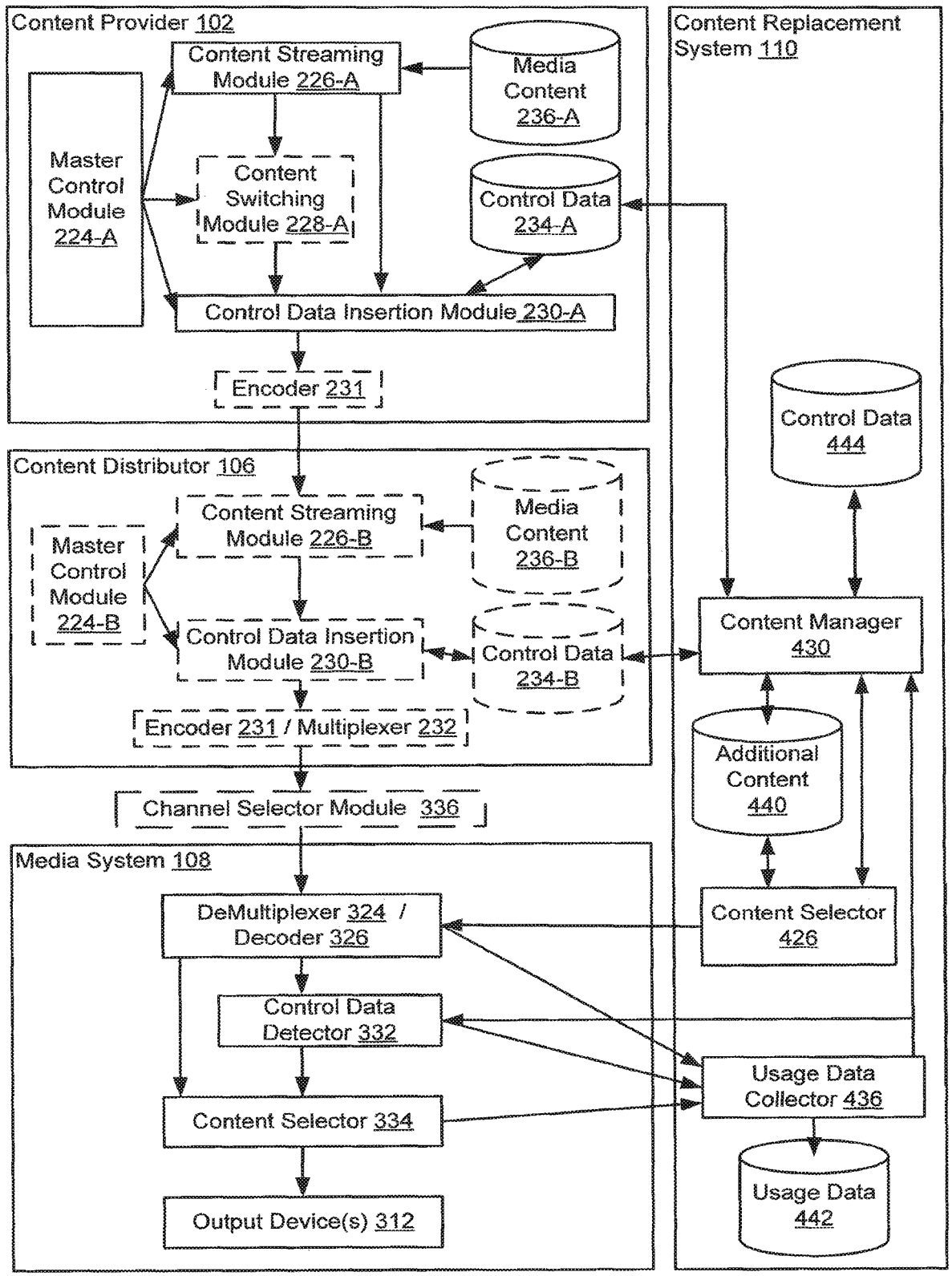
FIG. 5 is a block diagram illustrating the flow of data through a distributed system for distributing media content to a media system using embedded control data in accordance with some embodiments.
Figure 6A:
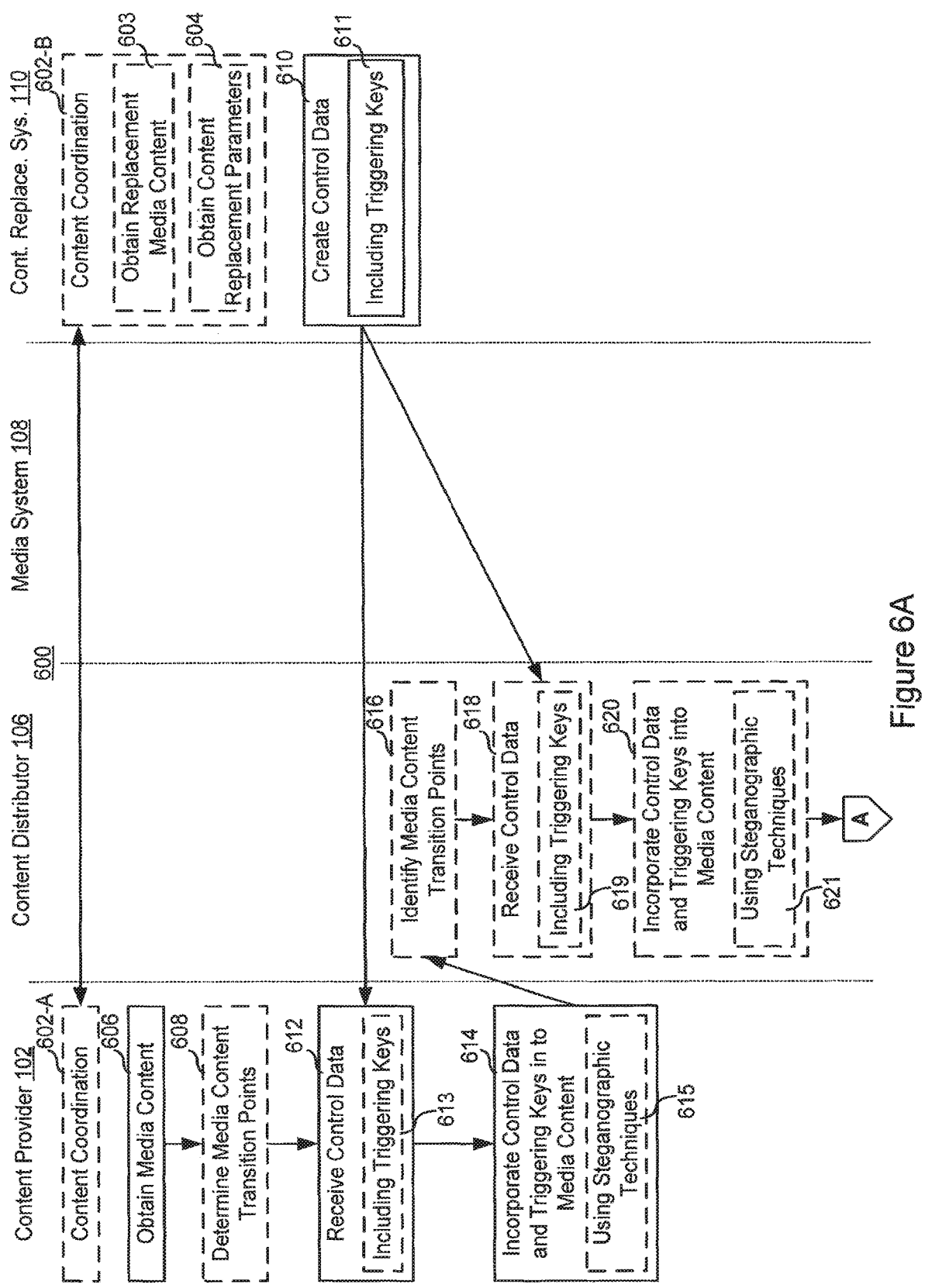
Figure 6B:
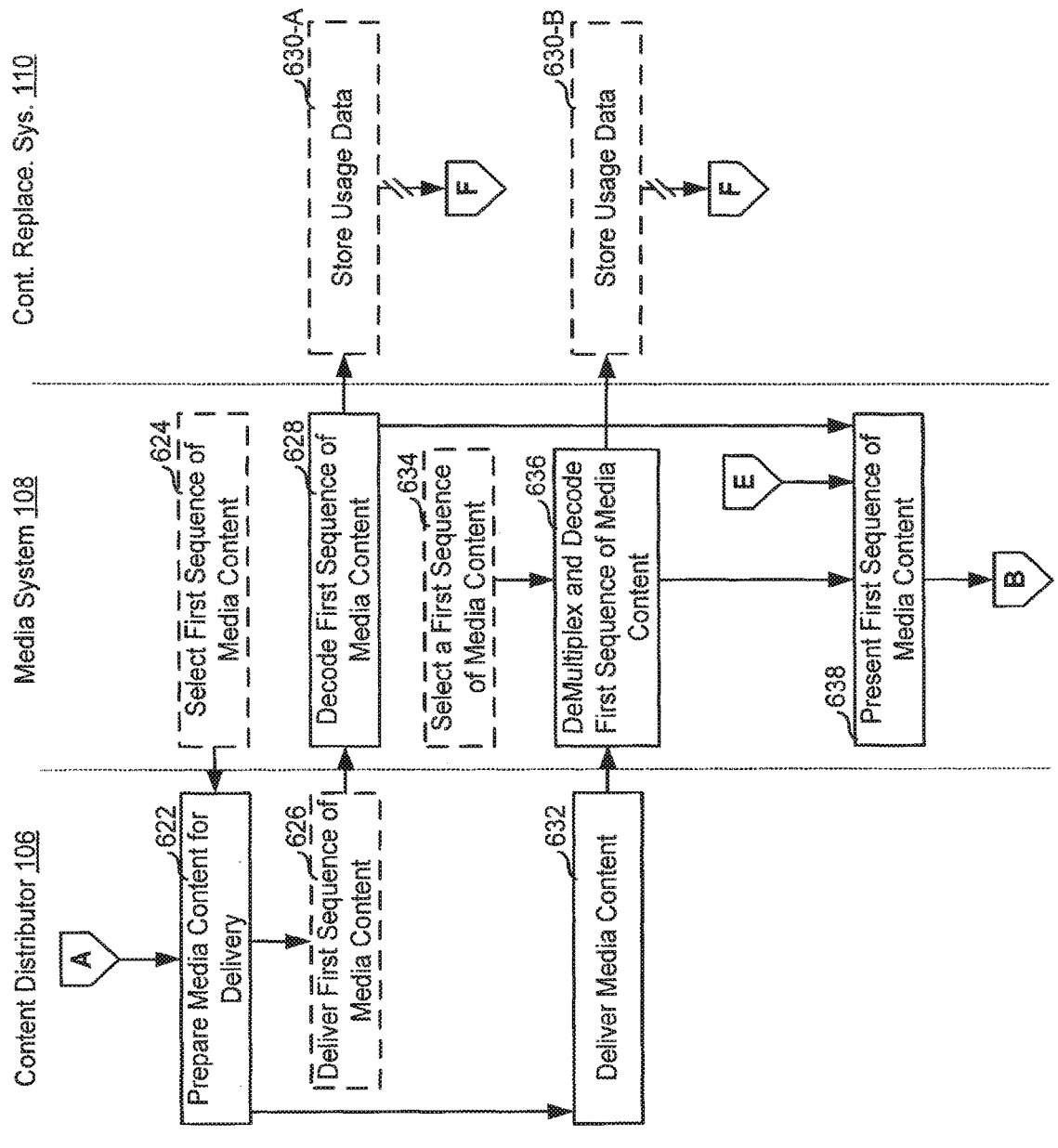
Figure 6C:
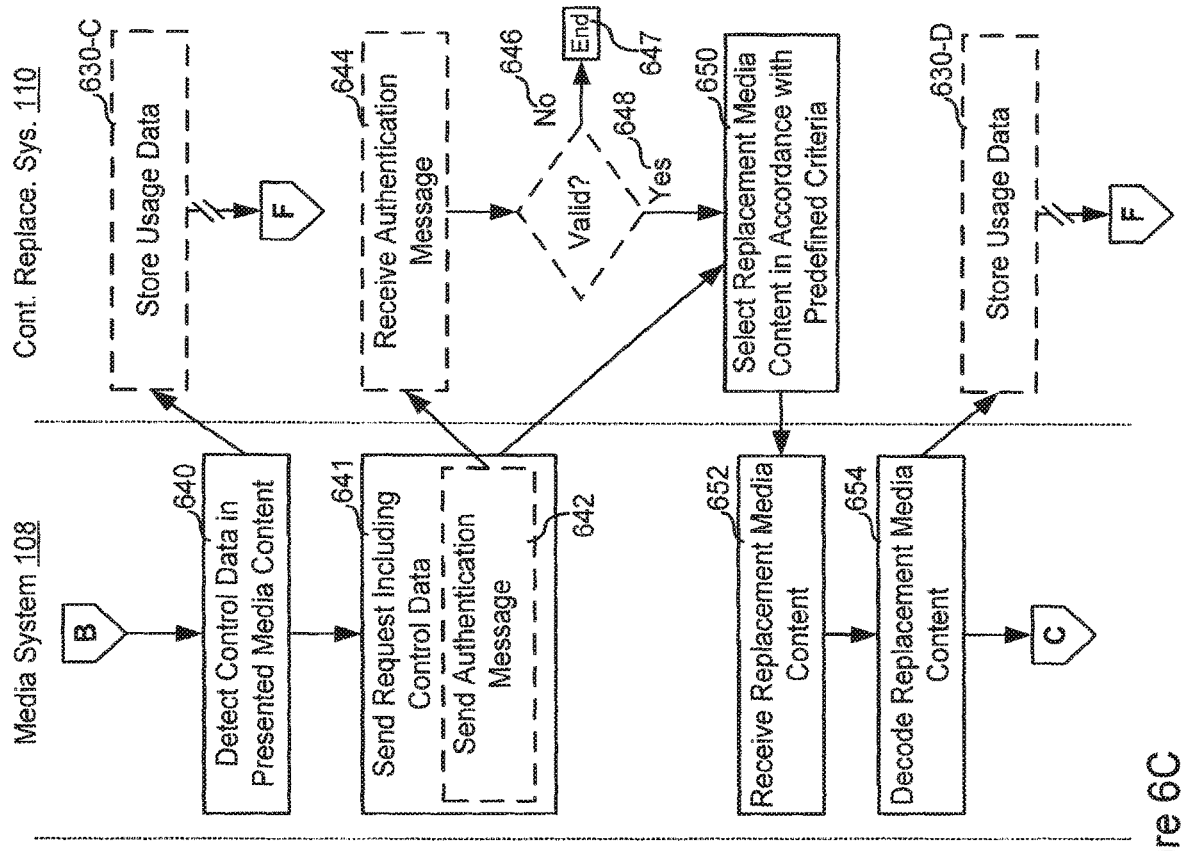
Figure 6E:
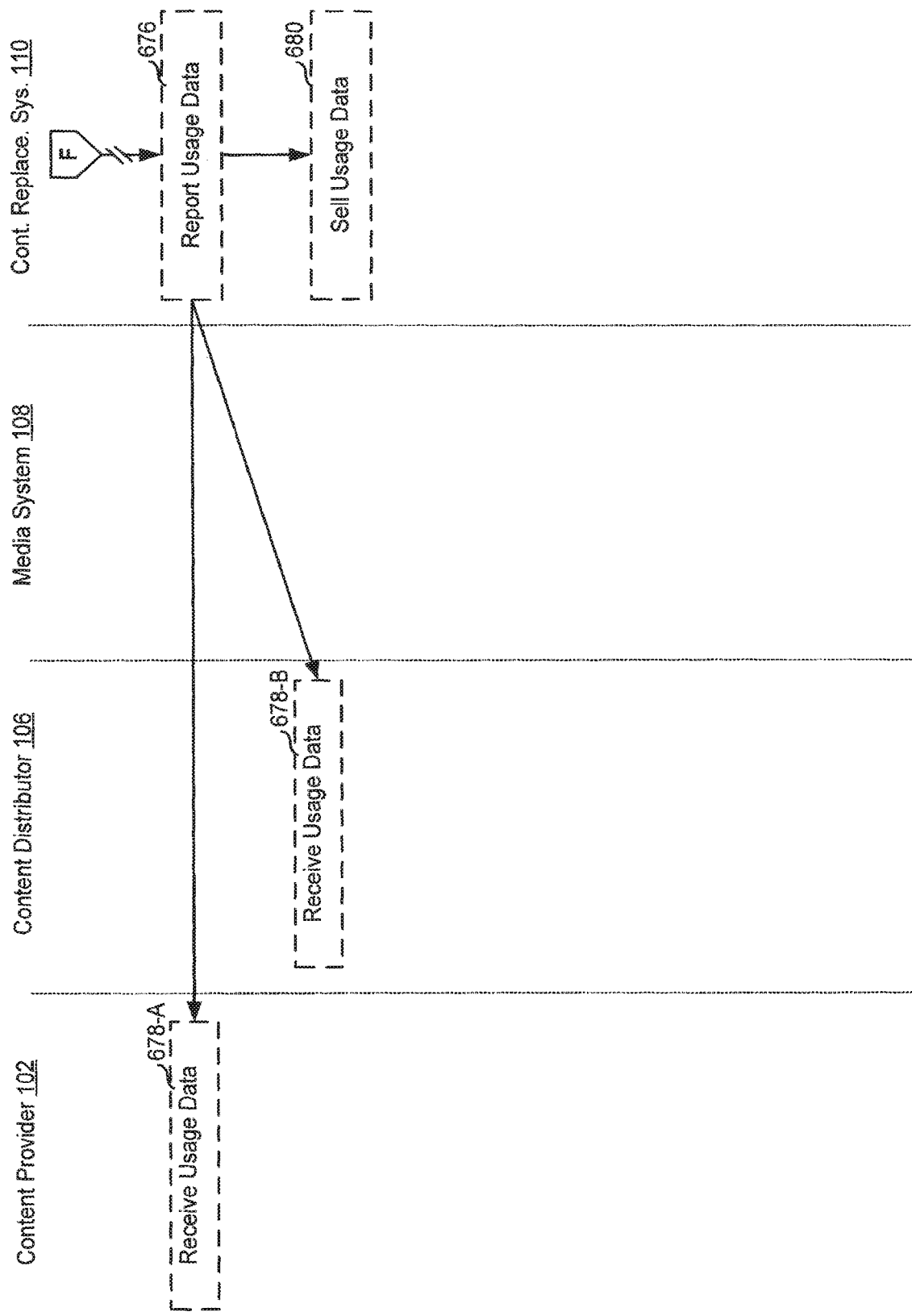

A channel selector module (optional) 336 for selecting a sequence of media content from a plurality of sequences of media content provided by the Content Distributor 106 to present (e.g., the selection of a television channel by the end-user). In some embodiments, this module is located at the media device, while in other embodiments (as shown in FIG. 5) this module is located remotely from the media device and is accessed by the media device through one of the network communication module(s).

A unique identifier 337, (e.g., a MAC address), that is used to uniquely identify the Media System 108 to the Content Replacement System 110.

An authentication module 338 for establishing a secure connection with the Content Replacement System 110, including a private key or some other authentication code.

Local storage 339 including recorded media content 340 (e.g., Digital Video Recorder data and/or temporarily cached replacement media content), user preference information 342 (e.g., the preferences of the end-user), and fingerprint data 344 (optional) including at least a subset of the fingerprints generated by the fingerprint generator module 331 and any fingerprints received from the Content Replacement System 110.

Additional content 346 such as replacement content received from the Replacement Content Provider 112. In accordance with some embodiments, the additional content includes content components (e.g., images, text, video, audio, etc.) and the additional content is assembled from the content components by the Media System 108 as needed.

Each of the above identified programs, modules and/or data structures may be stored in one or more of the previously mentioned memory devices, and corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, the memory 306 may store a subset of the modules and data structures identified above. Furthermore, the memory 306 may store additional modules and data structures not described above. Similarly, while the above identified memory devices are shown in a single computing device, it should be understood that each of the modules could be implemented on a separate hardware device (e.g., the control data detector module 332 and/or the fingerprint generator module 331 could be physically located in the cable set-top box, an Internet Protocol television set top box, or a consumer electronics device, such as a television or a DVD player, Blue Ray player, Personal Video Recorder, or a personal computer used to acquire and decode television content while the content is presented on a separate television) without altering the functional relationship of the control data detector module 332 and/or the fingerprint generator module 331 to other components in the Media System 108).

Figure 4:
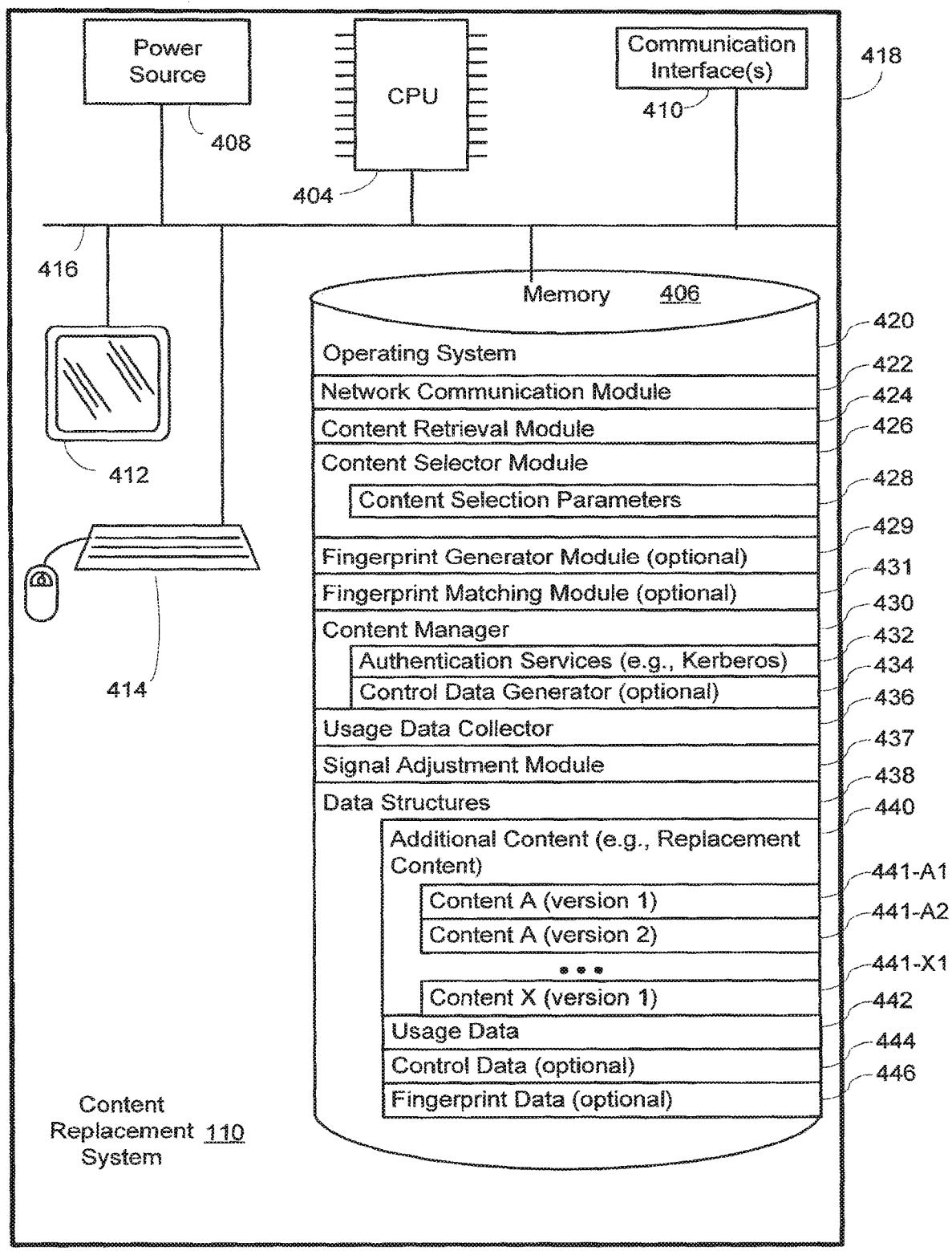
FIG. 4 is a block diagram of a content replacement system for providing replacement media content in accordance with some embodiments.

FIG. 4 is a block diagram illustrating a Content Replacement System 110 (also referred to as a "server," or "server system") in accordance with one embodiment. The Content Replacement System 110 typically includes one or more processing units (e.g., CPUs) 404, one or more power sources 408, one or more network or other communications interfaces 410 (e.g., a coaxial cable port, an Ethernet port, and/or a wireless port), memory 406, one or more communication buses 416 for interconnecting these components, and a housing 418. The Content Replacement System 110 optionally may include a user interface comprising a display device 412 and a keyboard 414. The memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 404. The memory 406, or alternately the non-volatile memory device(s) within memory 406, comprises a non-transitory computer readable storage medium. In some embodiments, memory 406 or the computer readable storage medium of memory 406 stores the following programs, modules and data structures, or any subset thereof:

- An operating system 420 that includes procedures for handling various basic system services and for performing hardware dependent tasks.
- One or more network communication module(s) 422 that are used for connecting the Content Replacement System 110 to other computers via the communication network interface(s) 410 (wired or wireless) to one or more communication networks, such as the Internet, other wide area networks, local area networks, metropolitan area networks, satellite links, cable networks, and so on. In particular, the network communication module(s) 422 connect the Content Replacement System 110 to the Content Provider 102, Content Distributor 106, and the Media System 108 through communication network C (104-C in FIG. 1).
- A content retrieval module 424 for retrieving replacement content (e.g., targeted advertisements) and other additional content from the Replacement Content Providers 112 (e.g., targeted advertisers).
- A content selector 426 module for determining what replacement media content (e.g., what targeted advertisement) and/or other additional content to send to the Media System 108 to replace and/or supplement the original sequence of media content. In some embodiments the content selector uses content selection parameters 428 received from the Replacement Content Provider 112 (e.g., the company responsible for an advertising campaign or the company whose products are being advertised).
- A fingerprint generator module 429 (optional) for generating fingerprints from media content, to be used for identifying media content to replace, in coordination with the Media System 108.
- A fingerprint matching module 431 (optional) for matching fingerprints received from the Content Provider 102, Content Distributor 106 and/or generated by the fingerprint generator module 429 with fingerprints received from the Media System 108 in order to identify media content to replace.
- A content manager 430 for managing the process of providing replacement content and/or providing supplemental content, including mediating interactions between the various hardware and software modules described herein (e.g., for communicating instructions to the Content Provider 102 and/or the Content Distributor 106 as to where to insert the control data). In some embodiments the content manager 430 includes authentication services 432 (e.g., Kerberos) for authenticating requests for replacement media content, and a control data generator 434 (optional) for generating the control data based on the content selection parameters, as described in greater detail below.
- A usage data collector 436 for collecting usage data from the media device and storing the usage data in data structures.
- A signal adjustment module (e.g., a rateshaper, transcoder, or decoder/encoder pair) for changing the replacement content bandwidth or other characteristics to match the transmission parameters (e.g., the maximum bandwidth) associated with the path in the communication network C 104-C linking the Media System 108 with the Content Replacement System 110.
- Data structures 438 for storing data produced by and received by the other modules and instructions described herein, including:
  - Additional content 440 (e.g., 441-A1, 441-A2, 441-X1, etc.) such as replacement content received from the Replacement Content Provider 112. In accordance with some embodiments, multiple versions of the same additional content (e.g., 441-A1, 441-A2) are stored in the data structures 438, where each version is configured (e.g., compressed at a different bit rate) for transmission across a communication network (e.g., 104-C) with different network characteristics (e.g., lower or higher bandwidth). As one example, Content A (version 1) 441-A1 is compressed at a low bit rate for transmission across network connections with a low bandwidth (e.g., dial-up internet), while Content A (version 2) is compressed at a high bit rate for transmission across network connections with a high bandwidth (e.g., broadband internet).
  - Usage data 442 collected by the usage data collector.
  - Control data 444 (optional) created by the content manager 430. In accordance with some embodiments, the control data 444 includes timing information for use by the Media System 108 and/or the Content Replacement System to determine the timing of communications (e.g., stream switching or other actions). In some embodiments this switching is performed in accordance with timing information included in the control data (e.g., by counting presentation frames such as NTSC video presented at 30 frames/60 fields per second).
  - Fingerprint data 446 (optional) including fingerprints received from the Content Provider 102, Content Distributor 106, Media System 108, and/or generated by the fingerprint generator module 429.

Each of the above identified programs, modules and/or data structures may be stored in one or more of the previously mentioned memory devices, and corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, the memory 406 may store a subset of the modules and data structures identified above. Furthermore, the memory 406 may store additional modules and data structures not described above. Similarly, while the above identified memory devices are shown in a single computing device, it should be understood that each of the modules could be implemented on a separate hardware device (e.g., the content manager could be implemented as a content manager server and the usage data collector could be implemented as a separate usage data collection server).

Content Replacement Using Control Data

Attention is now directed to FIG. 5, which illustrates the flow of data through a distributed system for distributing media content to a media device in accordance with some embodiments (e.g., embodiments where media content is replaced using control data insertion and detection). Some functional components, such as the network communication interfaces, have been omitted for clarity. Media content for presentation on a Media System 108 (e.g., television shows for display on a television) begins as source media content 236-A at the Content Provider 102. The source media content is retrieved from the media content database 236-A by one or more content streaming modules 226-A, which are controlled by the master control module 224-A to create a sequence of media content by combining several sequences of media content into a single sequence of media content inserting interstitial sequences of media content into a single sequence of media content. In some embodiments the sequence of media content is created using a content switching module 228-A.

In accordance with some embodiments the media content from the content streaming module and the content switching module is uncompressed (e.g., unencoded) media content. A control data insertion module 230-A retrieves control data 234-A. In accordance with instructions from the master control module 224-A, the control data insertion module 230-A inserts control data into the sequence of media content. In some embodiments the sequence of media content with the inserted control data is encoded in an encoding module 231 into a format suitable for delivery to the Content Distributor 106 (e.g., using an audio and/or video encoding module to produce a profile of MPEG 2 or H.264 that is compatible with the transmission requirements of a given Content Distributor 106).

Take, for example, a television network creating a sequence of media content for a television channel. The sequence of media content includes 45 minutes of a television show and thirty half minute advertisements. The advertisements and the television show are stored in the media content database 236-A and are streamed through the content streaming module. The master control module 224-A instructs the content streaming module 226 which media content to stream and (optionally) uses the content switching module 228 to switch between advertisements and the television show. The control data insertion module 230-A inserts control data into the television channel content indicating that one of the half minute advertisements can be replaced by the Content Distributor 106 and that one of the half minute advertisements can be replaced by the Content Replacement System 110 with a targeted advertisement.

The Content Distributor 106 receives the sequence of media content with the inserted control data, and integrates the sequence of media content into a distribution medium such as a cable network, satellite network, IPTV network, web network, local radio frequency broadcast, mobile network, etc. In some embodiments, the Content Distributor 106 decodes an encoded sequence of media content from the Content Provider 102. When the Content Distributor 106 is configured to insert additional content (e.g., local advertisements), the Content Distributor 106 has a content streaming module 226-B for inserting media content (e.g., replacement geographically specific advertisements) into the sequence of media content, as directed by a master control module 224-B. In some embodiments, the Content Distributor 106 has a control data insertion module 230-B for inserting control data 234-B into the sequence of media content. In some embodiments, the Content Distributor 106 encodes the sequence of media content using an encoder 231 into a format suitable for distribution to the Media System 108. When there are a plurality of sequences of media content, the Content Distributor 106 multiplexes a plurality of sequences of media content using multiplexer module 232 before passing the sequences of media content off to the Media System 108.

In accordance with some embodiments, the sequence(s) of media content are passed off to the Media System 108 through a communication network associated with the Content Distributor 106 (e.g., a cable network or a satellite network). In some embodiments the sequence of media content is passed to the Media System 108 along with a plurality of other sequences of media content, and the plurality of sequences of media content pass through a channel selector module 336, which selects a single sequence of media content to deliver to the Media System 108 in accordance with instructions received from the Media System 108. In some embodiments the channel selector module 336 is at the Media System 108 (as shown in FIG. 3) and the plurality of sequences of media content are passed to the channel selector module in the Media System 108.

At the Media System 108 the, sequence(s) of media content are passed to a multi-format demultiplexer 324/decoder 326, which demultiplexes (if necessary) and decodes the selected sequence of media content (e.g., decodes an encoded video stream from one or more of MPEG2, H.264, VC1, Quicktime, or other video format). The demultiplexed and decoded sequence of media content is passed to a control data detector 332, which analyzes the content to detect any control data. If no control data is detected, the sequence of media content is passed to the content selector 334, which passes the sequence to output devices 312 (e.g., a display and/or speaker system), where the sequence of media content is presented to the end-user.

When control data is detected, the control data detector 332 sends a request to the content manager 430 in the Content Replacement System 110, which authenticates the request and reads the control data. In some embodiments the request includes a globally unique identifier of the control data detector (e.g., a globally unique identifier of the Media System 108). In some embodiments, the replacement media content has header information uniquely identifying original sequence of media content where the replacement media content is to be inserted. The multi-format demultiplexer 324/decoder 326 validates the replacement opportunity from state information maintained by the multi-format demultiplexer 324/decoder 326, by comparing the state information against the information contained in the header of the replacement media content received from the Content Replacement System 110.

The content manager 430 passes information associated with the control data (e.g., an advertiser identifier, an advertisement campaign identifier, advertisement duration, advertisement pre-roll period or advertisement start time, current date and time) to the replacement content selector 426, which selects appropriate replacement content from the additional content database 440 based on the information provided by the control data detector 332 about the parameters of the sequence of media content (e.g., the length of the ad to be replaced, the advertising campaign, etc.) and (optionally) data about the Media System 108 that is sent from the control data detector 332 or stored on the Content Replacement System 110. The Content Replacement System 110 sends replacement media content to the decoder 326 in the Media System 108.

In some embodiments the replacement media content arrives at the demultiplexer 324/decoder 326 in MPEG2 transport streams, in MP4 containers, or some other type of transport. Additionally, said replacement media content may arrive at the demultiplexer 324/decoder 326 in MPEG2, H.264, VC1, Quicktime, or other video format. In some embodiments, the replacement media content is streamed over a network connection (e.g., the internet) and the multiformat demultiplexer 324/decoder 326 has attached storage to buffer the some portion of the beginning of the replacement sequence of media and any related information, mitigating the effects of jitter introduced through streaming over the internet.

The decoder 326 decodes the replacement media content and passes the decoded replacement media content to the content selector 334, which switches over from the original sequence of media content to the replacement media content at a time that is, in accordance with some embodiments, determined by the control data (e.g., the switch synchronizes the timing of the cutover from the chosen television channel to the targeted advertisement being delivered over the Internet from the Content Replacement System 110). The output device 312 then presents the replacement media content. In some embodiments, while the sequence of media content is being presented on the output devices 312, the demultiplexer 324/decoder 326 continues to demultiplex and decode the original sequence of media content.

After the replacement media content has ended the content selector 334 automatically switches back to the original sequence of media content. In some embodiments the original sequence of media content continues to advance while the replacement media content is presented (e.g., it restarts at a later point in the sequence, such as by replacing one advertisement in the sequence with a targeted advertisement of the same length). In some embodiments the original sequence of media content does not continue to advance (e.g., it restarts at the point that it was when the replacement media content began to play, such as by inserting an advertisement into the middle of a movie without replacing any of the content of the movie, essentially pausing the movie while the advertisement is displayed).

At various points in this process the Media System 108 provides usage data to a usage data collector 436 in the Content Replacement System 110. For example, the content selector 334 informs the usage data collector 436 of the state changes at the content selector 334. Said state changes including information about the delivery of replacement media content (e.g., a targeted ads) to an output device 312 (e.g., a television). The usage data is stored in a usage data database 442 for later use by the Content Replacement System 110. For targeted advertisement, when the content selector 334 is located in the output device (e.g., a video switch in a television) usage data is more valuable than general "rating" data (e.g., the NIELSEN TV RATINGS of the Nielsen Company) because it includes information about whether the television was turned on, and thus substantially increases the accuracy of determining whether the targeted advertisement was watched.

FIGS. 6A-6E include a flowchart representing a method 600 for remotely controlling a Media System 108 (e.g., a consumer electronic device), according to certain embodiments. This method may be governed by instructions that are stored in a non-transitory computer readable storage medium and that are executed by one or more processors of one or more computer systems. Each of the operations shown in FIGS. 6A-6E may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In accordance with one embodiment, the Content Provider 102 and the Content Replacement System 110 perform a series of operations (602-A) and (602-B), including in some embodiments, receiving instructions from a Replacement Content Provider 112 (e.g., receiving instructions from an advertiser indicating the circumstances under which advertisements in a television broadcast stream are to be replaced with targeted advertisements provided by the advertiser). As one example, a car manufacturer, purchases a half minute advertising placement opportunity with a Content Provider 102 (e.g., a television network) and pays a content replacement service to insert a targeted advertisement in the advertisement placement opportunity. The Content Replacement System 110 obtains (603) replacement media content (e.g., a targeted advertisement) from the Replacement Content Provider (112 in FIG. 1) and obtains (604) content selection parameters from the Replacement Content Provider 112 that indicate when the replacement content should be inserted into a sequence of media content. In some embodiments those parameters include the advertiser identifier, the advertising campaign identifier, a unique identifier of the device playing the advertisement and/or the starting time of the advertisement.

The Content Provider 102 obtains (606) source media content. In some embodiments, the Content Provider 102 obtains the source media content from a satellite link to a content source (e.g., a television studio). Typically, this data is processed at the Content Provider 102 into a form that lends itself to storage. Additionally, media content can be received from a content source by accessing the content source through a proprietary network or a public network such as the Internet. In some embodiments, a Content Distributor 106 physically delivers a storage medium containing a digital copy of a programming content to the Content Provider 102. In some embodiments, media content is acquired and processed for transmission to viewers in real time, and not first stored (e.g., a live satellite feed of a football game). In some embodiments acquiring and processing media content for transmission to viewers in real time includes buffering at least a portion of the content (e.g., transmitting the media content with an eight second delay to compensate for any variations in the rate at which the media content is being received by the Content Provider 102).

In accordance with some embodiments the Content Provider 102 determines (608) one or more transition points in the content. For example, the Content Provider 102 selects three five-minute blocks for commercial breaks in an hour-long television program. The Content Replacement System 110 creates (610) control data that, in some embodiments, includes triggering keys (611) where present (e.g., when the triggering keys are a specific type of control data). The Content Replacement System 110 sends the control data to the Content Provider 102. The Content Provider 102 receives (612) the control data, including the triggering keys (613). In some embodiments a triggering key is a sequence of data that indicates to a computing system reading the control data that substantive control data is about to be provided and should be recorded by the computer system.

The Content Provider 102 creates a sequence of media content and incorporates (614) at least a subset of the control data and the triggering keys into the sequence of media content. In some embodiments, incorporating the control data into the media content includes using steganographic techniques (e.g., digital watermarking, etc.) or other techniques to conceal the control data in the sequence of media content, as described in greater detail below.

In some embodiments the Content Distributor 106 receives the sequence of media content and identifies (616) transition points within the sequence of media content. In some embodiments, the Content Distributor 106 also receives (618) control data including (619) triggering keys. The Content Distributor 106 may incorporate (620) additional control data into the sequence of media content and (optionally) using (621) steganographic techniques, as described in greater detail below. It should be understood that, in some embodiments, only the Content Provider 102 incorporates control data into the sequence of media content, while in other embodiments, only the Content Distributor 106 incorporates control data into the sequence of media content. Additionally, in some embodiments, both the Content Distributor 106 and the Content Provider 102 incorporate control data into the sequence of media content. (For example, both a television network and a cable company have a relationship with a targeted advertiser and the television network and the cable company each insert control data into the video feed/stream to replace a different advertisement in the same television feed with a targeted advertisement).

The Content Distributor 106 prepares (622) the media content for delivery to a Media System 108. In some embodiments the Media System 108 sends a request indicating the selection (624) of a first sequence of media content (e.g., a first television channel). In this embodiment, the Content Distributor 106 delivers (626) the first sequence of media content to the Media System 108. The first sequence of media content is decoded (628) and presented (638) by the Media System 108. For example, in a switched digital video system, the end-user requests to view channel "42" of a plurality of cable channels, the request goes out over the communications network and a single channel is returned to the end-user and decoded on the end-user's home equipment (e.g., a cable box and a television). In some embodiments the decoder reports usage data to a Content Replacement System 110, this reporting may occur over an alternate communication network (e.g., a second communication network). The Content Replacement System 110 stores (630-A) the usage data, as described in greater detail below.

In some embodiments, the first sequence of media content is a sequence of video content including video content requested by the end-user and advertisement video content. In some embodiments, the replacement media content is a sequence of video content including one or more replacement advertisements.

In some embodiments, the end-user does not send a network request for a first sequence of media content, but rather the Content Distributor 106 delivers (632) a plurality of sequences of media content (e.g., multiplexed television channels). The Media System 108 receives the plurality of sequences of media content (e.g., multiple television channels) and the end-user selects (634) a first sequence of the media content. In some embodiments, the Media System 108 demultiplexes the plurality of sequences of media content and decodes (636) the selected first sequence of media content. In some embodiments usage data is sent by the Media System 108 to the Content Replacement System 110 and stored (630-B) for later use.

In some embodiments, the Media System 108 receives the first sequence of media content from a media Content Distributor 106 over a first communication network (e.g., a managed content distribution network such as a cable network or a satellite network), the first sequence of media content includes associated control data for facilitating the replacement of media content in the first sequence of media content with replacement media content. The Media System 108 presents (638) the first sequence of media content to an end-user of the Media System 108. While presenting the content to the end-user, the Media System 108 detects (640) the associated control data embedded within the first sequence of media content. In accordance with some embodiments, the Media System 108 stores (630-C) usage data and/or sends the usage data to a Content Replacement System 110 for later use.

In response to detecting the control data, the Media System 108 sends (641) a request to the Content Replacement System 110 over a second communication network (e.g., an unmanaged network such as the Internet) that is distinct from the first communication network (e.g., a managed network) including at least a portion of the control data. In some embodiments the request includes an authentication message (642). A number of different authentication techniques may be used (e.g., Kerberos, RSA, etc.), some of which involve multiple communications between the Media System 108 and the Content Replacement System 110. If the authentication is not (646) valid, then the process ends (647), and no replacement media content is sent to the Media System 108. If the authentication message is valid (648) and the Content Replacement System 110 is able to authenticate the request, then the content replacement selects (650) replacement media content in accordance with predefined criteria. One having ordinary skill in the art would readily understand that any authentication process or procedure known in the art could be used to authenticate communications between the Media System 108 and the Content Replacement System 110.

It should be noted that the media device does not request particular replacement media content. Rather, the media device merely reports a particular set of control data to the Content Replacement System 110, and the Content Replacement System 110 uses the communication from the media device (including one or more of a unique identifier of the media device, and the control data) along with, in some embodiments, additional data stored at the Content Replacement System 110 to determine the best replacement media content. In this way the Content Replacement System 110 can make a sophisticated decision as to what replacement media content is the most suitable for the particular end-user for the particular content replacement opportunity. Moreover, the Media System 108 is not required to do any processing other than extracting the control data and sending it to the Content Replacement System 110.

In some embodiments, parameters (e.g., predefined criteria) are provided by the Replacement Content Provider 112 (e.g., an advertiser). These parameters enable the Content Replacement System 110 to select replacement media content. In some embodiments the parameters indicate that the replacement of an original sequence of media content with replacement media content is authorized (e.g., by an advertiser).

As one example, the control data includes an advertisement identifier and/or an advertisement campaign identifier for the generic advertisement to be overwritten with a targeted replacement advertisement delivered by the Content Replacement System 110. In some embodiments, the parameters identify the specific targeted advertisement that may be inserted as a substitute for the generic advertisement. The advertisement identifier and the advertisement campaign identifier are used by the Content Replacement System 110 to select an advertisement that is authorized by the advertiser to overwrite the broadcast advertisement based on parameters provided by the Replacement Content Provider 112 (e.g., advertiser) and maintained in a database in the Content Replacement System 110.

Similarly, a request for replacement media content may include parameters that enable the Content Replacement System 110 to select advertisements that best match the technical limitations of the Media System 108. For example, such parameters may include: the video profile (e.g., SD, HD and resolution parameters) and the bandwidth (e.g., data rate) of the network connection. In a complementary implementation, these parameters inform the content replacement server to assist in formatting or transcoding the substitute advertisement video so it is technically compatible with the Media System 108.

In some embodiments, a request for replacement media content includes parameters that enable the Content Replacement System 110 to select advertisements that target the viewer based on program context. These parameters enable the Content Replacement System 110 to select advertisements that best match the interests of the viewer based on the characteristics of the content being viewed. Content characteristics can also be referred to as content properties or content metadata. Content metadata that would help the Content Replacement System 110 select an advertisement that targets a typical viewer of said content include the rating of the content and/or the genre of the content (e.g., Kids, Sports, Financial News, etc.) Content metadata can be obtained in many ways. One way to obtain content metadata is by extracting the metadata from guide listings data. Another way of obtaining content metadata is where the control data includes content metadata.

A request for replacement media content may also include parameters that enable the Content Replacement System 110 to select advertisements that target the viewer based on the viewer demographic, psychographic or behavioral information. These parameters enable the Content Replacement System 110 to select advertisements that best match the interests of the viewer based on the viewer's demographic information.

An example of demographic information is the Media System 108 location, such as a zip code. Media System 108 location information may be stored on the Media System 108 directly and can then be sent directly as a parameter in the request for replacement media content. In some cases, Media System 108 location information may not be stored on the Media System 108 directly however it can be determined at the back-end by mapping the media system identifier to the location in an account database or another database within which there is a mapping of the media system identifier to its owner's home address. One example of such a database is a product registration database populated at the Media System 108 purchase point or populated by way of a registration mechanism such as in the case of a warranty registration. In the case where media system location information is not stored directly on the Media System 108, a parameter in the request from the Media System 108 would include the identifier. The identifier would be used by a Content Replacement System 110 component as a key into a database at the back-end to resolve the media system location information. This location information would be used to select an advertisement that targets the derived location.

In some embodiments, additional information about the end-user of the Media System 108 is provided by one or more of: a Content Provider 102 (e.g., a Content Provider 102 knowing what premium stations the end-user has purchased), a Content Distributor 106 (e.g., a cable network having data about what channels the end-user watches); a manufacturer of the Media System 108 (e.g., information filled out on a warrantee card); and a service provider to the end-user of the Media System 108 (e.g., a cell phone provider having information about what area codes the end-user calls the most and what kind of cell phone the end-user owns). In some embodiments this user data (e.g., data about the end-user) may be stored in the Content Replacement System 110 and used by the Content Replacement System 110 to select replacement media content.

The Media System 108 receives (652) the replacement content and decodes (654) the replacement media content. In accordance with some embodiments, the Content Replacement System 110 receives and stores (630-D) usage data from the decoder/multiplexer when the replacement media content is decoded. After receiving and decoding the replacement media content, the Media System 108 presents (656) the replacement media content to the end-user of the Media System 108 instead of the first sequence of media content. In some embodiments, the replacement media content has an end, and the Media System 108 detects the end of the replacement media content and ceases to present the replacement media content and presents the first sequence of media content.

As one example, an end-user is watching television channel "42," the television detects that a targeted advertisement spot is coming up in eight seconds. In response to detecting the control data, the television requests targeted advertisement content from the Content Replacement System 110 over an internet connection. After authenticating the request, the Content Replacement System 110 sends a targeted advertisement, which is selected based on known demographic information about the end-user or the television of the end-user (e.g., provided when the end-user purchased the television). The replacement media content is delivered to the end-user's television over the internet connection and is played on the television instead of the regular advertisement. When the targeted advertisement ends, the channel that the end-user was watching is redisplayed.

In accordance with some embodiments, receiving the first sequence of media content includes receiving it from a managed television network, such as a satellite network, radio frequency broadcast network, internet protocol television system or cable network, while accessing the replacement media content includes accessing an unmanaged IP network, such as the Internet, or an IP network managed by another, such as in a self-contained hotel network. In a related embodiment, the method may make use of a virtual second communication network where the second communication network differs from the first communication network on one or more of layers one through six of the Open Systems Interconnection (OSI) network layer stack. In other words, the second communication network can be a virtualized separate network.

In accordance with some embodiments, while presenting the replacement media content to the end-user, the Media System 108 receives (658) a request to select a second sequence of media content (e.g., to change from channel "42" to channel "10"). In some embodiments the Media System 108 sends a request to the Content Distributor 106 for the second sequence of media content, and the Content Distributor 106 delivers (660) sequence of media content that is, in accordance with some embodiments, being provided (661) by the Content Provider 102. The Media System 108 receives (662) the second sequence of media content, and presents (664) the second sequence of media content to the end-user. In some embodiments, the Content Distributor 106 is sending the Media System 108 a plurality of sequences of media content, and the Media System 108 merely demultiplexes and decodes the requested second sequence of media content. In either case, the Media System 108 ceases presenting the replacement media content; and, instead presents (664) the second sequence of media content to the end-user.

Thus, even though the Media System 108 has replaced the content and is no longer displaying the first sequence of media content (e.g., the first channel that the end-user was watching), the Media System 108 is still able to detect and respond to a request of the end-user to change the sequence of media content. For example, the end-user is watching channel "42," an advertisement is replaced with a targeted advertisement. Before the targeted advertisement is finished, the end-user switches to channel "10." In response, instead of continuing to display the targeted advertisement, the television switches to the new channel (e.g., channel "10").

In some embodiments, while presenting the second sequence of media content to the end-user, the media device continues to advance the replacement media content (e.g., the targeted advertisement continues to advance). In some embodiments, the end-user selects the first sequence of media content after having previously selected the second set of media content. (e.g., the end-user switches back from channel "10" to channel "42"). The media device receives a request (668) for the first sequence of media content; and in response to the request for the first sequence of media content, if the request was (672) made within a predefined time (e.g., the length of the replacement media content, so that the replacement media content is still advancing), the Media System 108 finishes presenting (674) the replacement media content. However, if the request was not (670) made within a predefined time (e.g., the length of the replacement media content, so that the replacement media content has ended), the Media System 108 resumes presenting (638) the first sequence of media content to the end-user.

Similarly, in another embodiment, while the replacement subset of media content is being sent to the viewer display, the Media System 108 continues to monitor the first sequence of media content for changes in the characteristics of the sequence, such as changes in volume, changes in channels, invocation of Emergency Alert System (EAS), invocation of an on-screen program guide, etc., and is responsive to such changes by either switching back to the first sequence of media content (e.g., television stream) from the replacement media content (e.g., targeted advertisement stream), or makes changes in characteristics of the replacement media content (e.g., targeted advertisement stream) received over the alternate distribute network to mirror changes in the monitored first sequence of media content (e.g., original television stream) to the replacement media content.

In some embodiments, the Content Replacement System 110 sends (676) the stored usage data to the Content Provider 102 and/or the Content Distributor 106. The Content Provider 102 and the Content Distributor 106 receive (678A, 678-B) the usage data and may use that data to improve their advertising strategies. In some embodiments, the Content Replacement System 110 stores the usage data and sells (680) the usage data.

Steganographic Triggers

Figure 7:
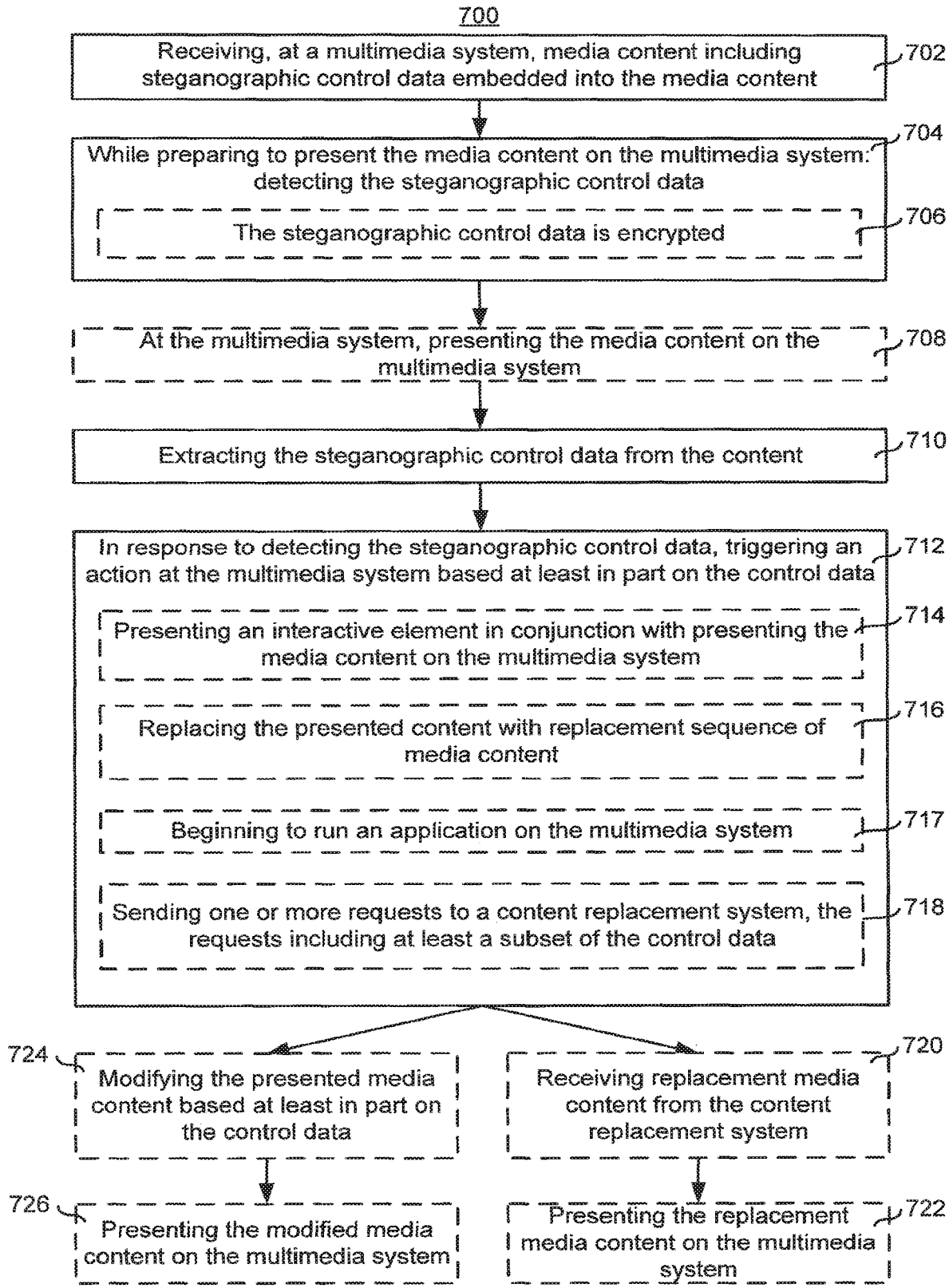
FIG. 7 is a flow diagram of a method of triggering actions using steganographic data in accordance with some embodiments.

Attention is now directed toward FIG. 7, which illustrates a method 700 of triggering actions using steganographic data in accordance with some embodiments. FIG. 7 includes a flowchart representing a method for triggering actions using embedded steganographic data. This method may be governed by instructions that are stored in a non-transitory computer readable storage medium and that are executed by one or more processors of one or more computing systems. Each of the operations shown in FIG. 7 may correspond to instructions stored in memory or a computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Steganography includes inserting a message into a plurality of data such that the presence of the message within the data is concealed from detection. In some embodiments of digital steganography, this means including steganographic coding inside of a transport layer, such as a document file, image file, program or protocol (e.g., by adjusting the chrominance of one out of every 100,000 pixels to correspond to a letter in the alphabet, a change so subtle that someone not specifically knowing where and how to look for it is unlikely to notice it.) Steganographic data (e.g., watermarks) may be inserted into media content using any method known to those skilled in the art. As one example, U.S. Pat. No. 6,411,725, hereby incorporated by reference in its entirety, teaches the application of watermarks in video signals to mark individual objects within a video frame with additional data.

An advantage of using steganographic triggers instead of control data that is not steganographically encoded is that steganographically encoded control data is able to pass intact through most data filters, such as bandwidth shaping filters, that strip out-of-band data but leave intact the in-band video and audio programming data (e.g., including the control data that is steganographically incorporated into the audio or video signal). In accordance with some embodiments, using steganography to embed the splice insert control data and associated content replacement opportunity (e.g., "ad avail") information within the content stream itself, the potential problem of data and control data stripping by any Content Distributors 106 (cable television company, internet protocol television provider, satellite network, etc.) is reduced or eliminated.

Accordingly, a method and system is disclosed for using steganographic data to trigger events. A Media System 108 receives (702) media content including steganographic control data embedded into the media content. While preparing to present the media content on the Media System 108, the Media System 108 detects (704) the steganographic control data. In some embodiments, preparing to present media content includes demultiplexing and decoding media content containing the steganographic control data, as discussed in greater detail above. In some embodiments preparing to present media content includes decoding a stream of content.

In some embodiments the steganographic control data is encrypted (706). In this embodiment, even if the steganographic control data is detected, the content of the steganographic message will be concealed. In some embodiments the steganographic control data is decrypted at the Media System 108, while in other embodiments, at least a portion of the steganographic control data is sent to a second computing system (e.g., a Content Replacement System 110) without decrypting the control data. In some embodiments, the second computing system decrypts the encrypted control data and sends a response to the Media System 108 (e.g., instructions to perform an action or replacement media content). In this embodiment, the Media System 108 is never aware of the contents of the encrypted control data.

In some embodiments the media content is presented (708) by the Media System 108, prior to any action being taken with respect to the steganographic control data. For example, while an end-user is viewing a stream of video content, a control data detector in the Media System 108 is concurrently looking for steganographic control data in the stream of video content.

When the Media System 108 detects the steganographic control data it also extracts (710) the steganographic control data from the media content. In response to detecting the steganographic control data, the Media System 108 triggers (712) an action at the Media System 108 based at least in part on the control data. In some embodiments the action is based on the presence of the control data (e.g., upon detecting embedded control data, sending an encrypted portion of the control data to a second computing device). In some embodiments, the action is based at least in part on the content of the control data (e.g., receiving control data in a television stream indicating that a replacement advertisement should be requested and then sending a request to a Content Replacement System 110 for a replacement advertisement).

In some embodiments, triggering an action includes presenting (714) an interactive element in conjunction with presenting the media content on the Media System 108. For example a selectable object may appear on the display of the Media System 108. In some embodiments an overlay appears on the display of the Media System 108.

In some embodiments triggering an action includes replacing (716) the presented content with replacement media content. For example, in response to detecting the steganographic data, the Media System 108 changes channels or displays a prerecorded video message. In some embodiments, triggering the action includes invoking (717) an application on the Media System 108. For example, in response to detecting steganographic control data, the Media System 108 begins to record the current program onto a hard drive on a digital video recorder, thus reducing the amount of time spent by the end-user trying to set up the digital video recorder to record the television show. In an alternative embodiment, the application is an interactive program that works in a coordinated fashion with television programming being watched on a television.

In some embodiments, the triggering action at the Media System 108 includes sending (718) a request to a Content Replacement System 110, the request including at least a subset of the control data (optionally, an encrypted subset of the control data), as described in greater detail above with reference to FIGS. 6A-6F. As one example, steganographic control data is detected in television broadcast feed by a Media System 108 indicating a generic advertisement to replace with a targeted advertisement; the Media System 108 extracts the steganographic control data; the Media System 108 sends the steganographic control data to a Content Replacement System 110; the Content Replacement System 110 selects a targeted replacement advertisement and sends it to the Media System 108; and the Media System 108 replaces the generic advertisement with the targeted advertisement. In some embodiments the method further includes receiving (720) replacement media content from the Content Replacement System 110; and presenting (722) the replacement media content on the Media System 108. Such a system and method is discussed above in greater detail with reference to FIGS. 6A-6F, where the control data is steganographic control data.

In some embodiments, the Media System 108 modifies (724) the presented media content based at least in part on the control data; and presents (726) the modified media content on the Media System 108. For example, upon detecting, extracting and interpreting steganographic control data, a television may switch inputs from a managed television network to an unmanaged network such as the Internet as described in greater detail above with reference to FIGS. 6A-6F. For example, the television may switch inputs in order to, for example, view an advertisement or obtain access to view a pay-per-view channel by contacting a web site; display an "unauthorized access" message; request additional data from the television network such as a movie for later viewing, program information about the signal being viewed, or times the current program will be rebroadcast; download electronic program guide (EPG) data, news ticker data, or real-time sports statistics; transmit identifying information such as channel, date, and time to a viewer statistics reporting service; or display caller identification information for a voice-over-IP telephone service.

In some embodiment, modifying the media content may include altering the appearance of the programming presentation, for example by reducing the size of the image and optionally placing it on the screen with a variety of other images or other reduced sized programming. Additionally, in some embodiments, the audio may be altered by augmenting or replacing the audio with audio generated from the Media System 108, or other audio available from the Content Distributor 106.

Content Replacement Using Fingerprints

Figure 8:
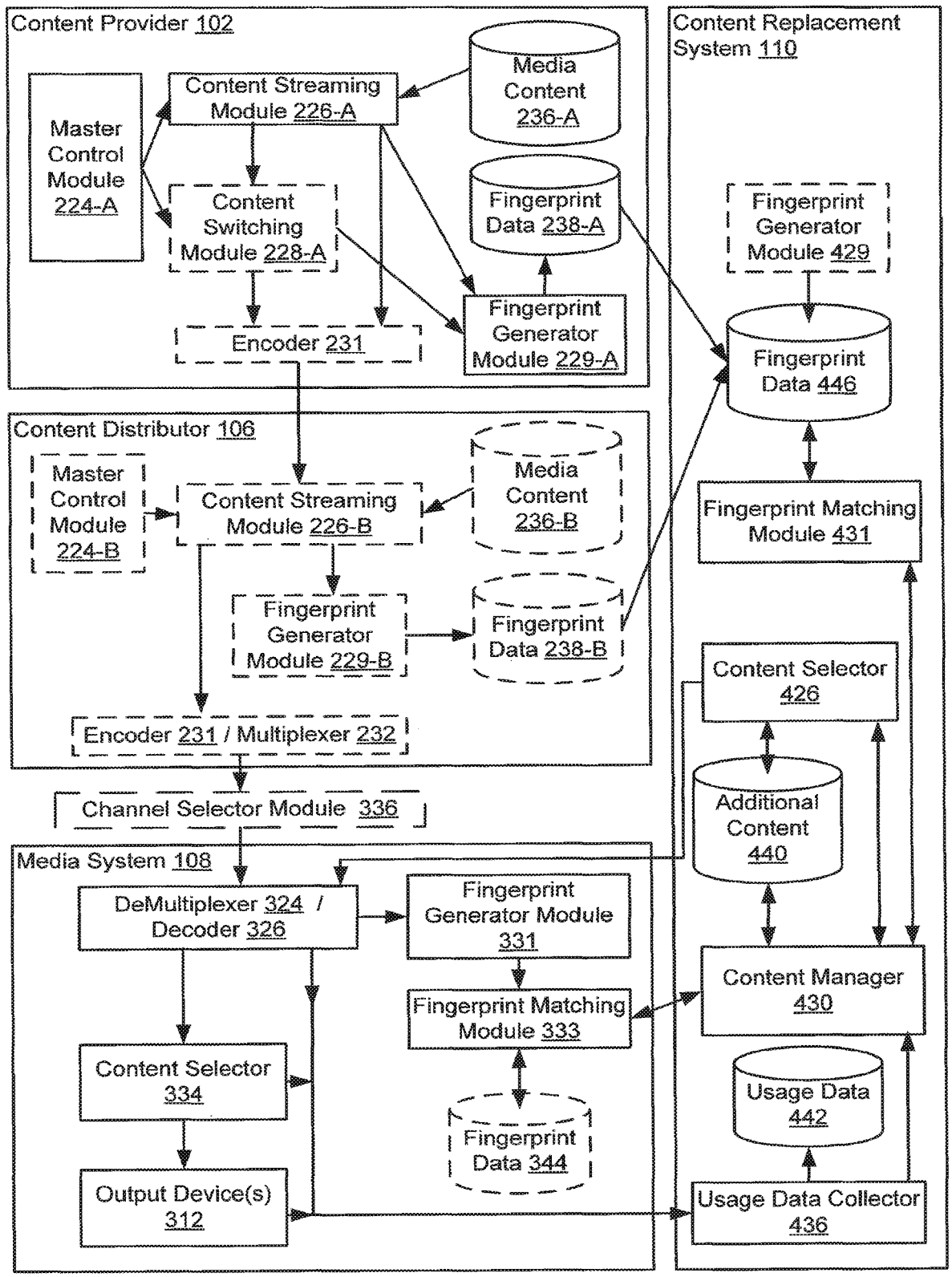
FIG. 8 is a block diagram illustrating the flow of data through a distributed system for distributing media content to a media system using fingerprint detection in accordance with some embodiments.

Attention is now directed to FIG. 8, which illustrates the flow of data through a distributed system for distributing media content to a media device in accordance with some embodiments (e.g., embodiments where media content is replaced using fingerprint detection and matching). Some functional components, such as the network communication interfaces, have been omitted for clarity. Media content for presentation on a Media System 108 (e.g., television shows for display on a television) begins as source media content 236-A at the Content Provider 102. The source media content is retrieved from the media content database 236-A by one or more content streaming modules 226-A, which are controlled by the master control module 224-A to create a first sequence of media content by combining several sequences of media content into the first sequence of media content and/or inserting interstitial sequences of media content into a single sequence of media content. In some embodiments the first sequence of media content is created using a content switching module 228-A.

In accordance with some embodiments the media content from the content streaming module and the content switching module is uncompressed (e.g., unencoded) media content. The uncompressed media content is passed to a fingerprint generator module 229-A from the content streaming module 226-A or the content switching module 228-A. The fingerprint generator module 229-A generates fingerprints based on the media content and stores fingerprint data 238-A. In some embodiments, at least a subset of the fingerprint data 238-A is sent to the Content Replacement System 110.

In some embodiments the fingerprints are based on luminance sampling techniques. In one embodiment, luminance sampling includes identifying the luminance of one or more predefined blocks in predefined positions in a video frame. In some embodiments, a block is a subset of the pixels in a frame (e.g., an 8×8 grid of contiguous pixels). The luminance of these predefined blocks are compared to the luminance of the predefined blocks in a reference video frame, and if the relative luminance of the blocks in the video frame is within a predefined threshold of the luminance of corresponding blocks in the reference video frame, the video frame fingerprints match. In other embodiments, the luminance sampling includes determining the change in the luminance of one or more visual block in predefined positions over a sequence of video frames. Similarly, for this form of luminance fingerprinting, when the changes in luminance of the blocks in the sequence of frames match the changes in luminance in corresponding blocks in a reference sequence of frames within a predefined threshold, the video fingerprints match. While the foregoing embodiments have been described particularly with respect to luminance sampling fingerprinting, it should be understood that any other video fingerprinting technique could be used without departing from the presently claimed invention.

In some embodiments, after the fingerprints have been generated, or (optionally) while the fingerprints are concurrently being generated, the sequence of media content is encoded in an encoding module 231 into a format suitable for delivery to the Content Distributor 106 (e.g., using an audio and/or video encoding module to produce a profile of MPEG 2 or H.264 that is compatible with the transmission requirements of a given Content Distributor 106).

Take, for example, a television network creating a sequence of media content for a television channel. The sequence of media content includes 45 minutes of a television show and thirty half minute advertisements. The advertisements and the television show are stored in the media content database 236-A and are streamed through the content streaming module. The master control module 224-A instructs the content streaming module 226 which media content to stream and (optionally) uses the content switching module 228 to switch between advertisements and the television show. After the media content has been assembled into a sequence of media content, but before the content has been encoded, fingerprints of the unencoded media content are created (e.g., at predefined intervals such as every 5 seconds).

The Content Distributor 106 receives the sequence of media content from the Content Provider 102 and integrates the sequence of media content into a distribution medium such as a cable network, satellite network, IPTV network, web network, local radio frequency broadcast, mobile network, etc. In some embodiments, the Content Distributor 106 decodes an encoded sequence of media content from the Content Provider 102. When the Content Distributor 106 is configured to insert additional content (e.g., local advertisements), the Content Distributor 106 has a content streaming module 226-B for inserting media content 236-B (e.g., replacement geographically specific advertisements) into the sequence of media content, as directed by a master control module 224-B. In some embodiments, the Content Distributor 106 also has a fingerprint generator module 229-B for generating fingerprints from sequence of media content and stores fingerprint data 238-A. In some embodiments, at least a subset of the fingerprint data 238-B is sent to the Content Replacement System 110. In some embodiments, after adding any replacement media content to the sequence of media content the Content Distributor 106 encodes the sequence of media content using an encoder 231 into a format suitable for distribution to the Media System 108. When there are a plurality of sequences of media content, the Content Distributor 106 multiplexes a plurality of sequences of media content using multiplexer module 232 before passing the sequences of media content off to the Media System 108.

In accordance with some embodiments, the sequence(s) of media content is passed off to the Media System 108 through a communication network associated with the Content Distributor 106 (e.g., a cable network or a satellite network). In some embodiments the sequence of media content is passed to the Media System 108 along with a plurality of other sequences of media content, and the plurality of sequences of media content pass through a channel selector module 336, which selects a single sequence of media content to deliver to the Media System 108 in accordance with instructions received from the Media System 108. In some embodiments the channel selector module 336 is at the Media System 108 (as shown in FIG. 3) and the plurality of sequences of media content are passed to the channel selector module in the Media System 108.

At the Media System 108 the, sequence(s) of media content are passed to a multi-format demultiplexer 324/decoder 326, which demultiplexes (if necessary) and decodes the selected sequence of media content (e.g., decodes an encoded video stream from one or more of MPEG2, H.264, VC1, Quicktime, or other video format). The demultiplexed and decoded sequence of media content is passed to a fingerprint generator module 331 in the Media System 108, which analyzes the content to generate fingerprints. Once fingerprints have been generated, they are passed to a fingerprint matching module 333, which compares the generated fingerprints with fingerprint data 334 received from the Content Replacement System 110. The fingerprint matching module communicates with the content manager 430 in the Content Replacement System 110 to request replacement media content based on the generated fingerprint(s). In some embodiments, the fingerprint matching module 431 in the Content Replacement System 110 performs additional steps to identify the media content associated with the fingerprint received from the Media System 108, including comparing the received fingerprint to fingerprint data 446 stored in the Content Replacement System 110. In some embodiments the fingerprint data 446 includes only the fingerprint data received from the Content Provider 102 and the Content Distributor 106. In some embodiments the fingerprint data also includes fingerprints and associated data generated by a fingerprint generator module 429 at the Content Replacement System 110. The process for identifying media content associated with a fingerprint is discussed in greater detail below with reference to FIGS. 9A-9F.

Once the content associated with the received fingerprint has been identified, the content manager 430 passes information associated with the identified media content (e.g., an advertiser identifier, an advertisement campaign identifier, advertisement duration, advertisement pre-roll period or advertisement start time) to the content selector 426, which selects appropriate replacement media content from the additional content database 440 based on the information provided by the content manager 430 about the parameters of the sequence of media content (e.g., the length of the advertisement to be replaced, the advertising campaign, etc.) and (optionally) data about the Media System 108 that is sent from the Media System 108 or stored on the Content Replacement System 110. The Content Replacement System 110 sends replacement media content to the decoder 326 in the Media System 108.

In some embodiments the replacement media content arrives at the demultiplexer 324/decoder 326 in MPEG2 transport streams, in MP4 containers, or some other type of transport. Additionally, said replacement media content may arrive at the demultiplexer 324/decoder 326 in MPEG2, H.264, VC1, Quicktime, or other video format. In some embodiments, the replacement media content is streamed over a network connection (e.g., the internet) and the multiformat demultiplexer 324/decoder 326 has attached storage to buffer the some portion of the beginning of the replacement sequence of media and any related information, mitigating the effects of jitter introduced through streaming over the internet.

The decoder 326 decodes the replacement media content and passes the decoded replacement media content to the content selector 334, which switches over from the original sequence of media content to the replacement media content at a time that is, in accordance with some embodiments, determined in accordance with the identified media content associated with the fingerprint (e.g., the switch synchronizes the timing of the cutover from the chosen television channel to the targeted advertisement being delivered over the Internet from the Content Replacement System 110). The output device 312 then presents the replacement media content. In some embodiments, while the sequence of media content is being presented on the output devices 312, the demultiplexer 324/decoder 326 continues to demultiplex and decode the original sequence of media content.

After the replacement media content has ended the content selector 334 automatically switches back to the original sequence of media content. In some embodiments the original sequence of media content continues to advance while the replacement media content is presented (e.g., it restarts at a later point in the sequence, such as by replacing one advertisement in the sequence with a targeted advertisement of the same length). In some embodiments the original sequence of media content does not continue to advance (e.g., it restarts at the point that it was when the replacement media content began to play, such as by inserting an advertisement into the middle of a movie without replacing any of the content of the movie, essentially pausing the movie while the advertisement is displayed).

At various points in this process the Media System 108 provides usage data to a usage data collector 436 in the Content Replacement System 110. For example, the content selector 334 informs the usage data collector 436 of the state changes at the content selector 334. Said state changes including information about the delivery of replacement media content (e.g., a targeted ads) to an output device 312 (e.g., a television). The usage data is stored in a usage data database 442 for later use by the Content Replacement System 110. For targeted advertisement, when the content selector 334 is located in the output device (e.g., a video switch in a television) usage data is more valuable than general "rating" data (e.g., "Nielsen Ratings") because it includes information about whether the television was turned on, and thus substantially increases the accuracy of determining whether the targeted advertisement was watched.

Attention is now directed to FIGS. 9A-9F, which include a flowchart representing a method 900 for remotely controlling a Media System 108 (e.g., a consumer electronic device), according to certain embodiments. This method may be governed by instructions that are stored in a non-transitory computer readable storage medium and that are executed by one or more processors of one or more computer systems. Each of the operations shown in FIGS. 9A-9F may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In accordance with one embodiment, the Content Provider 102 and the Content Replacement System 110 perform a series of operations (901-A) and (901-B), including in some embodiments, receiving instructions from a Replacement Content Provider 112 (e.g., receiving instructions from an advertiser indicating the circumstances under which advertisements in a television broadcast stream are to be replaced with targeted advertisements provided by the advertiser). As one example, a car manufacturer, purchases a half minute advertising placement opportunity with a Content Provider 102 (e.g., a television network) and pays a content replacement service to insert a targeted advertisement in the advertisement placement opportunity. The Content Replacement System 110 obtains (902) replacement media content (e.g., a targeted advertisement) from the Replacement Content Provider (112 in FIG. 1) and obtains (903) content selection parameters from the Replacement Content Provider 112 that indicate when the replacement media content should be inserted into a sequence of media content. In some embodiments those parameters include the advertiser identifier, the advertising campaign identifier, a unique identifier of the device playing the advertisement and/or the starting time of the advertisement.

The Content Provider 102 obtains (904) source media content. In some embodiments, the Content Provider 102 obtains the source media content from a satellite link to a content source (e.g., a television studio). Typically, this data is processed at the Content Provider 102 into a form that lends itself to storage. Additionally, media content can be received from a content source by accessing the content source through a proprietary network or a public network such as the Internet. In some embodiments, a Content Distributor 106 physically delivers a storage medium containing a digital copy of a programming content to the Content Provider 102. In some embodiments, media content is acquired and processed for transmission to viewers in real time, and not first stored (e.g., a live satellite feed of a football game). In some embodiments acquiring and processing media content for transmission to viewers in real time includes buffering at least a portion of the content (e.g., transmitting the media content with an eight second delay to compensate for any variations in the rate at which the media content is being received by the Content Provider 102).

In accordance with some embodiments, the Content Provider 102 uses the source media content to create a first sequence of media content (906), such as a television show that includes a plurality of 30-second advertisements. After creating the first sequence of media content, the Content Provider 102 generates (908) fingerprint data including fingerprints of the first sequence of media content, and stores (909) the fingerprint data including the fingerprints and, optionally one or more of a time stamp, the channel, and the time until the next advertisement begins in the data structures at the Content Provider 102. The process for generating a fingerprint in accordance with some embodiments is described in more detail above with reference to FIG. 8. In some embodiments, the fingerprint data is sent to the Content Replacement System 110. The Content Provider 102 sends (910) the stream of media content to a Content Distributor 106 or, optionally, sends the stream of media content directly to a Media System 108.

The Content Distributor 106 receives (911) the first sequence of media content from the Content Provider 102 and, optionally, adds (912) media content to the first sequence of media content. For example, the Content Distributor 106 may be authorized to replace a subset of the advertisements in a television channel with local advertisements. In some embodiments, after adding any media content to the first sequence of media content, the Content Distributor 106 generates (914) fingerprint data including fingerprints of the first sequence of media content and stores (915) the fingerprint data including the fingerprints and, optionally, one or more of a time stamp, the channel, and the time until the next advertisement begins in the data structures at the Content Distributor 106. The process for generating a fingerprint in accordance with some embodiments is described in more detail above with reference to FIG. 8.

It should be understood that, in some embodiments, only the Content Provider 102 generates fingerprints of the first sequence of media content, while in other embodiments, only the Content Distributor 106 generates fingerprints of the first sequence of media content. Additionally, in some embodiments, both the Content Distributor 106 and the Content Provider 102 generate fingerprints of the first sequence of media content. (For example, both a television network and a cable company have a relationship with a targeted advertiser and the television network and the cable company each generate fingerprints of the video feed/stream so as to enable particular positions within the sequence of media content to be identified so that both the Content Provider 102 and the content distributor are able to identify one or more advertisements in the same television feed for replacement with a targeted advertisement).

In some embodiments, the fingerprint data generated by the Content Provider 102 and the Content Distributor 106 are sent to the Content Replacement System 110, which stores (916) the fingerprint data. In some embodiments, the Content Replacement System 110 generates (917) its own fingerprints and stores the fingerprints and, optionally, one or more of a time stamp, the channel, and the time until the next advertisement begins in the data structures at the Content Distributor 106.

It should be understood that typically the Content Provider 102 and the Content Distributor 106 generate the fingerprint data, because the Content Distributor 106 and the Content Provider 102 have access to the first sequence of media content before it is broadcast to the Media System 108 and thus can generate the fingerprint data so that it can be used by the Media System 108 to identify replaceable media content in the first sequence of media content and insert the replacement media content. However, when the Content Replacement System 110 has access to the content before it is displayed to the end-user (e.g., if the Content Replacement System 110 coordinates with the Media System 108 to introduce a 5 minute delay in the presentation of the first sequence of media content after it is received by both the Media System 108 and the Content Replacement System 110), then the Content Replacement System 110 can generate the fingerprint data that is used by the Media System 108, as described in greater detail below.

In some embodiments, fingerprint data is sent (918) to a Media System 108 from the Content Replacement System 110. In some embodiments, the fingerprint data includes all of the fingerprint data stored at the Content Replacement System 110. In some embodiments, the Content Replacement System 110 selects (919) a subset of the data based on usage history of the Media System 108. For example, if the Content Replacement System 110 has fingerprint data associated with one hundred television channels, and usage data for a particular Media System 108 indicates that the particular Media System 108 is only regularly used to watch ten of those channels, then the Content Replacement System 110 selects the subset of the fingerprint data that includes the fingerprint data associated with those ten channels and only sends the fingerprint data associated with those ten channels. In this example, by sending only a subset of the fingerprint data, the amount of data that is transmitted to the Media System 108 (and consequently the amount of bandwidth used to transmit that data) is reduced by approximately ninety percent. Similarly, sending only a subset of the fingerprint data reduces the use of storage space at the Media System 108. The Media System 108 receives (920) the fingerprint data from the Content Replacement System 110 and stores the fingerprint data (921) in local data structures for use in identifying sequences of media content and requesting replacement media content, as described in greater detail below.

The Content Distributor 106 prepares (922) the media content for delivery to a Media System 108. In some embodiments the Media System 108 sends a request indicating the selection (924) of a first sequence of media content (e.g., a first television channel). In this embodiment, the Content Distributor 106 delivers (926) the first sequence of media content to the Media System 108. The first sequence of media content is decoded (928) and presented (938) by the Media System 108. For example, in a switched digital video system, the end-user requests to view channel "42" of a plurality of cable channels, the request goes out over the communications network and a single channel is returned to the end-user and decoded on the end-user's home equipment (e.g., a cable box and a television). In some embodiments the decoder reports usage data to a Content Replacement System 110, this reporting may occur over an alternate communication network (e.g., a second communication network). The Content Replacement System 110 stores (930-A) the usage data, as described in greater detail below.

In some embodiments, the first sequence of media content is a sequence of video content including video content requested by the end-user and advertisement video content. In some embodiments, the replacement media content is a sequence of video content including one or more replacement advertisements.

In some embodiments, the end-user does not send a network request for a first sequence of media content, but rather the Content Distributor 106 delivers (932) a plurality of sequences of media content (e.g., multiplexed television channels). The Media System 108 receives the plurality of sequences of media content (e.g., multiple television channels) and the end-user selects (934) a first sequence of the media content. In some embodiments, the Media System 108 demultiplexes the plurality of sequences of media content and decodes (936) the selected first sequence of media content. In some embodiments usage data is sent by the Media System 108 to the Content Replacement System 110 and stored (930-B) for later use.

In some embodiments, the Media System 108 receives the first sequence of media content from a media Content Distributor 106 over a first communication network (e.g., a managed content distribution network such as a cable network or a satellite network), where fingerprint data has been generated from the first sequence of media content in order to facilitate the replacement of media content in the first sequence of media content with replacement media content. The Media System 108 presents (938) the first sequence of media content to an end-user of the Media System 108. While presenting the first sequence of media content to the end-user, the Media System 108 generates (939) a fingerprint of the first sequence of media content. In some embodiments, the fingerprint is generated before the first sequence is actually displayed to the end-user, so that the first sequence of media content can be replaced with replacement media content before it is displayed to the end-user.

In some embodiments, the Media System 108 sends (940) a request to the Content Replacement System 110 for replacement media content including the fingerprint. For example, in embodiments where the Content Replacement System 110 does not send any fingerprint data to the Media System 108, the Media System 108 must send the fingerprint to the Content Replacement System 110, and then the fingerprint is compared (942) with reference fingerprints at the Content Replacement System 110. If a matching fingerprint is not found (944), then the process ends (945). If a matching fingerprint is found (946), and the first sequence of media content is identified by the Content Replacement System 110, then the Content Replacement System 110 proceeds to select replacement media content, as described in greater detail below. In accordance with some embodiments, the Media System 108 stores (930-C) usage data and/or sends the usage data to a Content Replacement System 110 for later use.

In embodiments where the network connection is asymmetrical so that the Media System 108 has a much higher download bandwidth than upload bandwidth, it is beneficial for the Content Replacement System 110 to send fingerprints to the Media System 108 and have some of the matching of fingerprints take place at the Media System 108, instead of having the Media System 108 repeatedly sending fingerprint data to the Content Replacement System 110 for matching. This arrangement is beneficial, because sending the fingerprint data to the Media System 108 uses the relatively unlimited download bandwidth rather than the relatively limited upload bandwidth of the Media System 108. Thus, in some embodiments, it is advantageous to store at least a subset of reference fingerprint data including reference finger prints at the Media System 108, where the reference fingerprint data is predetermined fingerprint data (e.g., data originally generated by the Content Replacement System 110, the content provider and/or the Content Distributor 106). The Media System 108 compares (948) the generated fingerprint to the reference fingerprints in the subset of reference fingerprint data received from the Content Replacement System 110. If a match is not found (950), then the Media System 108 sends (951) a request for replacement media content, the request including the generated fingerprint. As an illustrative example, when the Content Replacement System 110 only sends fingerprint data to the Media System 108 including fingerprints for the ten most frequently watched television channels, if the Media System 108 is currently displaying a sequence of media content for a television channel that is not one of the ten most frequently watched television channels, the Media System 108 will not have predetermined fingerprint data that matches the sequence of media content and will have to send the generated fingerprint to the Content Replacement System 110 for comparison with the entire set of reference fingerprints stored at the Content Replacement System 110.

In this embodiment, the fingerprint is received at the Content Replacement System 110 and is compared (942) with additional reference fingerprints at the Content Replacement System 110. If a matching fingerprint is not found (944), then the process ends (945). If a matching fingerprint is found (946), thereby identifying the first sequence of media content, then the Content Replacement System 110 proceeds to select replacement media content, as described in greater detail below.

In contrast, if a match to the generated fingerprint is found (952), thereby identifying the first sequence of media content, the Media System 108 sends (953) a request for replacement media content to the Content Replacement System 110, the request including data indicating that the fingerprint matches a reference fingerprint in the subset of reference fingerprint data. For example, if the first sequence of media content that is being received by the Media System 108 is one of the ten most frequently watched television channels, and the Media System 108 identifies a reference fingerprint identifying the channel and the current time of the channel. In this example, the request to the Media System 108 includes an identifier of the channel and a timestamp of the channel and sends a request to the Content Replacement System 110 requesting any replacement media content (e.g., targeted advertisements) for the identified channel.

In some embodiments the request includes an authentication message. A number of different authentication techniques may be used (e.g., Kerberos, RSA, etc.), some of which involve multiple communications between the Media System 108 and the Content Replacement System 110. If the authentication is not valid, then the process ends, and no replacement media content is sent to the Media System 108. If the authentication message is valid and the Content Replacement System 110 is able to authenticate the request, then the content replacement selects replacement media content in accordance with predefined criteria. An exemplary authentication process is described in greater detail above with reference to FIG. 6C. One having ordinary skill in the art would readily understand that any authentication process or procedure known in the art could be used to authenticate communications between the Media System 108 and the Content Replacement System 110.

It should be noted that the media device does not request a particular replacement media content. Rather, the media device merely reports a particular fingerprint or fingerprint match (e.g., an identified first sequence of media content) to the Content Replacement System 110, and the Content Replacement System 110 uses the request from the media device (including one or more of a unique identifier of the media device, and fingerprint or fingerprint match) along with, in some embodiments, additional data stored at the Content Replacement System 110. The Content Replacement System 110 identifies (954) the first sequence of media content from the matched reference fingerprint (e.g., the Content Replacement System 110 determines that the first sequence of media content is a particular television channel). The Content Replacement System 110 also uses the matched reference fingerprint to determine (956) a reference position (e.g., a timestamp or number of frames from a content transition point) within the first sequence of media content. In this way the Content Replacement System 110 can make a sophisticated decision as to what replacement media content is the most suitable for the particular Media System 108 and for the particular content replacement opportunity.

The Content Replacement System 110 selects (958) replacement media content in accordance with predefined criteria. In some embodiments the predefined criteria is based (959) at least in part on the first sequence of media content. In some embodiments the predefined criteria is based (960) at least in part on the reference position within the media content. In some embodiments, the predefined criteria is based (961) at least in part on information about the end-user of the Media System 108 such, including replacement parameters provided by the Replacement Content Provider 112 (e.g., an advertiser). These parameters enable the Content Replacement System 110 to intelligently select replacement media content. In some embodiments the parameters indicate that the replacement of a portion of the first sequence of media content with replacement media content is authorized (e.g., that the replacement of a non-targeted advertisement with a targeted advertisement is authorized by the advertiser).

As one example of this method, the reference fingerprint is used by the Content Replacement System 110 to identify a sequence of media content (e.g., a television channel and/or a particular advertisement or television show within the television channel) and a timestamp within the sequence of media content (e.g., the location of the content that is to be replaced, such as a non-targeted advertisement). A particular position (e.g., a position relative to the reference position) within the identified first sequence of media content is associated with an advertisement identifier and/or an advertisement campaign identifier for the generic advertisement to be overwritten with a targeted replacement advertisement delivered by the Content Replacement System 110. In some embodiments, the parameters identify the specific targeted advertisement that may be inserted as a substitute for the generic advertisement. The advertisement identifier and the advertisement campaign identifier are used by the Content Replacement System 110 to select an advertisement that is authorized by the advertiser to overwrite the broadcast advertisement based on parameters provided by the Replacement Content Provider 112 (e.g., advertiser) and maintained in a database in the Content Replacement System 110.

Similarly, a request for replacement media content may include parameters that enable the Content Replacement System 110 to select advertisements that best match the technical limitations of the Media System 108. For example, such parameters may include: the video profile (e.g., SD, HD and resolution parameters) and the bandwidth (e.g., data rate) of the network connection. In a complementary implementation, these parameters inform the content replacement server to assist in formatting or transcoding the substitute advertisement video so it is technically compatible with the Media System 108.

In some embodiments, a request for replacement media content includes parameters that enable the Content Replacement System 110 to select advertisements that target the viewer based on program context. These parameters enable the Content Replacement System 110 to select advertisements that best match the interests of the viewer based on the characteristics of the content being viewed. Content characteristics can also be referred to as content properties or content metadata. Content metadata that would help the Content Replacement System 110 select an advertisement that targets a typical viewer of said content include the rating of the content and/or the genre of the content (e.g., Kids, Sports, Financial News, etc.) Content metadata can be obtained in many ways. One way to obtain content metadata is by extracting the metadata from guide listings data.

A request for replacement media content may also include parameters that enable the Content Replacement System 110 to select advertisements that target the viewer based on the viewer demographic, psychographic or behavioral information. These parameters enable the Content Replacement System 110 to select advertisements that best match the interests of the viewer based on the viewer's demographic information.

An example of demographic information is the media system location, such as a zip code. Media System 108 location information may be stored on the Media System 108 directly and can then be sent directly as a parameter in the request for replacement media content. In some cases, media system location information may not be stored on the Media System 108 directly however it can be determined at the back-end by mapping the Media System 108 host device identifier to the location in an account database or another database within which there is a mapping of the media system identifier to its owner's home address. One example of such a database is a product registration database populated at the Media System 108 purchase point or populated by way of a registration mechanism such as in the case of a warranty registration. In the case where media system location information is not stored directly on the Media System 108, a parameter in the request from the Media System 108 would include the identifier. The identifier would be used by a Content Replacement System 110 component as a key into a database at the back-end to resolve the media system location information. This location information would be used to select an advertisement that targets the derived location.

In some embodiments, additional information about the end-user of the Media System 108 is provided by one or more of: a Content Provider 102 (e.g., a Content Provider 102 knowing what premium stations the end-user has purchased), a Content Distributor 106 (e.g., a cable network having data about what channels the end-user watches); a manufacturer of the Media System 108 (e.g., information filled out on a warrantee card); and a service provider to the end-user of the Media System 108 (e.g., a cell phone provider having information about what area codes the end-user calls the most and what kind of cell phone the end-user owns). In some embodiments this user data (e.g., data about the end-user) may be stored in the Content Replacement System 110 and used by the Content Replacement System 110 to select replacement media content.

In some embodiments, before the replacement media content is used to replace the first sequence of media content at the Media System 108, the Content Replacement System 110 verifies that the first sequence of media content is the identified sequence of media content. In one embodiment, the fingerprints discussed above are weak fingerprints (i.e., fingerprints that include a relatively small amount of information, such as a fingerprint that is generated using two blocks of a single frame of the media content) that is not sufficient to uniquely identify the sequence of media content, but is sufficient to identify a likely candidate for the first sequence of media content when correlated with other available information (e.g., the approximate time that the fingerprint was processed). In this embodiment, after the sequence of media content has been preliminarily identified the Media System 108 generates a stronger fingerprint (i.e. a fingerprint that includes a relatively larger amount of information, such as a fingerprint generated using every block in a single frame of the media content) that is sufficient to uniquely identify the media sequence. This strong fingerprint is compared with a corresponding fingerprint for the identified sequence of media content. If the strong fingerprint matches, then the match is verified, and the replacement media content is sent to the Media System 108.

As an example of this embodiment, if the first sequence of media content is a television channel including a television program and a plurality of advertisements, the Media System 108 initially generates weak fingerprints, which are matched (either at the Media System 108 or at the Content Replacement System 110) with reference fingerprints to determine the current channel. The Content Replacement System 110 identifies a targeted advertisement that is going to be displayed on the channel as a replacement for a non-targeted advertisement. However, before the non-targeted advertisement is replaced, the Media System 108 generates a strong fingerprint of the identified advertisement (e.g., a fingerprint of the first frame of the advertisement) which is compared with a strong fingerprint of the first frame of the advertisement. In some embodiments the strong fingerprint is globally unique and is generated by sampling the luminance of every block in the first frame of the non-targeted advertisement and is compared with a corresponding reference fingerprint for the first frame of the non-targeted advertisement. In these embodiments, the advertisement is only replaced if the strong fingerprints match. Thus, the content is replaced only if the non-targeted advertisement is verified to be the replaceable advertisement using a strong fingerprint.

In some embodiments, weak fingerprints are used to continuously monitor a first sequence of media content to determine whether the first sequence of media content has ceased to be displayed (e.g., because the end-user switched channels). In this case, a very weak fingerprint may be used (e.g., the luminance of a single block every 10 video frames) which requires very little bandwidth to communicate with the Content Replacement System 110, but is sufficient to determine whether the sequence of media content has been changed (e.g., because the end-user has changed the video input from cable to a DVD player or because the end-user has changed channels.)

The Media System 108 receives (962) the replacement media content and decodes (964) the replacement media content. In accordance with some embodiments, the Content Replacement System 110 receives and stores (930-D) usage data from the decoder/multiplexer when the replacement media content is decoded.

After receiving and decoding the replacement media content, the Media System 108 determines (966) a position to begin presenting the replacement media content based on the reference position. As one example, the content to be replaced is an advertisement, and when the Media System 108 generates the fingerprint, the Media System 108 determines a frame of the fingerprint (e.g., the first frame that was analyzed to generate the fingerprint) and records this as part of the fingerprint data. When the sequence of media content is identified, the Content Replacement System 110 sends the Media System 108 replacement media content, where the replacement media content starts at a position relative to the fingerprint used to identify the sequence of media content (e.g., the position is "239 frames after the frame associated with the fingerprint"). The Media System 108 uses the stored fingerprint data about the location of the fingerprint and the information from the Content Replacement System 110 about the relative position of the fingerprint and an insertion point for the replacement media content to determine when to begin presenting the replacement media content at the Media System 108.

In accordance with some embodiments, after determining when to begin presenting the replacement media content, the Media System 108 begins presenting (968) the replacement media content instead of the first sequence of media content. In some embodiments, the replacement media content has an end, and the Media System 108 detects the end of the replacement media content and ceases to present the replacement media content and presents the first sequence of media content. In accordance with some embodiments, when the Media System 108 begins presenting the replacement media content, the Content Replacement System 110 receives and stores (930-E) usage data from the decoder/multiplexer.

As one example, an end-user is watching television channel "42," the television detects that a targeted advertisement spot is coming up in eight seconds. In response to generating a fingerprint and determining a matching reference fingerprint, thereby identifying the currently displayed television channel, the television requests targeted advertisement content from the Content Replacement System 110 over an internet connection (or sends the fingerprint to the Content Replacement System 110 so that the Content Replacement System 110 can make this determination). After verifying that the sequence of media content includes the replaceable content, the Content Replacement System 110 sends a targeted advertisement, which is selected based on known demographic information about the end-user or the television of the end-user (e.g., provided when the end-user purchased the television). The replacement media content is delivered to the end-user's television over the internet connection and is played on the television instead of the regular advertisement. When the targeted advertisement ends, the channel that the end-user was watching is redisplayed.

In accordance with some embodiments, receiving the first sequence of media content includes receiving it from a managed television network, such as a satellite network, radio frequency broadcast network, internet protocol television system or cable network, while accessing the replacement media content includes accessing an unmanaged IP network, such as the Internet, or an IP network managed by another, such as in a self-contained hotel network. In a related embodiment, the method may make use of a virtual second communication network where the second communication network differs from the first communication network on one or more of layers one through six of the Open Systems Interconnection (OSI) network layer stack. In other words, the second communication network can be a virtualized separate network.

In accordance with some embodiments, while presenting the replacement media content to the end-user, the Media System 108 receives (969) a request to select a second sequence of media content (e.g., to change from channel "42" to channel "10"). In some embodiments the Media System 108 sends a request to the Content Distributor 106 for the second sequence of media content, and the Content Distributor 106 delivers (970) sequence of media content that is, in accordance with some embodiments, being provided (971) by the Content Provider 102. The Media System 108 receives (972) the second sequence of media content, and presents (974) the second sequence of media content to the end-user. In some embodiments, the Content Distributor 106 is sending the Media System 108 a plurality of sequences of media content, and the Media System 108 merely demultiplexes and decodes the requested second sequence of media content. In either case, the Media System 108 ceases presenting the replacement media content; and, instead presents (974) the second sequence of media content to the end-user.

Thus, even though the Media System 108 has replaced the content and is no longer displaying the first sequence of media content (e.g., the first channel that the end-user was watching), the Media System 108 is still able to detect and respond to a request of the end-user to change the sequence of media content. For example, the end-user is watching channel "42," an advertisement is replaced with a targeted advertisement. Before the targeted advertisement is finished, the end-user switches to channel "10." In response, instead of continuing to display the targeted advertisement, the television switches to the new channel (e.g., channel "10").

In some embodiments, while presenting the second sequence of media content to the end-user, the media device continues to advance the replacement media content (e.g., the targeted advertisement continues to advance). In some embodiments, the end-user selects the first sequence of media content after having previously selected the second set of media content. (e.g., the end-user switches back from channel "10" to channel "42"). The media device receives a request (978) for the first sequence of media content; and in response to the request for the first sequence of media content, if the request was (980) made within a predefined time (e.g., the length of the replacement media content, so that the replacement media content is still advancing), the Media System 108 finishes presenting (982) the replacement media content. However, if the request was not (984) made within a predefined time (e.g., the length of the replacement media content, so that the replacement media content has ended), the Media System 108 resumes presenting (938) the first sequence of media content to the end-user. In accordance with some embodiments, when the Media System 108 resumes presenting the replacement media content, the Content Replacement System 110 receives and stores (930-F) usage data from the decoder/multiplexer.

Similarly, in another embodiment, while the replacement subset of media content is being sent to the viewer display, the Media System 108 continues to monitor the first sequence of media content for changes in the characteristics of the sequence, such as changes in volume, changes in channels, invocation of Emergency Alert System (EAS), invocation of an on-screen program guide, etc., and is responsive to such changes by either switching back to the first sequence of media content (e.g., television stream) from the replacement media content (e.g., targeted advertisement stream), or makes changes in characteristics of the replacement media content (e.g., targeted advertisement stream) received over the alternate distribute network to mirror changes in the monitored first sequence of media content (e.g., original television stream) to the replacement media content.

In some embodiments, the Content Replacement System 110 sends (986) the stored usage data to the Content Provider 102 and/or the Content Distributor 106. The Content Provider 102 and the Content Distributor 106 receive (988-A, 988-B) the usage data and may use that data to improve their advertising strategies. In some embodiments, the Content Replacement System 110 stores the usage data and sells (990) the usage data.

Note that details of other processes described herein with respect to methods 1100, 1200, 1300 and 1400 (e.g., FIGS. 11A-11F, 12A-12E, 13A-13D and 14A-14F) are also applicable in an analogous manner to method 1100 described above. For example, the fingerprints and/or content described above with reference to method 1100 may have one or more of the characteristics of the various fingerprints and/or content described herein with reference to methods 1100, 1200, 1300 and/or 1400. For brevity, these details are not repeated here.

Presenting Additional Content

Figure 10A:
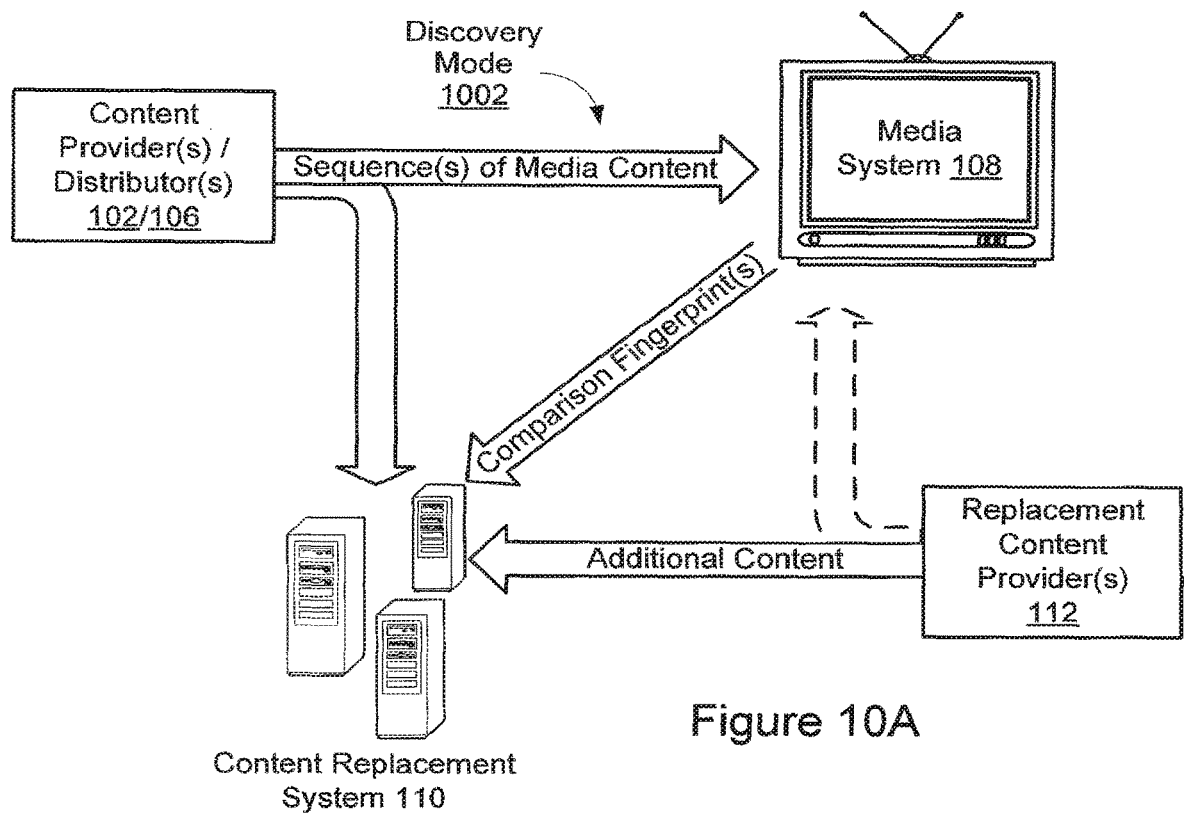
FIGS. 10A-10B are block diagrams illustrating the flow of data through a distributed system for distributing media content to a media system using fingerprint detection in accordance with some embodiments.
Figure 10B:
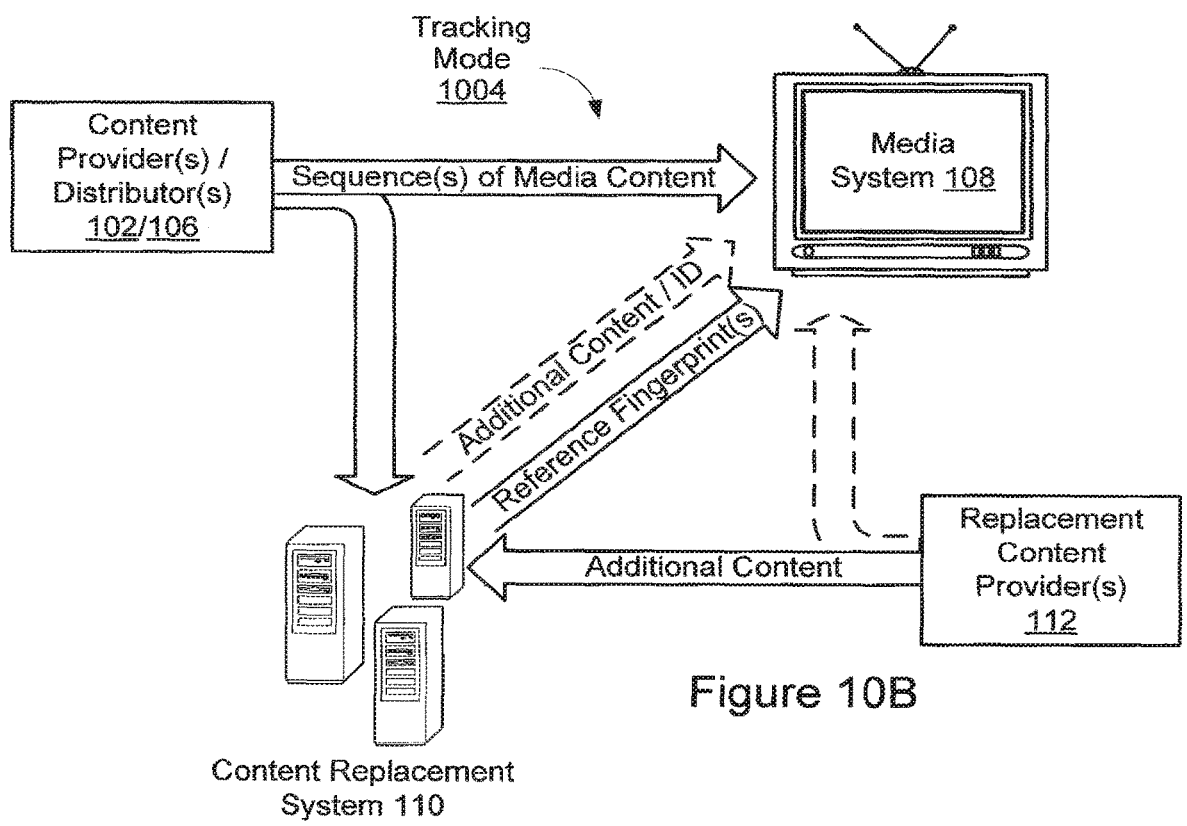

Attention is now directed to FIGS. 10A-10B, which illustrate the flow of data through a distributed system for distributing media content to a media system in accordance with some embodiments (e.g., embodiments where media content is replaced using fingerprint detection and matching). Some functional components, such as the network communication interfaces, have been omitted for clarity. Media content for presentation on a Media System 108 (e.g., television shows for display on a television) begins as source media content at the Content Provider 102, and is typically further modified (e.g., by adding in advertisements, etc.) at a Content Distributor 106 to generate a sequence of media content (e.g., a television channel). One or more sequences of media content (e.g., television channels) are provided to the Media System 108. A user of the Media System 108 typically selects a sequence of media content for presentation at the Media System 108 (e.g., switching a channel). It should be understood that this selection may result in selecting a received sequence of media content from a plurality of received sequences of media content, or it may result in reducing the number of sequences of media content that are provided to the Media System 108 to a single sequence of media content.

The Content Providers 102 and/or Content Distributors 106 send data on a Content Replacement System 110 enabling the Content Replacement System 110 to determine the currently presented content at the Media System 108. In some embodiments, this is reference fingerprint data generated at the Content Providers 102 and/or Content Distributors 106. In some embodiments, the Content Replacement System 110 receives the sequence(s) of media content from the Content Providers 102 and/or Content Distributors 106 and generates reference fingerprint data using the sequence(s) of media content.

Additional content (e.g., replacement content or supplemental content) is provided to the Content Replacement System 110 and/or the Media System 108 by the Replacement Content Providers 112. As used herein, additional content refers to virtually any kind of media content that can be presented at the Media System 108. This additional content will typically include content that is in some way associated with the received sequence of media content that is currently being displayed or prepared for display at the Media System 108. The additional content may: provide information about the received sequence of media content, include information targeted to viewers of the received sequence of media content, and/or provide interactive capabilities related to the received sequence of media content. As one example, the additional content includes sequences of replacement content (e.g., targeted television advertisements) for replacing all or a portion of the sequence of media content at the Media System 108. As another example, the additional content includes informational supplemental content for display in conjunction with (e.g., next to or overlaying at least a portion of) the received sequence of media content (e.g., a name of the currently displayed television show, a name of the current input source/television channel, an advertisement targeted to viewers of the current television channel, a programming guide, content such as status updates from social media sources, current weather, a stock ticker, etc.). As another example, the additional content includes interactive supplemental content for display in conjunction with (e.g., next to or overlaying at least a portion of) the received sequence of media content (e.g., an interactive advertisement, interactive programming guide, polling widget, voting widget, game show widget, game etc.). In some embodiments, the additional content includes components (e.g., audio, images, video, text, executable instructions, etc.) which are assembled at the Content Replacement System 110 or the Media System 108.

As an extended example of displaying additional content in conjunction with a received sequence of media content, the received sequence of media content is a television channel and the additional content is a "channel recognition bar." When the user switches television channels, the Content Replacement System 110 identifies the new channel using data from the Media System 108, as described in greater detail below and generates a channel recognition bar for display at the Media System 108 along with the content of the television channel. This channel recognition bar is typically displayed along the edge of the display (e.g., the lower right hand corner) and includes an identifier (e.g., name, logo, etc.) of the current television show. The channel recognition bar may also include a small graphical advertisement or logo of a product manufacturer, which is typically selected so as to target an audience of the current television show, but may be selected based on any criteria. In this example, the channel recognition bar is displayed as soon as possible after the television channel is switched and is only displayed for a few seconds (e.g., 5-10 seconds) after the channel has been switched. This channel recognition bar is useful to the end-user, because it provides helpful information as to the show that is currently being displayed, and may be able to do so even when advertisements are being displayed on the channel). The channel recognition bar is also a possible source of revenue, as each channel change will result in a new channel recognition bar being presented along with a new advertisement, and each new advertisement can be sold as an advertisement impression. Optionally, the channel recognition bar is interactive and enables the end-user to acquire more information about the television show or the advertised product or company by performing a select operation (e.g., selecting a predefined button on a remote control associated with the Media System 108).

FIG. 10A illustrates additional operations that are performed while the distributed system including a Media System 108 and a Content Replacement System 110 is in a discovery mode 1002 (e.g., while the distributed system is in the process of identifying an unknown sequence of media content that is being displayed/prepared for display on the Media System 108). In the discovery mode illustrated in FIG. 10A, the Media System 108 generates comparison fingerprints from the received sequence of media content and sends the comparison fingerprints to the Content Replacement System 110 for comparison with reference fingerprints. However, it should be understood that, in some embodiments, the Content Replacement System 110 sends reference fingerprints (e.g., fingerprints for multiple different sequences of additional content) to the Media System 110 for comparison with the comparison fingerprints.

FIG. 10B illustrates additional operations that are performed while the distributed system is in a tracking mode 1004 (e.g., after the distributed system has identified a sequence of media content that is being displayed/prepared for display at the Media System 108 and is tracking the content to determine if a different unknown sequence of media content starts to be displayed/prepared for display on the Media System 108). Once the unknown sequence of media content has been identified, the Content Replacement System 110 sends reference fingerprints to the Media System 108. In some embodiments, these reference fingerprints include only reference fingerprints for the identified sequence of media content that is being displayed/prepared for display at the Media System 108 (e.g., so as to conserve network bandwidth). Additionally, the Content Replacement System 110 sends the Media System 108 information that enables additional content (e.g., supplemental content or replacement content) to be displayed at the Media System. In some embodiments, this information is the additional content (e.g., a channel recognition bar, a replacement advertisement, etc.); while in other embodiments, this information includes an identifier that identifies additional content already stored at the Media System 108 for display at the Media System 108.

Thus, as illustrated in FIGS. 10A-10B, in one embodiment, when the distributed system is in discovery mode, 1002 comparison fingerprints are sent from the Media System 108 to the Content Replacement System 110 for comparison with reference fingerprints at the Content Replacement System 110, while when the distributed system is in tracking mode 1004, reference fingerprints are sent from the Content Replacement System 110 to the Media System 108 for comparison with comparison fingerprints at the Media System 108. This particular embodiment is advantageous in situations where bandwidth of the network connection between the Content Replacement System 110 and the Media System 108 is constrained, because fingerprints for a small number of sequences of media content (e.g., fingerprints for the unknown media content during discovery mode and fingerprints for the identified media content during tracking mode) need be transmitted between the Media System 108 and the Content Replacement System 110. This particular embodiment is also advantageous in situations where the Media System 108 has relatively less processing power than the Content Replacement System 110, because the relatively computationally intensive task of identifying an unknown sequence of media content is performed at the Content Replacement System 110 during the discovery mode, while the less computationally intensive task of determining that the sequence of media content that is currently being displayed/prepared for display at the Media System 108 is performed at the Media System 108. This particular embodiment is also advantageous in situations where the network connection between the Content Replacement System 110 and the Media System 108 has a high latency, because the relatively infrequently performed task of identifying an unknown sequence of media content is performed at the Content Replacement System 110 (e.g., requiring a communication from the Media System 108 and a response from the Content Replacement System 110), while the relatively frequently performed task of monitoring to ensure that the sequence of media content that is currently being displayed/prepared for display at the Media System 108 has not changed is performed at the Media System 108 (e.g., requiring only a communication from the Content Replacement System).

Attention is now directed to FIGS. 11A-11F, which include a flowchart representing a method 1100 for distributing media content to a Media System 108 (e.g., a consumer electronic device), according to certain embodiments. This method may be governed by instructions that are stored in a non-transitory computer readable storage medium and that are executed by one or more processors of one or more computer systems. Each of the operations shown in FIGS. 11A-11F may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In accordance with one embodiment, the Content Provider 102 and the Content Replacement System 110 perform a series of operations (1101-A) and (1101-B), including in some embodiments, receiving instructions from a Replacement Content Provider 112 (e.g., receiving instructions from an advertiser indicating the circumstances under which advertisements in a television broadcast stream are to be replaced with targeted advertisements provided by the advertiser or supplemented with additional informational/interactive content). As one example, a car manufacturer, purchases a half minute advertising placement opportunity with a Content Provider 102 (e.g., a television network) and pays a content replacement service to insert a targeted advertisement in the advertisement placement opportunity. As another example, a television station requests that a channel identifier displayed in a television broadcast be replaced with an overlay of additional content (e.g., weather, a news ticker, a local television station logo, advertisements). The Content Replacement System 110 obtains (1102) additional content (e.g., a targeted advertisement) from the Replacement Content Provider (112 in FIG. 1) and obtains (1103) content selection parameters from the Replacement Content Provider 112 that indicate when and/or where the replacement media content should be inserted into a sequence of media content (e.g., the advertisement that the replacement content is replacing or the portion of the content that is to be covered by the overlaid additional content). In some embodiments those parameters include the advertiser identifier, the advertising campaign identifier, a unique identifier of the device playing the advertisement and/or the starting time of the advertisement.

The Content Provider 102 obtains (1104) source media content. In some embodiments, the Content Provider 102 obtains the source media content from a satellite link to a content source (e.g., a television studio). Additionally, media content can be received from a content source by accessing the content source through a proprietary network or a public network such as the Internet. In some embodiments, a Content Distributor 106 physically delivers a storage medium containing a digital copy of a programming content to the Content Provider 102. In some embodiments, media content is acquired and processed for transmission to viewers in real time, and not first stored (e.g., a live satellite feed of a football game). In some embodiments acquiring and processing media content for transmission to viewers in real time includes buffering at least a portion of the content (e.g., transmitting the media content with an eight second delay to compensate for any variations in the rate at which the media content is being received by the Content Provider 102).

In accordance with some embodiments, the Content Provider 102 uses the source media content to create a respective sequence of media content (1106), such as a television show that includes a plurality of 30-second advertisements. After creating the respective sequence of media content, the Content Provider 102 generates (1108) fingerprint data including reference fingerprints of the respective sequence of media content, and stores (1109) the fingerprint data including the reference fingerprints and, optionally one or more of a time stamp, the channel, and the time until the next advertisement begins in the data structures at the Content Provider 102. The process for generating a fingerprint in accordance with some embodiments is described in more detail below with reference to FIGS. 14A-14F. In some embodiments, the fingerprint data is sent to the Content Replacement System 110. The Content Provider 102 sends (1110) the stream of media content to a Content Distributor 106 or, optionally, sends the stream of media content directly to a Media System 108. In some embodiments, the media system is a consumer electronic device with an end-user. In some embodiments, the media content is video content for display to the end-user.

In some embodiments the Content Distributor 106 receives (1111) the respective sequence of media content from the Content Provider 102 and, optionally, adds (1112) media content to the respective sequence of media content. For example, the Content Distributor 106 may be authorized to replace a subset of the advertisements in a television channel with local advertisements. In some embodiments, after adding any media content to the respective sequence of media content, the Content Distributor 106 generates (1114) fingerprint data including reference fingerprints of the respective sequence of media content and stores (1115) the fingerprint data including the reference fingerprints and, optionally, one or more of a time stamp, the channel, and the time until the next advertisement begins in the data structures at the Content Distributor 106. The process for generating a fingerprint in accordance with some embodiments is described in more detail below with reference to FIGS. 13A-13F.

It should be understood that, in some embodiments, only the Content Provider 102 generates fingerprints of the respective sequence of media content, while in other embodiments, only the Content Distributor 106 generates fingerprints of the respective sequence of media content. Additionally, in some embodiments, both the Content Distributor 106 and the Content Provider 102 generate fingerprints of the respective sequence of media content. For example, when both a television network and a cable company have a relationship with a targeted advertiser, both the television network and the cable company may separately generate fingerprints of the video feed/stream so as to enable particular positions within the sequence of media content to be identified. Thus, in this example, both the Content Provider 102 and the Content Distributor 106 are able to independently identify one or more advertisements in the same television feed for replacement with a targeted advertisement and/or identify additional content to be overlaid on the television while a particular channel is displayed using the separately generated fingerprints.

In some embodiments, the fingerprint data (e.g., reference fingerprints) generated by the Content Provider 102 and the Content Distributor 106 are sent to the Content Replacement System 110, which stores (1116) the fingerprint data (e.g., reference fingerprints). In some embodiments, the Content Replacement System 110 generates (1117) its own fingerprints and stores the fingerprints and, optionally, one or more of a time stamp, the channel, and the time until the next advertisement begins in the data structures at the Content Replacement System 110.

It should be understood that typically the Content Provider 102 and the Content Distributor 106 generate the fingerprint data (e.g., reference fingerprints), because the Content Distributor 106 and the Content Provider 102 have access to the respective sequence of media content before it is broadcast to the Media System 108 and thus can generate the fingerprint data (e.g., reference fingerprints) so that it can be used by the Media System 108 to identify media content in the respective sequence of media content that can be replaced or supplemented with additional content and insert the additional content. However, when the Content Replacement System 110 has access to the respective sequence of media content before it is displayed to the end-user (e.g., by arranging with the Content Distributor 106 to receive access to the sequence of media content before it is broadcast, by generating fingerprints during a standard broadcast delay of approximately seconds, or by generating fingerprints during a longer delay that is coordinated between the Content Replacement System 110 and the Media System 108), then the Content Replacement System 110 can generate the fingerprint data (e.g., reference fingerprints) that is used by the Media System 108, as described in greater detail below.

In some embodiments, fingerprint data (e.g., reference fingerprints) is sent (1118) to a Media System 108 from the Content Replacement System 110. In some embodiments the fingerprint data is sent to the Media System 108 over an unmanaged communication network (e.g., the Internet). In some embodiments, the fingerprint data includes all of the fingerprint data stored at the Content Replacement System 110. In some embodiments, the Content Replacement System 110 selects (1119) a subset of the data based on usage history of the Media System 108. For example, if the Content Replacement System 110 has fingerprint data associated with one hundred television channels, and usage data for a particular Media System 108 indicates that the particular Media System 108 is only regularly used to watch ten of those channels, then the Content Replacement System 110 selects the subset of the fingerprint data that includes the reference fingerprints associated with those ten channels and only sends the reference fingerprints associated with those ten channels. In this example, by sending only a subset of the fingerprint data, the amount of data that is transmitted to the Media System 108 (and consequently the amount of bandwidth used to transmit that data) is reduced by approximately ninety percent. Similarly, sending only a subset of the fingerprint data reduces the use of storage space at the Media System 108. The Media System 108 receives (1120) the fingerprint data from the Content Replacement System 110 and stores the fingerprint data (1121) in local data structures for use in identifying sequences of media content and requesting additional content, as described in greater detail below.

The Media System 108 receives (1123) a received sequence of media content (e.g., the respective sequence of media content) for presentation at the media system. In some embodiments, the received sequence of media content is received from the media Content Distributor 106 over a managed communication network (e.g., a cable network or a satellite network). In other words, in some embodiments, the received sequence of media content is broadcast media content (e.g., a television station). However, it should be understood that, for the purposes of the method described herein, the received sequence of media content received by the Media System 108 can be virtually any media content that is provided to the Media System 108. For example, the received media content could be any of broadcast TV content, video on demand, previously recorded broadcast TV, streaming internet video, purchased content (e.g., DVD, Blu-Ray, digital downloaded video, etc.).

In embodiments where the received sequence of media content is broadcast content, typically either: the media system will select a sequence of media content and only that sequence of media content will be delivered to the Media System 108 by the Content Distributor 106 (as described in greater detail below with reference to operations 1124-1128); or a plurality of multiplexed sequences of media content will be delivered to the Media System 108 from a Content Distributor 106 and the Media System 108 will demultiplex and decode the received sequence of media content (as described in greater detail below with reference to operations 1132-1134). However, in either case, the received sequence of media content is prepared to be presented at the Media System 108.

In embodiments where the received sequence of media content is broadcast media content and the Content Distributor provides a single sequence of media content, the Content Distributor 106 prepares (1122) the media content for delivery to a Media System 108. In some embodiments the Media System 108 sends a request indicating the selection (1124) of a respective sequence of media content (e.g., a first television channel). In this embodiment, the Content Distributor 106 delivers (1126) the respective sequence of media content to the Media System 108. For example, in a switched digital video system, the end-user requests to view channel "42" of a plurality of cable channels, the request goes out over the managed communications network and a single channel is returned to the end-user and decoded on the end-user's home equipment (e.g., a cable box and a television). In some embodiments the decoder reports usage data to a Content Replacement System 110, this reporting may occur over an alternate communication network (e.g., an unmanaged communication network). The Content Replacement System 110 stores (1130-A) the usage data, as described in greater detail below.

In embodiments where the received sequence of media content is broadcast media content and the Content Distributor 106 provides a plurality of multiplexed sequences of media content, the end-user does not send a network request for a respective sequence of media content, but rather the Content Distributor 106 delivers (1132) a plurality of sequences of media content (e.g., multiplexed television channels) to the Media System 108. The Media System 108 receives the plurality of sequences of media content (e.g., multiple television channels) and the end-user selects (1134) the respective sequence of the media content. In some embodiments, the Media System 108 demultiplexes the plurality of sequences of media content and decodes (1136) the selected respective sequence of media content. In some embodiments usage data is sent by the Media System 108 to the Content Replacement System 110 and stored (1130-B) for later use.

The Media System 108 prepares to present (1137) the received sequence of media content to an end-user of the Media System 108 (e.g., buffering the sequence of media content, decompressing video, etc). While preparing to present the unknown received sequence of media content to the end-user, the distributed system that includes the Media System 108 and the Content Replacement System 110 is initially in a discovery mode (e.g., 1002 as shown in FIG. 10A). While in the discovery mode, the Media System 108 generates (1138) a comparison fingerprint for the received sequence of media content. In some embodiments, the comparison fingerprint is generated using a single frame. In some embodiments, the comparison fingerprint is taken from one or more frames of video content within the sequence of media content. An exemplary method for generating a fingerprint is described in greater detail below with reference to FIGS. 13A-13F. In some embodiments, the fingerprint is generated before a displayed sequence of media content corresponding to the received sequence of media content is actually displayed to the end-user, so that additional content (e.g., replacement content and/or supplemental content) can be added to the received sequence of media content before the displayed sequence of media content is viewed by the end-user.

The comparison fingerprint is for comparison with a plurality of reference fingerprints so as to identify the received sequence of media content. It should be understood that, in accordance with various embodiments, this comparison may take place either: at the Media System 108; at the Content Replacement System 110, or at both the Media System 108 and the Content Replacement System 110. In some embodiments, the plurality of reference fingerprints are generated prior to the broadcast of the received sequence of media content (e.g., the reference fingerprints are predetermined). In some embodiments, the fingerprints are generated up to twenty four hours in advance by processing a pre-run of the broadcast. However, it should be understood that for some broadcast media (e.g., news, sports, etc.) a pre-run is not available and thus the reference fingerprints are generated on-the-fly in between the time the broadcast is generated and when it is displayed to the end-user (e.g., during a short delay that is typically added into live broadcasts, sometimes called a "seven second delay," although the delay may be more or less than seven seconds).

The Media System 108 sends (1139) a request for identification of additional content to a server system (e.g., the Content Replacement System 110), where the request is based at least in part on the comparison fingerprint. In some embodiments, the request for identification of additional content includes (1140) one or more comparison fingerprints (e.g., the comparison between the comparison fingerprint and the plurality of reference fingerprints is performed at the Content Replacement System 110). In some of these embodiments, sending the request for additional content includes sending a stream of fingerprints for successive frames of received media content (e.g. one fingerprint per frame) until a matching reference fingerprint is detected. In some embodiments the request for identification of additional content includes (1141) data indicating a matching reference fingerprint (e.g., at least a portion of the comparison between the comparison fingerprint and the plurality of reference fingerprints is performed at the Media System 108, and the request sent to the Content Replacement System 110 based at least in part on a result of that comparison).

In some embodiments, if there is (1142) a response from the server system (e.g., the Content Replacement System 110), the distributed system exits discovery mode, and the Media System 108 stops sending requests for identification of additional content to the server system (e.g., the Content Replacement System 110). However, if there is (1143) no response from the server, the Media System 108 continues to generate additional comparison fingerprints and send requests for identification of additional content using the additional comparison fingerprints. Thus, if a comparison fingerprint is not matched with any reference fingerprint, the discovery mode continues until a match is detected. For example, the comparison fingerprint may not be matched if the comparison fingerprint was generated improperly, was corrupted, the received sequence of media content is unidentifiable (e.g., the received sequence of media content is home video, for which the Conversation Replacement System 110 will not typically have reference fingerprints), or any of a number of other possible reasons.

When the request for identification of additional content includes (1140) one or more comparison fingerprints, the Content Replacement System 110 compares (1144) the comparison fingerprint with a plurality of reference fingerprints. Exemplary processes for comparing a comparison fingerprint with a plurality of reference fingerprints are described in greater detail below with reference to FIGS. 12A-12E and 14A-14F. If a matching fingerprint is not found (1145), then the process ends. If a matching fingerprint is found (1146), the matching reference fingerprint is used to identify (1147) the unknown received sequence of media content, enabling the Content Replacement System 110 to select additional content for display at the Media System 108, as described in greater detail below with reference to operations 1156-1160. Subsequently, the Media System 108 receives information enabling the additional content to be displayed (e.g., the additional content or instructions for selecting the additional content) and displays the additional content, as described in greater detail below with reference to operations 1161-1170.

However, it should be understood that, in embodiments where the network connection between the Media System 108 and the Content Replacement System 110 is asymmetrical so that the Media System 108 has a much higher download bandwidth than upload bandwidth, it is advantageous for the Content Replacement System 110 to send reference fingerprints to the Media System 108 and have some of the matching of fingerprints take place at the Media System 108, instead of having the Media System 108 repeatedly sending comparison fingerprint data to the Content Replacement System 110 for matching. This arrangement is advantageous, because sending the reference fingerprint data to the Media System 108 uses the relatively unlimited download bandwidth to receive the reference fingerprints from the Content Replacement System 110 rather than the relatively limited upload bandwidth to transmit the comparison fingerprints to the Content Replacement System 110.

Thus, in some embodiments, prior to generating the comparison fingerprint, the Media System 108 receives, from the server system (e.g., the Content Replacement System 110), at least a subset of the reference fingerprints selected from the plurality of reference fingerprints. In some of these embodiments, after generating the comparison fingerprint, the Media System 108 compares the comparison fingerprint to respective reference fingerprints of the subset of reference fingerprints; and if a respective reference fingerprint of the subset of reference fingerprints matches the fingerprint, the request for additional content includes data indicating that the fingerprint matches the respective reference fingerprint; and if the comparison fingerprint does not match any of the respective reference fingerprints of the subset of reference fingerprints, the request for a additional content includes the comparison fingerprint, for comparison with additional reference fingerprints at the server system. In some embodiments, the subset of reference fingerprints are selected from the plurality of reference fingerprints based on usage data. As an illustrative example, when the Content Replacement System 110 only sends fingerprint data to the Media System 108 including fingerprints for the ten most frequently watched television channels, if the Media System 108 is currently displaying a sequence of media content for a television channel that is not one of the ten most frequently watched television channels, the Media System 108 will not have predetermined fingerprint data that matches the sequence of media content and will typically send the generated comparison fingerprint to the Content Replacement System 110 for comparison with the entire set of reference fingerprints stored at the Content Replacement System 110.

In contrast, if a match to the generated comparison fingerprint is found, thereby identifying the received sequence of media content, the Media System 108 sends (1141) the request including data indicating a matching reference fingerprint to the Content Replacement System 110. For example, if the received sequence of media content that is being received by the Media System 108 is one of the ten most frequently watched television channels, and the Media System 108 identifies a reference fingerprint identifying the channel and the current time of the channel. In this example, the request to the Media System 108 includes an identifier of the channel and a timestamp of the channel and sends a request to the Content Replacement System 110 requesting any additional content (e.g., targeted advertisements, channel recognition bars, local information) to be displayed in addition to or replace the sequence of media content. The Content Replacement System 110 uses the data indicating the matching reference fingerprint to identify (1147) the received sequence of media content, as described in greater detail above.

In some embodiments the request includes an authentication message. A number of different authentication techniques may be used (e.g., Kerberos, RSA, etc.), some of which involve multiple communications between the Media System 108 and the Content Replacement System 110. If the authentication is not valid, then the process ends, and no additional content is sent to the Media System 108. If the authentication message is valid and the Content Replacement System 110 is able to authenticate the request, then the content replacement selects additional content in accordance with predefined criteria. An exemplary authentication process is described in greater detail above with reference to FIG. 6C. One having ordinary skill in the art would readily understand that any authentication process or procedure known in the art could be used to authenticate communications between the Media System 108 and the Content Replacement System 110.

It should be noted that in embodiments, where the request includes data indicating a matching reference fingerprint, the Media System 108 does not typically request particular additional content. Rather, the media device merely reports a particular fingerprint or fingerprint match (e.g., an identifier for the received sequence of media content or a matching reference fingerprint) to the Content Replacement System 110, and the Content Replacement System 110 uses the request from the Media System 108 along with, in some embodiments, additional data stored at the Content Replacement System 110 to identify (1147) the received sequence of media content. The information included in the request, enables the Content Replacement System 110 to select additional content for display at the Media System 108, as described in greater detail below with reference to Operations 1156-1160. Subsequently, the Media System 108 receives information enabling the additional content to be displayed (e.g., the additional content or instructions for selecting the additional content) and displays the additional content, as described in greater detail below with reference to operations 1161-1170.

In some embodiments, concurrently with transmitting/receiving the information enabling the additional content to be displayed at the Media System 108 (e.g., after the unknown received sequence of media content has been identified), the distributed system including the Media System 108 and the Content Replacement System 110 enters a tracking mode (e.g., 1004 in FIG. 10B), where the distributed system periodically determines whether the received sequence of media content has changed and, if so, returns to discovery mode. In some embodiments, after identifying the received sequence of media content, the Content Replacement System 110 begins sending (1148) reference fingerprints for the received sequence of media content to the media system. In some embodiments, the reference fingerprints include (1149) fingerprints for a predefined number of sequences of media content (e.g., fingerprints for one television channel, two television channels or some predetermined number of best matching television channels). In some embodiments, the reference fingerprints include (1150) fingerprints for multiple distinct sequences of media content (e.g., the reference fingerprints may include reference fingerprints for multiple television channels if the received comparison fingerprint matched reference fingerprints generated from multiple television channels).

In some embodiments (e.g., while in the tracking mode), the Media System 108 receives (1151) one or more reference fingerprints for the received sequence of media content from the server system (e.g., Content Replacement System 110). In some embodiments, the reference fingerprints are received as a stream of reference fingerprints (e.g., the reference fingerprints are sent sequentially over a period of time in an order determined in accordance with a progression of the reference sequence of media content from which they were generated). For example, when the reference sequence of media content is a television station, a reference fingerprint may be generated for each frame of the content and then sent to Media System 108 for comparison with a comparison fingerprint. In the tracking mode, the media system generates (1152) additional comparison fingerprints of units of the received sequence of media content and compares (1153) a respective reference fingerprint to a comparison fingerprint of a corresponding unit of the received sequence of media content to determine whether the respective reference fingerprint matches the comparison fingerprint.

When the comparison of the respective reference fingerprint(s) with the corresponding comparison fingerprint results in a match, the Media System 108 continues in tracking mode to receive additional reference fingerprints and compare them against additional comparison fingerprints. Typically this process will continue until there is a single reference sequence of media content that matches the received sequence of media content. In some embodiments the match is confirmed when a predetermined number of matches have been detected in a row, as described in greater detail below with reference to the MULTIPLE state in FIGS. 12A-12E.

However, when the received sequence of media content has been changed to a different received sequence of media content, the reference fingerprints will cease to match the additional comparison fingerprints (e.g., fingerprints generated from the different received sequence of media content). Thus, when the Media System 108 determines (1155) that the respective reference fingerprint does not match the comparison fingerprint for the corresponding unit of the sequence of media content, the Media System 108 will return to the discovery mode. In other words, in response to determining that there is no match, the Media System 108 will return to operation 1139, and send the comparison fingerprint to the server system (e.g., Content Replacement System 110) for comparison with a plurality of reference fingerprints so as to identify the different sequence of media content and determine a reference position within the different sequence of media content. In some embodiments, sending the respective reference fingerprint to the server system includes sending a stream of comparison fingerprints (e.g., one fingerprint per frame of the received sequence of media content) to the server system, until the server system identifies a match and begins sending a stream of reference fingerprints to the Media System 108.

In some embodiments, the Content Replacement System 110 uses the matched reference fingerprint to determine (1156) a reference position (e.g., a timestamp or number of frames from a content transition point) within the sequence of media content received by the Media System 108. In this way the Content Replacement System 110 can make a sophisticated decision as to what additional content is the most suitable for the particular Media System 108 and for the particular content addition opportunity (e.g., channel change or advertisement substitution opportunity). In some embodiments, the reference position is a temporal position within the received sequence of media content (e.g., the additional content is a sequence of media content that begins at "frame x," or the additional content is a channel recognition bar that is displayed in a lower right-hand corner of the display that begins to be displayed at "frame x"). In some of these embodiments, the reference position identifies a specific frame in the received sequence of media content (e.g., the fingerprint is a frame-accurate fingerprint).

The Content Replacement System 110 selects (1157) additional content in accordance with predefined criteria. In some embodiments the predefined criteria is based (1158) at least in part on the received sequence of media content (e.g., the media content received at the Media System 108). In some-embodiments the predefined criteria is based (1159) at least in part on the reference position within the media content. In some embodiments, the predefined criteria is based (1160) at least in part on information about the end-user of the Media System 108 such, including parameters provided by the Replacement Content Provider 112 (e.g., an advertiser). These parameters enable the Content Replacement System 110 to intelligently select additional content for display at the Media System 108. In some embodiments the parameters indicate that the replacement of a portion of the received sequence of media content with replacement media content is authorized (e.g., that the replacement of a non-targeted advertisement with a targeted advertisement is authorized by the advertiser). In some embodiments the parameters indicate that the addition of additional content to a portion of the received sequence of media content is authorized (e.g., that the display of overlaid additional content in the received sequence of media content is authorized by the advertiser, content producer and/or content distributor).

As one example of this method, the reference fingerprint is used by the Content Replacement System 110 to identify a received sequence of media content (e.g., a television channel and/or a particular advertisement or television show within the television channel) and a timestamp within the sequence of media content (e.g., the location of the content that is to be replaced, such as a non-targeted advertisement). A particular position (e.g., a position relative to the reference position) within the identified received sequence of media content is associated with an advertisement identifier and/or an advertisement campaign identifier for the generic advertisement to be overwritten with a targeted replacement advertisement delivered by the Content Replacement System 110. In some embodiments, the parameters identify the specific targeted advertisement that may be inserted as a substitute for the generic advertisement. The advertisement identifier and the advertisement campaign identifier are used by the Content Replacement System 110 to select an advertisement that is authorized by the advertiser to overwrite the broadcast advertisement based on parameters provided by the Replacement Content Provider 112 (e.g., advertiser) and maintained in a database in the Content Replacement System 110.

Similarly, a request for additional content may include parameters that enable the Content Replacement System 110 to select advertisements that best match the technical limitations of the Media System 108. For example, such parameters may include: the video profile (e.g., SD, HD and resolution parameters), the bandwidth (e.g., data rate) of the network connection, and/or the size of the display of the Media System 108, etc. In a complementary implementation, these parameters inform the Content Replacement System 110 to assist in formatting/resizing and/or transcoding the additional content (e.g., replacement advertisement, channel recognition bar etc.) so it is technologically compatible with the Media System 108.

In some embodiments, a request for additional content includes parameters that enable the Content Replacement System 110 to select advertisements that target the viewer based on program context. These parameters enable the Content Replacement System 110 to select additional content (e.g., advertisements) that best matches the interests of the viewer based on the characteristics of the content being viewed. Content characteristics can also be referred to as content properties or content metadata. Content metadata that would help the Content Replacement System 110 select an advertisement that targets a typical viewer of said content include the rating of the content and/or the genre of the content (e.g., Kids, Sports, Financial News, etc.) Content metadata can be obtained in many ways. One way to obtain content metadata is by extracting the metadata from guide listings data.

A request for additional content may also include parameters that enable the Content Replacement System 110 to select advertisements that target the viewer based on the viewer demographic, psychographic or behavioral information. These parameters enable the Content Replacement System 110 to select advertisements that best match the interests of the viewer based on the viewer's demographic information.

An example of demographic information is the media system location, such as a zip code. Media System 108 location information may be stored on the Media System 108 directly and can then be sent directly as a parameter in the request for additional content. In some cases, media system location information may not be stored on the Media System 108 directly however it can be determined at the back-end by mapping the Media System 108 host device identifier to the location in an account database or another database within which there is a mapping of the media system identifier to its owner's home address. One example of such a database is a product registration database populated at the Media System 108 purchase point or populated by way of a registration mechanism such as in the case of a warranty registration. In the case where media system location information is not stored directly on the Media System 108, a parameter in the request from the Media System 108 would include the identifier. The identifier would be used by a Content Replacement System 110 component as a key into a database at the back-end to resolve the media system location information. This location information would be used to select an advertisement that targets the derived location.

In some embodiments, additional information about the end-user of the Media System 108 is provided by one or more of: a Content Provider 102 (e.g., a Content Provider 102 knowing what premium stations the end-user has purchased), a Content Distributor 106 (e.g., a cable network having data about what channels the end-user watches); a manufacturer of the Media System 108 (e.g., information filled out on a warrantee card); and a service provider to the end-user of the Media System 108 (e.g., a cell phone provider having information about what area codes the end-user calls the most and what kind of cell phone the end-user owns). In some embodiments this user data (e.g., data about the end-user) may be stored in the Content Replacement System 110 and used by the Content Replacement System 110 to select additional content.

After or in conjunction with entering the tracking mode (e.g., as described with reference to operations 1148-1155 above), the Media System 108 receives (1161) a response to the request (e.g., the request for identification of additional content based on the comparison fingerprint as discussed in greater detail above with reference to operation 1139). The response including information enabling additional content to be selected for display at the Media System 108. In some embodiments, the information enabling additional content to be selected for display at the media system includes (1162) the additional content (e.g., the information is a replacement advertisement or a channel recognition bar for display at a predefined location on the display). In some embodiments, the information enabling additional content to be selected for display at the media system is (1163) information that uniquely identifies the additional content and enables the media system to retrieve the additional content from local storage or from a Replacement Content Provider 112. Thus, in some embodiments, the response from the Content Replacement System includes unique time/frame identifier (e.g., an internally consistent identifier that is shared between the Media System 108 and the Content Replacement System 110, such as a timecode) and source identifier that identifies a source of the received sequence of media content (e.g., a television channel identifier or a DVD or Blu-Ray disc identifier). The combination of a source identifier and a time/frame identifier is typically sufficient to uniquely identify content within the distributed system that includes the Media System 108 and the Content Replacement System 110.

For example, the information may be an identifier of a replacement advertisement or a channel recognition bar or other graphic that is already stored on the Media System 108. Thus, in some embodiments, the additional content is located on a local device that is connected to or a part of the Media System 108 (e.g., in local storage such as a digital video recorder), while in other embodiments, the additional content is sent to the Media System 108 by the Content Replacement System 110. In other words, the additional content may either be retrieved in real-time or may have been received by the media system in advance. Additionally, in some embodiments, the additional content is a combination of different content that is rendered in advance or on-the-fly (e.g., in realtime) from some combination of data, text, audio and/or graphic elements.

In some embodiments, the Media System 108 prepares (1164) content for display (e.g., to an end-user). This preparation may include one or more of: determining (1165) a position to begin presenting the additional content based on the references position (e.g., a replacement advertisement will typically be displayed starting at the beginning of a non-targeted advertisement); decoding (1166) additional content (e.g., the Media System 108 may decode additional content received from the Content Replacement System 110); and/or rendering additional content (e.g., rendering images and/or text that are part of the additional content).

Additionally, in some embodiments, the Media System 108 determines a position to begin presenting the additional content based on the reference position. When the sequence of media content is identified, the Content Replacement System 110 sends the Media System 108 additional content, where the additional content starts at a position relative to the frame used to generate the comparison fingerprint used to identify the replacement sequence of media content (e.g., the position is ten frames after the frame associated with the fingerprint). The Media System 108 uses the stored fingerprint data about the location of the fingerprint and the information from the Content Replacement System 110 about the relative position of the fingerprint and an insertion point for the additional content to determine when to begin presenting the additional content at the Media System 108. As one example, the received sequence of media content includes an advertisement, and when the Media System 108 generates the fingerprint, the Media System 108 determines a frame of the fingerprint (e.g., the first frame that was analyzed to generate the fingerprint) and records this as part of the fingerprint data. As another example, the received sequence of media content includes a reference to product, and the additional conversation is a small banner that is an advertisement for the product. As another example, a channel recognition bar is sent for display as soon as a new television channel is displayed at the Media System 108 (e.g., starting in the first ten frames of the new television channel).

In accordance with some embodiments, when the additional content is replacement content (e.g., a targeted advertisement), after determining when to begin presenting the replacement content, the Media System 108 begins presenting the replacement content instead of the received sequence of media content. In some embodiments, the replacement content has an end, and the Media System 108 detects the end of the replacement media content and ceases to present the replacement content and presents the received sequence of media content. In accordance with some embodiments, when the Media System 108 begins presenting the replacement content, the Content Replacement System 110 receives and stores (1130-D) usage data from the decoder/multiplexer.

As one example, an end-user is watching television channel "42," the television detects that a targeted advertisement spot is coming up in eight seconds. In response to generating a fingerprint and determining a matching reference fingerprint, thereby identifying the currently displayed television channel, the television requests targeted advertisement content from the Content Replacement System 110 over an internet connection (or sends the fingerprint to the Content Replacement System 110 so that the Content Replacement System 110 can make this determination). After verifying that the sequence of media content includes the replaceable content, the Content Replacement System 110 sends a targeted advertisement, which is selected based on known demographic information about the end-user or the television of the end-user (e.g., provided when the end-user purchased the television). The replacement media content is delivered to the end-user's television over the internet connection and is played on the television instead of the regular advertisement. When the targeted advertisement ends, the channel that the end-user was watching is redisplayed.

In accordance with some embodiments, receiving the received sequence of media content includes receiving it from a managed television network, such as a satellite network, radio frequency broadcast network, internet protocol television system or cable network, while accessing the additional content includes accessing an unmanaged IP network, such as the Internet, or an IP network managed by another, such as in a self-contained hotel network. In a related embodiment, the method may make use of a virtual unmanaged communication network where the unmanaged communication network differs from the managed communication network on one or more of layers one through six of the Open Systems Interconnection (OSI) network layer stack. In other words, the unmanaged communication network can be a virtualized separate network.

The Media system presents (1168) a displayed sequence of media content at the media system. The displayed sequence of media content includes at least a portion of the received sequence of media content (e.g., the television channel or DVD movie, etc.) and at least a portion of the additional content (e.g., a replacement targeted advertisement for replacing a portion of the received sequence of media content or a graphic for display overlaid over a portion of the received sequence of media content). In accordance with some embodiments, the Content Replacement System 110 receives and stores (1130-C) usage data from the decoder/multiplexer when the replacement media content is decoded.

In some embodiments, the additional content is (1169) supplemental content; and presenting the displayed sequence of media content includes displaying supplemental content (e.g., a channel recognition bar) that overlays or blends or replaces at least a portion of the received sequence of media content. As one example, the supplemental content includes a channel recognition bar that includes an image identifying the channel (e.g., including a text name of the channel or an icon/logo associated with the channel). As another example, the supplemental content includes an advertisement. In some embodiments, the supplemental content is non-interactive (e.g., there is no way for the end-user to interact with the supplemental content other than looking at the supplemental content or changing the channel to make the supplemental content disappear). In some embodiments, the supplemental content is interactive, and the user can interact with the supplemental content either by changing the content and/or how and where the supplemental content is displayed (e.g., moving a channel recognition bar on the display), or by performing an operation that is related to the supplemental content (e.g., selecting the supplemental content to perform an operation such as receiving an informational email about a product or placing a vote in a vote widget).

In some embodiments, the additional content is (1170) a replacement sequence of media content (e.g., a targeted replacement advertisement); and presenting the displayed sequence of media content includes displaying the replacement sequence of media content instead of displaying at least a portion of the sequence of media content. In some embodiments, the received sequence of media content is a sequence of video content including video content requested by the end-user and advertisement video content. In some embodiments, the additional content is a sequence of video content including one or more replacement advertisements.

In some embodiments, the additional content is identified and displayed in real-time. In other words, in some embodiments, the received sequence of media content is an ongoing broadcast of media content, there is a buffer time period (e.g., a delay that is intentionally introduced or a delay that is the result of predictable network latency) between when respective units (e.g., frames) of the received sequence of media content are received at the media system and when the respective units (e.g., frames) are scheduled to be presented to the end-user of the media system. In these embodiments, for a particular unit of the received sequence of media content: a fingerprint of the particular unit is generated by the Media System 108 and sent to the server system (e.g., the Content Replacement System 110) after the particular unit has been received at the Media System 108; and the additional content is received at the Media System 108 before the particular unit (e.g., frame) is scheduled to be presented to the end-user of the media system. In some embodiments, the buffer time period is less than thirty seconds (e.g., a buffer time period that is less than 15 seconds, 10 seconds, 5 seconds, 2 seconds, or any reasonable buffer time period). A typical buffer time period is seven seconds, which is frequently used by Content Distributors 106 to provide time to censor profanity that may occur in live broadcasts.

In accordance with some embodiments, while presenting the additional content to the end-user, the Media System 108 receives (1173) a request to select a different sequence of media content (e.g., to change from channel "42" to channel "10"). In some embodiments the Media System 108 sends a request to the Content Distributor 106 for the different sequence of media content, and the Content Distributor 106 delivers (1174) sequence of media content that is, in accordance with some embodiments, being provided (1175) by the Content Provider 102. The Media System 108 receives (1176) the different sequence of media content, and presents (1177) the different sequence of media content to the end-user. In some embodiments, the Content Distributor 106 is sending the Media System 108 a plurality of sequences of media content, and the Media System 108 merely demultiplexes and decodes the requested different sequence of media content. In either case, the Media System 108 ceases presenting the additional content; and, instead presents (1177) the different sequence of media content to the end-user.

Thus, in embodiments, where even though the Media System 108 has added additional content and is no longer displaying the previously received sequence of media content (e.g., the previous channel that the end-user was watching), the Media System 108 is still able to detect and respond to a request of the end-user to change the sequence of media content. For example, the end-user is watching channel "42," an advertisement is replaced with a targeted advertisement. Before the targeted advertisement is finished, the end-user switches to channel "10." In response, instead of continuing to display the targeted advertisement, the television switches to the new channel (e.g., channel "10").

In some embodiments, while presenting the different sequence of media content to the end-user that is dynamic (e.g., is animated or includes video content that advances in time), the media device continues to advance the additional content (e.g., the targeted advertisement continues to advance). In some embodiments, the end-user selects the previously received sequence of media content after having previously selected the different set of media content. (e.g., the end-user switches back from channel "10" to channel "42"). The media device receives a request (1178) for the previously received sequence of media content; and in response to the request for the previously received sequence of media content, if the request was (1180) made within a predefined time (e.g., the length of the additional content, so that the additional content is still advancing), the Media System 108 finishes presenting (1182) the additional content. However, if the request was not (1184) made within a predefined time (e.g., the duration of the additional content, so that the additional content has reached an end), the Media System 108 resumes presenting the previously received sequence of media content to the end-user. In accordance with some embodiments, when the Media System 108 resumes presenting the additional content, the Content Replacement System 110 receives and stores (1130-E) usage data from the decoder/multiplexer.

Similarly, in another embodiment, when the additional content is replacement, while the replacement content is being sent to the viewer display, the Media System 108 continues to monitor the received sequence of media content for changes in the characteristics of the sequence, such as changes in volume, changes in channels, invocation of Emergency Alert System (EAS), invocation of an on-screen program guide, etc., and is responsive to such changes by either switching back to the received sequence of media content (e.g., television stream) from the replacement media content (e.g., targeted advertisement stream) or ceasing to display supplemental content (e.g., a channel recognition bar or a voting widget), or makes changes in characteristics of the replacement media content (e.g., targeted advertisement stream) received over the unmanaged network to mirror changes in the monitored received sequence of media content (e.g., original television stream) to the replacement media content.

In some embodiments, the Content Replacement System 110 sends (1186) the stored usage data to the Content Provider 102 and/or the Content Distributor 106. The Content Provider 102 and the Content Distributor 106 receive (1188-A, 1188-B) the usage data and may use that data to improve their advertising strategies. In some embodiments, the Content Replacement System 110 stores the usage data and sells (1190) the usage data.

Note that details of other processes described herein with respect to methods 900, 1200, 1300 and 1400 (e.g., FIGS. 9A-9F, 12A-12E, 13A-13D and 14A-14F) are also applicable in an analogous manner to method 1100 described above. For example, the fingerprints and/or content described above with reference to method 1100 may have one or more of the characteristics of the various fingerprints and/or content described herein with reference to methods 900, 1200, 1300 and/or 1400. For brevity, these details are not repeated here.

Comparing Fingerprints

Attention is now directed to FIGS. 12A-12E which illustrate a method 1200 for comparing comparison fingerprints to reference fingerprints in accordance with some embodiments. This method may be governed by instructions that are stored in a non-transitory computer readable storage medium and that are executed by one or more processors of one or more computer systems (e.g., a Media System 108 or a Content Replacement System 110). Each of the operations shown in FIGS. 12A-12E may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors. It should be understood that this is one embodiment of the process of comparing comparison fingerprints to reference fingerprints described above as operation 1144, however, for the purposes of the method described in FIGS. 11A-11F, other methods of comparing fingerprints could be used in place of the method described below.

In this method there are a plurality of states (e.g., NOMATCH, INCONCLUSIVE, MULTIPLE, DETECTED, and TRACKING) of the distributed system including the Media System 108 and the Content Replacement System 110. In some embodiments, a state or mode of the distributed system is a state or mode that applies to both the Media System 108 and the Content Replacement System 110, although the Content Replacement System 110 may communicate with many different media systems and may have different states or modes with respect to interactions with each of the different media systems at any given time. In some embodiments a state is a state of a Media System 108, while a mode applies to the distributed system (e.g., a change in the state indicates a change in way that data is processed at the components of the distributed system, while a change in the mode indicates a change in the way data is transferred between components of the distributed system, as described above with reference to FIGS. 10A-10B).

The states are determined in accordance with comparisons between comparison fingerprints generated based on a received sequence of media content at a media system (e.g., Media System 108), and reference fingerprints generated (e.g., at the Content Replacement System 110) based on reference sequences of media content. In some embodiments the comparison is performed at a Media System 108, while in other embodiments, the comparison is performed at a server system (e.g., the Content Replacement System 110 described above). In some embodiments multiple comparisons are performed and some of the comparisons are performed at the Media System 108 while other comparisons are performed at the Content Replacement System 110.

The states of the distributed system determine actions performed by the Media System 108 and the Content Replacement System 110. For example, the states may be used to determine whether the distributed system is in a discovery mode 1002 (FIG. 10A) or a tracking mode 1004 (FIG. 10B). As described in greater detail above, in some embodiments, when the distributed system is in a discovery mode, the Media System 108 is sending comparison fingerprints to the Content Replacement System 110 for comparison with reference fingerprints, as illustrated in FIG. 10A, while when the distributed system is in a tracking mode, the Media System is receiving reference fingerprints from the Content Replacement System 110 for comparison with comparison fingerprints, as illustrated in FIG. 10B. In some embodiments, when the state of the distributed system is NOMATCH or INCONCLUSIVE the distributed system is in a discovery mode and when the state of the distributed system is MULTIPLE or DETECTED or TRACKING, the distributed system is in a tracking mode. In some embodiments, when the state of the distributed system is anything other than TRACKING (e.g., NOMATCH, INCONCLUSIVE, MULTIPLE, or DETECTED) the distributed system is in a discovery mode and when the state of the distributed system is TRACKING, the distributed system is in a tracking mode.

Method 1200 starts in response to detecting a predetermined condition (e.g., determining that the Media System 108 is receiving an unknown sequence of media content). The computer system gets (1204) a comparison fingerprint (e.g., by generating the comparison fingerprint or receiving the comparison fingerprint from another computer system).

The comparison fingerprint is evaluated (1206) so as to determine whether the content unit (e.g., video frame) from which the comparison fingerprint was generated is sufficiently distinct (e.g., whether comparing the comparison fingerprint to a reference fingerprint will produce information that can be interpreted with sufficient confidence to provide useful information). When the fingerprints are fingerprints for video content, frequently there are transitions where a video frame will be almost 100% black or 100%, white. These transitions occur with sufficient frequency that a substantially black frame or substantially white frame is relatively likely to occur in virtually any sequence of media content at some point in time. Thus, in some embodiments, a fingerprint is evaluated as being distinct when more than a predetermined amount of the pixels or pixel blocks used to generate the comparison fingerprint are not black or more than the predetermined amount of the pixels or pixel blocks used to generate the comparison fingerprint are not white. This predetermined amount may be adjusted based on the desired confidence level, however a typical value would be between 60% and 80% of the pixels or pixel blocks of the frame.

When the content unit is determined (1208) not to be distinct (e.g., because more than 70% of the pixel blocks are black), the distributed system enters the INCONCLUSIVE state (1210), as described in greater detail below with reference to operations 1250-1258. In some embodiments, from the INCONCLUSIVE state, the distributed system can transition directly to one of the MULTIPLE, DETECTED or TRACKING states, as described in greater detail below.

When the content unit is (1212) determined to be distinct (e.g., because less than 70% of the pixel blocks are black), the distributed system compares (1214) the comparison fingerprint with reference fingerprints in a first subset of reference fingerprints. In some embodiments, the first subset is selected based on a set of predefined heuristics used to select reference fingerprints that are more likely to match the comparison fingerprint (e.g., reference fingerprints for: content currently being broadcast in a current broadcast window, television channels frequently watched by an end-user of the Media System 108, television channels available in a geographic area of the Media System 108, etc.). If a match is (1216) found in the first subset of reference fingerprints, the distributed system determines whether the match is a single match, as described in greater detail below. In some embodiments, if no match is (1218) found, the distributed system selects a second subset and compares (1220) the comparison fingerprint with reference fingerprints for the second subset. If a match is (1222) found in the second subset of reference fingerprints, the distributed system determines whether the match is a single match, as described in greater detail below. In some embodiments, if no match is (1224) found, the distributed system repeats this process for one or more additional subsets. If matches are found (1226) the distributed system determines whether the match is a single match, however if no matches are (1228) found, and there are no more subsets to repeat the process for, the distributed system enters the NOMATCH state (1230). While in the NOMATCH state, a match count value indicating the number of sequential matches of comparison fingerprints to reference fingerprints for a particular item of reference content is reset (1232) to zero for all reference content, and the distributed system returns to the start of method 1200 and repeats the process described above.

If the match is (1234) a single match, the distributed system enters the DETECTED state (1236), as described in greater detail below. In contrast, if the match is (1240) a multiple match (e.g., multiple different reference fingerprints match the comparison fingerprint), the distributed system enters the MULTIPLE state, as described in greater detail below.

In the INCONCLUSIVE (1210) state, even though the frame associated with the comparison fingerprint has been determined to be indistinct (e.g., too black or too white to produce a fingerprint that can be used to identify a matching reference fingerprint with sufficient confidence), the comparison fingerprint may have sufficient information to provide some indication as to likely reference content. Thus, in some embodiments, the distributed system compares (1250) comparison fingerprints with reference fingerprints to identify one or more matching reference fingerprints. If no matching reference fingerprints are (1252) found, the match count value is reset (1253) to zero for all reference content, the distributed system enters the NOMATCH state and returns to the start of method 1200. If one or more matching fingerprints are (1254) found, even if the confidence level of these matches is low, a match count value for the respective matched content for each of the one or more reference fingerprints is incremented. In some embodiments, the distributed system will only increment match counts for a predetermined number of sequential matches when the state is INCONCLUSIVE. In other words, if the prior state of the distributed system was INCONCLUSIVE, the distributed system may, instead of performing operation 1255, perform an alternative operation in accordance with the prior state of the distributed system, such as incrementing the match count by a smaller value (e.g., MC=MC+½), reduce the match count (e.g., MC=MC−1), or reset the match count to zero (e.g., MC=0) and return to the start of method 1200.

After incrementing the match count for any respective matched reference content, the distributed system determines whether there is a single matched reference content or multiple matched reference content. When a single item of reference content is (1256) matched, the distributed system enters the DETECTED (1236) state, as described in greater detail below. When multiple items of reference content are (1258) matched, the distributed system enters the MULTIPLE (1242) state, as described in greater detail below.

In the DETECTED (1236) state, the distributed system continues the process described above, but is able to restrict the comparison of reference fingerprints and comparison fingerprints to reference fingerprints of the reference content associated with the previously matched reference fingerprint. In other words, because an item of reference content has already been identified (based on previous operations) as matching the unknown content, the search for matching content can be restricted to the matched reference content. When the distributed system receives (1259) the next comparison fingerprint. In some embodiments, if the content unit from which the comparison fingerprint was generated is (1260) not distinct, the distributed system enters the INCONCLUSIVE (1210) state, but if the content unit from which the comparison fingerprint was generated is (1261) sufficiently distinct, the distributed system remains in the DETECTED state. The next comparison fingerprint is compared (1262) with one or more next reference fingerprint generated from the matched reference content. If a match is (1263) not found, the match count is reset (1264) to zero, the distributed system enters the NOMATCH state and returns to the start of method 1200. In contrast, if a match is (1266) found, the distributed system increments (1267) the match count for the matched reference content.

After incrementing the match count, the distributed system determines if a confirm threshold has been met. Typically the confirm threshold is a number of successive matches that are determined to be sufficient evidence that the identified sequence of media content is the unknown sequence of media content. Including more matches increases the probability that the match is correct but results in a longer time from the start of the process to when the match is confirmed. Typically confirm threshold that specifies a small number (e.g., 2, 3, 4, 5) of successive matches is an effective tradeoff between accuracy and speed. However, it should be understood that the confirm threshold can be adjusted depending on whether speed or accuracy is more important (reducing the number of matches required to increase speed at the cost of some accuracy, or increasing the number of matches required to increase accuracy at the cost of some speed). If the confirm threshold has (1268) not been met, the distributed system waits for a next comparison fingerprint to be received. However, if the confirm threshold has (1269) been met, the distributed system enters the TRACKING (1238) state.

In the MULTIPLE (1242) state, the distributed system continues the process described above, but is able to restrict the comparison of reference fingerprints and comparison fingerprints to reference fingerprints of the multiple items of reference content associated with the previously matched reference fingerprints. In other words, because multiple items of reference content have already been identified (based on previous operations) as matching the unknown sequence of media content, the search for matching content can be restricted to those matched items of reference content. The distributed system receives (1270) the next comparison fingerprint. In some embodiments, if the content unit from which the comparison fingerprint was generated is (1271) not distinct, the distributed system enters the INCONCLUSIVE (1210) state, but if the content unit from which the comparison fingerprint was generated is (1272) sufficiently distinct, the distributed system remains in the MULTIPLE state. For a respective matched reference content (e.g., one of the items of referenced content that had a reference fingerprint matching the previous comparison fingerprint), the next comparison fingerprint is compared (1273) with a next reference fingerprint generated from the respective matched reference content. If a match is (1276) not found, the match count for the respective matched reference content is reset (1264) to zero. In contrast, if a match is (1280) found, the distributed system increments (1282) the match count for the respective matched reference content.

In the MULTIPLE state, after incrementing the match count or resetting the match count, the distributed system determines if there is other previously matched reference content to process. If there is (1284) additional previously matched reference content to process, the distributed system continues to compare reference fingerprints to the next comparison fingerprint for each reference fingerprint. Once there is no (1285) more previously matched reference content, the distributed system determines if there is still any matched reference content. If there is no matched reference content (e.g., the match counts for all of the items of reference content have been reset to zero), the distributed system enters the NOMATCH state and returns to the start of method 1200. However, if there are (1287) one or more matches the distributed system determines if there is a single match or multiple matches. If there are (1288) multiple matches, the distributed system remains in the MULTIPLE state and waits for the next comparison fingerprint to be received. However, when a single match (1289) is detected, the distributed system determines, for the reference content associated with the matched reference fingerprint, whether a confirm threshold has been met. If the confirm threshold has (1290) not been met, the distributed system enters the DETECTED (1236) state. However, if the confirm threshold has (1291) been met, the distributed system enters the TRACKING (1238) state.

In the TRACKING (1238) state, the distributed system is able to restrict the comparison of reference fingerprints and comparison fingerprints to reference fingerprints of the reference content associated with the previously matched reference fingerprint. In other words, because an item of reference content has already been identified (based on previous operations) as matching the unknown content, the search for matching content can be restricted to the matched reference content. When the distributed system receives (1292) the next comparison fingerprint, the next comparison fingerprint is compared (1293) with one or more next reference fingerprint generated from the matched reference content. In some embodiments, because the matched reference content has already been confirmed, the distributed system does not enter the INCONCLUSIVE state even if the comparison fingerprint is indeterminate. If a match is (1294) is found, the distributed system remains in the TRACKING state. In contrast, if match is (1295) not found (e.g., because the television channel at the media system has been changed), the match count is reset (1296) to zero, the distributed system enters the NOMATCH state and returns to the start of method 1200.

While the preceding method of comparing comparison fingerprints with reference fingerprints to identify matching reference content has been described with reference to a method including five distinct states (NOMATCH, INCONCLUSIVE, MULTIPLE, DETECTING, and TRACKING), it should be understood that other methods of determining matching content may be used for analogous purposes and use all or a subset of the states described above.

Note that details of other processes described herein with respect to methods 900, 1100, 1300 and 1400 (e.g., FIGS. 9A-9F, 11A-11F, 13A-13D and 14A-14F) are also applicable in an analogous manner to method 1200 described above. For example, the fingerprints and/or content described above with reference to method 1200 may have one or more of the characteristics of the various fingerprints and/or content described herein with reference to methods 900, 1100, 1300 and/or 1400. For brevity, these details are not repeated here.

Monitoring Media Content

Attention is now directed to FIGS. 13A-13D which illustrate a method 1300 for monitoring media content being presented at a media system in accordance with some embodiments. This method may be governed by instructions that are stored in a non-transitory computer readable storage medium and that are executed by one or more processors of one or more computer systems (e.g., a Media System 108 or a Content Replacement System 110). Each of the operations shown in FIGS. 13A-13D may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors. It should be understood that the method described below includes some of the same steps and serves some of the same functions as the method of displaying additional content described above with reference to operations 1138-1170 in FIGS. 11A-11F. However, the method described below includes additional details concerning monitoring media content and is not subject to all of the limitations of the method described above in FIGS. 11A-11F.

A server system (e.g., Content Replacement System 110) receives (1302) a comparison fingerprint that was generated at a media system (e.g., Media System 108) based on at least a portion of an unknown sequence of media content (e.g. media content being presented or being prepared for presentation) at the media system. In other words, while the distributed system (e.g., including the Content Replacement System 110 and the Media System 108) is initially in a discovery mode (e.g., 1002 in FIG. 10A), where the media system is sending comparison fingerprints to the server system.

In some embodiments, the server system receives (1304) a plurality of comparison fingerprints, including the particular described above comparison fingerprint, from the media system, where the fingerprints in the plurality of comparison fingerprints correspond to respective units of the unknown sequence of media content (e.g., each fingerprint corresponds to a video frame of a sequence of video content). In some embodiments, receiving the comparison fingerprint includes receiving a stream of comparison fingerprints for successive frames of received media content (e.g. one fingerprint per frame) until a match is detected at the server system. In some embodiment, the plurality of comparison fingerprints are (1306) received at the server system as a stream of fingerprints generated in accordance with a chronological order of the unknown sequence of media content (e.g., the comparison fingerprints are sent to the server system sequentially in an order that is determined based on a chronological order of the units of content from which the comparison fingerprints were generated). For example, the media system may generate comparison fingerprints for every frame of a video, and then send the fingerprints to the server system in the order of the video frames in the video. It should be understood that sending the fingerprints in accordance with a chronological order of the unknown sequence of media content may include either sending individual fingerprints or sending batches of multiple fingerprints, where an earlier batch of fingerprints generated from a first set of content units is sent before a later batch of fingerprints that was generated from a second set of content units where the first set of content units are earlier in the chronological order than the second set of content units.

The server system compares (1308) the comparison fingerprint with a first plurality of reference fingerprints for a plurality of reference sequences of media content so as to identify the unknown sequence of media content as an identified reference sequence of media content (e.g., using the fingerprint comparison techniques described in greater detail below with reference to FIGS. 14A-14F). In some embodiments, the reference fingerprints are (1310) generated during a pre-run of a video broadcast (e.g., 24 hours before the video is broadcast over television), and the comparison fingerprints are generated during the video broadcast. In other words, while the comparison fingerprints will typically be generated at the media system in real-time (e.g., as content is about to be displayed on the Media System 108), reference fingerprints can be generated at any time previous to the presentation of the content at the media system, and thus it can be advantageous to generate a substantial amount of the reference fingerprints well before they are needed, thereby avoiding interruptions in service by providing greater fault tolerance.

In some embodiments, identifying the unknown sequence of media content comprises identifying (1312) a first set of reference fingerprints in accordance with a set of heuristics. In some embodiments, the heuristics include: broadcast window, geographical area, historical usage, connectivity, etc. After identifying the first set of reference fingerprints in accordance with the set of heuristics, the server system compares (1314) the comparison fingerprint to reference fingerprints in the first set of reference fingerprints (e.g., first look in the broadcast window).

These heuristics are used to identify content that is more likely to be the unknown content, and prioritize the comparison of the comparison fingerprints with the reference fingerprints of the identified content, so as to improve the speed of detecting matching reference content by reducing the number of reference fingerprints with which the comparison fingerprint is to be compared (at least in an initial time period). Increasing the speed with which the unknown content is identified is particularly important for television broadcast content, because in order to modify the broadcast content in real-time (e.g., by replacing a portion of the broadcast content with replacement content or by inserting supplemental content into the broadcast content), the server system must identify the unknown sequence of media content and send the additional content to the media system before the unknown content is displayed at the media system.

Additionally, these heuristics may also improve the accuracy of detecting content. For example, in some circumstances it is advantageous to generate fingerprints from individual frames of video content (e.g., so that frame-accurate substitutions of replacement content and insertion of additional content can be performed). However, fingerprints for individual frames are typically less accurate than fingerprints that are generated using a plurality of sequential frames. Thus, the fact that the fingerprints are being compared to a limited set of other fingerprints (e.g., fingerprints within the broadcast window) reduced the likelihood of false positive matches by reducing the set of reference fingerprints to reference fingerprints for the most likely reference content. In other words, while it is very unlikely that any comparison fingerprint will accidentally matches one of the reference fingerprints that correspond to reference content in a two second broadcast window, it is much more likely that a comparison fingerprint will accidentally match one of the reference fingerprints that correspond to reference content including all of the television to be broadcast in the next twenty four hours and all DVDs released in the last five years.

In response to the comparing, when the comparison fingerprint matches (1316) a single respective reference fingerprint in the first set of reference fingerprints (e.g., corresponding to the DETECTED state described above with reference to FIGS. 12A-12E), the server system identifies a corresponding sequence of media content that corresponds to the single respective reference fingerprint as the identified sequence of media content. However, when none of the reference fingerprints in the first set of reference fingerprints match (1318) the comparison fingerprint, the server system identifies a second set of reference fingerprints in accordance with the set of heuristics and compares the comparison fingerprint to reference fingerprints in the second set of reference fingerprints so as to identify the unknown sequence of media content (e.g., if no matching reference fingerprints are found within the broadcast window, then the server system will look outside of the broadcast window for reference content with matching reference fingerprints). Thus, even though a subset of the reference fingerprints are initially selected for comparison with the comparison fingerprint (e.g., so as to improve the speed of matching), if no match is found, the server system can compare the comparison fingerprint against a broader range of reference fingerprints so as to find a matching reference fingerprint even for relatively obscure content. For example, this content may include broadcast television that was broadcast over a month ago and was recorded in a digital video recorder.

In some of these embodiments, the heuristics (e.g., the heuristics by which the first set of reference fingerprints is selected) include a heuristic based on a current broadcast window, and the first set of reference fingerprints consists of (1320) fingerprints that correspond to portions of sequences of media content that are within a current broadcast window (e.g., the first set of reference fingerprints are fingerprints for video content that has been broadcast for display in a two second broadcast window that starts 4 seconds after the current time), and the second set of reference fingerprints includes fingerprints that correspond to portions of sequences of media content that are outside of the current broadcast window (e.g., sequences of media content in a broadcast window before/after the current broadcast window). This heuristic increases the efficiency of the comparison process, because a comparison fingerprint is more likely to come from the current broadcast window than from any particular broadcast window that is in the past, because most people watching television are watching current broadcast television. However, many end-users have started watching time-delayed or prerecorded content (e.g., television shows recorded on a digital video recorder, movies or television shows on DVDs, Blu-Ray discs, video on demand, streaming video, etc.), and thus in order to reliably identify the unknown sequence of media content, fingerprints from a much broader range of content (e.g., the second set of reference fingerprints) may need to be compared with the comparison fingerprint when a matching reference fingerprint is not found in the first set of reference fingerprints.

In some of these embodiments, the heuristics (e.g., the heuristics by which the first set of reference fingerprints is selected) include a heuristic based on a geographic area, and the first set of reference fingerprints consists of (1322) fingerprints that correspond to sequences of media content that have been broadcast within a geographic area associated with the media system, and the second set of reference fingerprints includes fingerprints that correspond to sequences of media content that are outside of the geographical area associated with the media system. It should be understood that the geographic area associated with the media system could be determined based on the IP address of the media system, GPS coordinates, based on data received from an end-user of the media system, or based on channels that were previously identified as being presented at the media system (e.g., channels for particular geographic regions may have a distinct set of reference fingerprints or may have channels arranged in a particular order). As an example of using this geographic area heuristic, the first set of reference fingerprints may be reference fingerprints for content that is broadcast to the city/state/broadcast region in which the media system is located, while the second set of reference fingerprints are for content that is broadcast in the country in which the media system is located. This heuristic increases the efficiency of the comparison process, because a comparison fingerprint is more likely to come from content that is broadcast to the geographic area of the media system than from other geographic areas, because most people watching television are watching broadcast television that is being broadcast to their geographic area (e.g., city, broadcast region, etc.). However, many media system are now capable of receiving content from a wide variety of sources that are outside of the geographical area of the media system, (e.g., media content received via DVDs, Blu-Ray discs, video on demand, streaming video, etc.), and thus in order to reliably identify the unknown sequence of media content, fingerprints from a much broader range of content (e.g., the second set of reference fingerprints) may need to be compared with the comparison fingerprint when a matching reference fingerprint is not found in the first set of reference fingerprints.

In some of these embodiments, the heuristics (e.g., the heuristics by which the first set of reference fingerprints is selected) include a heuristic based on usage history, and the first set of reference fingerprints consists of (1324) fingerprints that correspond to sequences of media content are associated with a usage history of the media system (e.g., using previously identified favorite channels or previously identified content provider/content distributor), and the second set of reference fingerprints includes fingerprints that correspond to sequences of media content that are not associated with the usage history the media system. For example, typically a single household watches eighteen or fewer television channels on a regular basis, thus the first set of reference fingerprints could include only the reference fingerprints for the television channels that are most frequently watched at the media system. Additionally or alternatively, the first set of reference fingerprints could include reference fingerprints for favorite movies, episodes of television shows that are likely to have been recorded for later viewing (e.g., on DVR) by the end-user. This heuristic increases the efficiency of the comparison process, because a comparison fingerprint is more likely to come from content that is received from sources that have historically been preferred by the end-user(s) of the media system. However, the server system should still be able to recognize unexpected content that is presented at the media system, and thus in order to reliably identify the unknown sequence of media content, fingerprints from a much broader range of content (e.g., the second set of reference fingerprints) may need to be compared with the comparison fingerprint when a matching reference fingerprint is not found in the first set of reference fingerprints.

In some of these embodiments, the heuristics (e.g., the heuristics by which the first set of reference fingerprints is selected) include a heuristic based on the current connectivity of the media system (e.g., which video in port is being used), and the first set of reference fingerprints consists of fingerprints that correspond to sequences of media content are associated with a current connectivity of the media system (e.g., the first set of reference fingerprints will be reference fingerprints that are associated with media typically provided through the active video port), and the second set of reference fingerprints includes fingerprints that correspond to sequences of media content that are not associated with the usage history the media system. For example, a typical media system will have a plurality of video in ports (e.g., HDMI, component, composite, coaxial cable, antenna, IP, VGA, DVI, mini-DVI, etc.), thus the first set of reference fingerprints could include only the reference fingerprints associated with the content source attached to the currently active video port (e.g., the first set of reference fingerprints includes only reference fingerprints from Blu-Ray movies). The media system may report the identity of the content source (e.g., cable, DVD, Blu-Ray, streaming video), or the identity of the content source may be identified by the server system based on historical usage patterns (e.g., the last unknown content identified from the HDMI port was a Blu-Ray movie, and thus the HDMI port is associated with a Blu-Ray player).

In some situations, while comparing the comparison fingerprint to reference fingerprints in the first set of reference fingerprints, the server system determines that the comparison fingerprint matches multiple respective reference fingerprints (e.g., corresponding to the MULTIPLE state described above with reference to FIGS. 12A-12E), and further comparison is performed at the server system. When the comparison fingerprint matches (1328) multiple respective reference fingerprints that correspond to multiple respective sequences of media content, the server system compares subsequent comparison fingerprints received from the media system to subsequent fingerprints for the respective sequences of media content until one of the subsequent comparison fingerprints is identified as matching reference fingerprints from a single reference sequence of media content. In other words, the server system continues comparing reference fingerprints in order to determine the matching reference sequence of media content. This embodiment is particularly advantageous when bandwidth is limited or processing power at the media system is limited and thus sending multiple sequences of reference fingerprints to the media system would require more bandwidth and/or processing power than is available at the media system.

In some situations, while comparing the comparison fingerprint to reference fingerprints in the first set of reference fingerprints, the server system determines that the comparison fingerprint matches multiple respective reference fingerprints (e.g., corresponding to the MULTIPLE state described above with reference to FIGS. 12A-12E), and further comparison is performed at the client system (e.g., Media System 108). When the comparison fingerprint matches (1330) multiple respective reference fingerprints that correspond to the identified reference sequence of media content and one or more additional respective sequences of media content, the server system sends, to the media system, a third plurality of reference fingerprints for the one or more additional respective sequences of media content, where the second plurality of reference fingerprints and the third plurality of reference fingerprints are for use by the media system to identify a single reference sequence of media content that matches the unknown sequence of media content. In other words, in some embodiments, the server system narrows down the possible reference sequences of media content to a few possible candidate sequences of media content and sends multiple streams of fingerprints to the media system for comparison to fingerprints of a currently playing sequence of media content so as to uniquely identify the currently playing sequence of media content at the media system. This embodiment is particularly advantageous when network latency is high, because the final step of identifying the unknown media content (e.g., by identifying a single reference sequence of media content that matches the unknown sequence of media content) is performed at the media system, and thus the media system does not need to wait for information indicating the identified reference sequence of media content to be delivered from the server system to the media system via the network.

In some situations, while comparing the comparison fingerprint to reference fingerprints in the first set of reference fingerprints, the server system determines that the comparison between the comparison fingerprint and the reference fingerprint is inconclusive (e.g., corresponding to the INCONCLUSIVE state described above with reference to FIGS. 12A-12E). For example, the server system may determine that the content unit from which the comparison fingerprint was generated was substantially white or substantially black (e.g., more than 70% of the pixels were white or black), in which case the comparison fingerprint will typically not be sufficiently unique to identify the unknown content with certainly above a predefined threshold. When the comparison between the comparison fingerprint and one or more of the respective reference fingerprints is (1332) inconclusive, the server system compares subsequent comparison fingerprints received from the media system to subsequent reference fingerprints until one of the subsequent comparison fingerprints is identified as matching a reference fingerprints from a single reference sequence of media content.

In some embodiments, there is a confidence threshold that must be met before the distributed system (e.g., including the Media System 108 and the Content Replacement System 110) will transition from discovery mode 1002 (FIG. 10A) to a tracking mode 1004 (FIG. 10B). For example, this threshold may include the requirement that at least three sequential comparison fingerprints must match corresponding reference fingerprints. In these embodiments, if one or more reference fingerprints match a comparison fingerprint, even if the comparison fingerprint is indistinct (and thus the comparison is inconclusive), the match may be used to increment a confidence value (e.g., so that it will take fewer conclusive matches to transition to the tracking mode). For example, if three successive fingerprint matches are required to transition to Tracking Mode, a first comparison fingerprint matches a first reference fingerprint inconclusively, a second comparison fingerprint matches a second reference fingerprint conclusively and a third comparison fingerprint matches a third reference fingerprint conclusively, then the distributed system will transition from the discovery mode to tracking mode instead of waiting for an additional match, thereby speeding up the process of identifying the unknown sequence of media content.

After comparing the comparison fingerprint with the first plurality of reference fingerprints so as to identify the unknown sequence of media content, the server system sends (1334), to the media system, a second plurality of reference fingerprints for the identified reference sequence of media content. In some embodiments, the second plurality of reference fingerprints are sent to the media system so as to enable the media system to enter a tracking mode 1004 (FIG. 10B). In this tracking mode, the media system monitors current media content at the media system by comparing fingerprints in the second plurality of fingerprints with one or more additional comparison fingerprints generated at the media system based on a current sequence of media content (e.g. media content being presented or being prepared for presentation) at the media system. In this tracking mode, in response to determining that a respective additional comparison fingerprint does not match any of the reference fingerprints, the media system sends the respective additional comparison fingerprint to the server system so as to identify the current sequence of media content (e.g. media content being presented or being prepared for presentation) at the media system (e.g., thereby reentering discovery mode 1002 in FIG. 10A).

In some embodiments, the second plurality of reference fingerprints are sent (1338) to the media system as a stream of fingerprints generated in accordance with a chronological order of the identified reference sequence of media content (e.g., the reference fingerprints are sent to the media system sequentially in an order that is determined based on a chronological order of the units of content from which the reference fingerprints were generated). In some embodiments, the second plurality of reference fingerprints includes (1340) reference fingerprints for multiple distinct sequences of media content (e.g., when the server system identifies multiple matches, streams of fingerprints for multiple different channels are sent to the media system so that the client can compare fingerprints from multiple channels with the comparison fingerprints). In some embodiments the second plurality of reference fingerprints consists of (1342) reference fingerprints for a no more than a predefined number of sequences of media content. It should be understood that, in these embodiments, the second plurality of fingerprints are limited to a predetermined number of fingerprints so as to reduce the bandwidth required to transmit the second plurality of fingerprints (e.g., fingerprints for only one sequence of media content are sent to the media system). In some embodiments, the predefined number is determined based on bandwidth/cost considerations (upstream and/or downstream bandwidth).

In some embodiments, receiving (1344), at the server system, the comparison fingerprint includes receiving a stream of comparison fingerprints, and sending (1346) the sequence of reference fingerprints for the sequence of media content to the media system includes sending a stream of reference fingerprints to the media system. In some of these embodiments, after sending the stream of reference fingerprints, the server system ceases (1348) to receive the stream of comparison fingerprints from the media system. In other words, in these embodiments, when the distributed system enters a tracking mode 1004 (FIG. 10B), the distributed system ends the discovery mode 1002 (FIG. 10A).

Note that details of other processes described herein with respect to methods 900, 1100, 1200 and 1400 (e.g., FIGS. 9A-9F, 11A-11F, 12A-12E and 14A-14F) are also applicable in an analogous manner to method 1300 described above. For example, the fingerprints and/or content described above with reference to method 1300 may have one or more of the characteristics of the various fingerprints and/or content described herein with reference to methods 900, 1100, 1200 and/or 1400. For brevity, these details are not repeated here.

Generating Fingerprints

Attention is now directed to FIGS. 14A-14F, which illustrate a method 1400 of generating fingerprints for identifying an unknown sequence of media content in accordance with some embodiments. This method may be governed by instructions that are stored in a non-transitory computer readable storage medium and that are executed by one or more processors of one or more computer systems (e.g., a Media System 108 or a Content Replacement System 110). Each of the operations shown in FIGS. 14A-14F may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The computer system is provided (1402) with a plurality of sample locations (e.g., 20, 50, 108, 432 or any other reasonable number) for sampling an optical property. In some embodiments, these sample locations are predefined. In some embodiments, these sample locations are determined by the computer system. However, in order for the fingerprint comparison to be effective, the sample locations will typically have to remain in the same relative position in each respective unit of content.

In some embodiments, each sample location is (1404) a block of pixels including a plurality of pixels. In some of these embodiments, the number of pixels in a pixel block is determined (1406) based on a resolution the sequence of media content. For example, for standard definition content (e.g., 640×480 pixels), the pixel block would be a 8×4 pixel block; while for 720p high definition content (e.g., 1280× 720) the pixel block would be 16×6 pixels; and for 1080p high definition content (e.g., 1920×1080 pixels) the pixel block would be 14×10 pixels. In other words, in some embodiments, the size of the pixel block is selected such that the ratio of the number of pixels in a pixel block to the number of pixels in the content unit is constant between content units of different resolution. In some embodiments, the size and/or shape of the pixel blocks is selected so that the pixel block includes an integer number of pixels at a variety of different common content resolutions (e.g., SD, 720p, 1080p, etc.). Although other arrangements of sample locations could be used in place of the pixel blocks described above, the use of pixel blocks as described above substantially simplifies the computations required to compare content that has been resized to different resolutions, thereby improving the speed and efficiency of comparing comparison fingerprints with reference fingerprints.

Frequently for broadcast television content, a broadcast will have a stationary element (e.g., a channel icon, text, stock ticker) located on the bottom and/or top of the broadcast stream. Thus, in some embodiments, the sample locations are selected (1408) so as to be located within a central region of a display area. In some embodiments, the sample locations are located away from the edges of the display area (e.g., the sample locations are located below the top 30-40% of the display and above the bottom 30-40% of the display). Frequently changes between sequential frames of video content result in whole columns of pixels changing at the same time (e.g., due to horizontal motion of people, vehicles, etc. across the screen). Thus, in some embodiments, the sample locations are selected (1410) so as to be staggered horizontally in a display area so as to have sample locations with a wide variety of different values.

The computer system generates (1412) reference fingerprints for each of a plurality of respective units (e.g., frames) of reference sequences of media content (e.g., videos). The computer system gets (1414) a respective unit of media content. In some embodiments, a respective unit is (1416) a frame of video content. In some embodiments a respective unit is (1418) a single image.

The computer system determines (1420) a set of sample values including a sample value of the optical property at each sample location of the respective reference unit of media content. In some embodiments the optical property is a measurement of the light intensity such as a photometric quantity (e.g., luminance), a radiometric quantity (e.g., radiant emittance), a chromatic quantity, etc. In some embodiments the optical property is a chromatic property (e.g., hue and/or saturation). In some embodiments, each sample location includes (1422) a plurality of pixels (e.g., a block of pixels) including a plurality of pixels, and determining a sample value of the optical property of the plurality of pixels (e.g., a block of pixels) includes determining (1424) an average value of the optical property for a subset of the pixels in the plurality of pixels (e.g., the block of pixels). These sample values are stored (1426) at least temporarily at the computer system for use in generating a reference fingerprint for the unit of media content. After determining the sample value, the computer system determines if there are more sample locations in the unit of media content for which sample values have yet to be determined. If there are (1428) more sample locations for which sample values have yet to be determined for the respective unit of media content, the computer system determines values for those sample locations until there are no (1430) further sample locations for which sample values have yet to be determined.

After determining the sample values, the computer system determines (1432) one or more statistical measures of the set of sample values. In some embodiments, the one or more statistical measures include a measure of the central tendency of the sample values (e.g., an average such as a mean, median or mode of the sample values for a respective unit of media content). In some embodiments the one or more statistical measures include a measure of the dispersion of the sample values (e.g., range, standard deviation, etc. for a respective unit of media content). These sample values are stored (1426) at least temporarily at the computer system for use in generating a reference fingerprint for the unit of media content. The sample values and statistical measure(s) for the sample values for a respective unit of media content are used to generate (1440) the reference fingerprint for the respective unit of media content. In some embodiments, the sample locations have an order and a fingerprint includes: a list of the sample values in the order of the sample locations, and the one or more statistical measures. The computer system also determines if there are any more units of media content to generate fingerprints for. If there are (1442) more units, the computer system gets a next respective unit of media content and repeats the process described above. However, if there are (1444) no more units of media content for which fingerprints are to be generated, the reference fingerprint generation process ends.

The computer system stores (1446) a plurality of the reference fingerprints. After storing one or more of the reference fingerprints, the computer system receives (1448) a comparison fingerprint of an unknown unit from an unknown sequence of media content for comparison with the plurality of reference fingerprints. The comparison fingerprint includes a sample value for each of the sample locations in the unknown unit of media content, and one or more statistical measures of the set of sample values. In other words, in some embodiments, the comparison fingerprint is a fingerprint that was generated from an unknown sequence of media content in a manner that is substantially the same as the manner in which the reference fingerprints were generated as described above with reference to operations 1412-1440. In some embodiments, the unknown sequence of media content is (1450) video content, and the respective units are sequential frames of the video content. In some embodiments, the unknown sequence of media content is (1452) video content and the respective units are frames of video content selected from substantially evenly distributed times within the video content (e.g., a fingerprint is generated for each frame or a fingerprint is generated from every sixtieth frame, etc.).

The computer system compares (1454) the comparison fingerprint with the reference fingerprints so as to identify the unknown sequence of media content as one of the reference sequences of media content. In some embodiments, comparing the comparison fingerprint with the reference fingerprint includes identifying (1456) a subset of reference fingerprints whose one or more statistical measures are substantially equal to the one or more statistical measures of the comparison fingerprint; comparing the set of sample values of the comparison fingerprint to the sets of sample values associated with the reference fingerprints in the subset of reference fingerprints so as to determine a matching reference fingerprint (as described in greater detail below with reference to operations 1454-1484); and identifying the unknown sequence of media content as a respective reference sequence of media content from which the matching reference fingerprint was generated (as described in greater detail below with reference to operation 1486). In other words, the statistical measures are used as a filter to reduce the number of computations that need to be performed to identify a matching reference fingerprint. For example, if the mean luminance of the pixel blocks used to generate the comparison fingerprint is 50, then only reference fingerprints generated from pixel blocks with a mean luminance of approximately fifty are likely to match the comparison fingerprint. Thus, only reference fingerprints generated from units of media content having pixel blocks with a mean luminance of approximately fifty need be compared with the comparison fingerprint.

In some embodiments, the one or more statistical measures include (1458) a first statistical measure and a second statistical measure, and the subset of reference fingerprints includes (1460) only reference fingerprints whose first statistical measure is substantially equal to a first statistical measure (e.g., within 1%, 5% 10% or any reasonable threshold of the first statistical measure) of the comparison fingerprint and whose second statistical measure is substantially equal to a second statistical measure (e.g., within 1%, 5% 10% or any reasonable threshold of the second statistical measure) of the comparison fingerprint. In some embodiments the first statistical measure is a measure of central tendency and the second statistical measure is a measure of dispersion. Using two different types of statistical measures in this way is advantageous, because it ensures that the fingerprints being compared are only fingerprints that were generated from units of media content that have similar optical characteristics (e.g., video frames that have a similar average brightness and range of luminance). As one example, the first statistical measure is an average, and the second statistical measure is a range between the highest sample value and the lowest sample value.

In some embodiments, identifying the subset of reference fingerprints is performed using (1462) a hashing function that uses the one or more statistical measures as inputs. In some embodiments, a hash table for the hashing function is generated (1464) after the unknown sequence of media content has been transmitted from a content provider and before the unknown sequence of media content is scheduled to be displayed at a media system. In some embodiments, a plurality of hash tables are generated (1466), each hash table corresponding to units of reference sequences of media content that have been broadcast for display during a respective broadcast window (e.g., for a two second broadcast window, each hash table would correspond to the fingerprints of all of the frames for the television channels broadcast for display during the two second broadcast window). In some embodiments, there is a six second buffer between when a unit of content is broadcast and when it is to be displayed, and thus there are three separate hash tables that are generated based on fingerprints for the frames in the six second buffer (e.g., a first hash table for all of the frames to be displayed in 0-2 seconds, a second hash table for all of the frames to be displayed in 2-4 seconds, and a third hash table for all of the frames to be displayed in 4-6 seconds, etc.).

In some embodiments, comparing the comparison fingerprint with the reference fingerprint includes, after comparing the respective statistical values, comparing (1468) the set of sample values of the comparison fingerprint to the sets of sample values associated with the reference fingerprints in the subset of reference fingerprints so as to determine a matching reference fingerprint. In some embodiments, comparing the set of sample values of the comparison fingerprint to the sets of sample values associated with the reference fingerprints includes, for a respective reference fingerprint: computing (1470) a difference metric indicative of a comparison between the sample values of the comparison fingerprint and the sample values of the respective reference fingerprint, and determining whether the difference metric is above a predetermined threshold (e.g., the difference metric is a root mean squared distance between the sample values of the comparison fingerprint and corresponding sample values of the respective reference fingerprint).

It should be understood that when a fingerprint includes a plurality of sample values, the computer system can determine that a reference fingerprint does not match the comparison fingerprint if even a subset of the sample values of the reference fingerprint are sufficiently different from corresponding sample values of the comparison fingerprint. For example if the first five sample values of the reference fingerprint are white, while the first five sample values of the comparison fingerprint are black, it is very unlikely that the reference fingerprint matches the comparison fingerprint. While this is a very simple example, it should be understood more generally that a reference fingerprint can be identified (1472) as not matching the comparison fingerprint based on a comparison of a subset of the sample locations of the reference fingerprint with a subset of the sample locations of the comparison fingerprint.

More particularly, in some embodiments, the sample locations have (1476) a predetermined order, the difference metric includes a plurality of components corresponding to respective sample locations. In some of these embodiments, the comparing includes computing the difference metric by incrementally adding components corresponding to respective sample locations in accordance with the predetermined order. It should be understood that, typically, the predetermined order can be any predetermined order, so long as the same predetermined order is used for the sample locations used to generate the fingerprints that are to be compared. As one illustrative example, the difference metric is a root mean square measure of the difference between corresponding sample values for the reference fingerprint and the comparison fingerprint, and thus a respective component is the square of the difference between a reference fingerprint sample value at a particular sample location and a corresponding comparison fingerprint sample value at the particular location.

When incrementally adding a respective component to the difference metric for a respective reference fingerprint increases (1478), the difference metric above the predetermined threshold, the respective reference fingerprint is identified (1480) as not matching the comparison fingerprint. Continuing the example above, if there are 10 sample locations, the predetermined threshold is 5, and the first five components are 100, 9, 144, 4 and 100 (e.g., the difference between the first five sample locations is 10, 3, 12 and 10, respectively), the predetermined threshold will be reached after the third component is added to the difference metric (e.g., 100+9+144=253 and the square root of 253/100 is greater than 5).

In contrast, when incrementally adding the respective component to the difference metric for the respective reference fingerprint does (1482) not increase the difference metric above the predetermined threshold and there are no more components to add to the difference metric, the respective reference fingerprint is identified (1484) as matching the comparison fingerprint. For example, if there are 10 sample locations, the predetermined threshold is 5, and the ten components are 0, 0, 4, 9, 0, 100, 25, 0, 1, 1 (e.g., the difference between the sample locations is 0, 0, 2, 3, 0, 10, 5, 0, 1, 1, respectively), the difference metric will be below the threshold (e.g., 0+0+4+9+0+100+25+0+1+1=141 and the square root of 141/100 is less than 5), and the respective reference fingerprint will be identified as matching the comparison fingerprint when the last component is added.

In some embodiments, after comparing the comparison fingerprint to the reference fingerprints, and identifying a reference fingerprint, the computer system identifies (1486) the unknown sequence of media content as a respective reference sequence of media content from which the matching reference fingerprint was generated. It should be understood that in some circumstances multiple matching reference fingerprints will be identified. In such cases, the computer system may use various methods to determine which of the reference sequences of media content best matches the unknown sequence of media content (e.g., by selecting the reference sequence of media content associated with the reference fingerprint having the lowest difference metric value or by comparing subsequent reference fingerprints from each of the matched reference sequences of media content, as described above in greater detail above with reference to FIGS. 12A-12E as the MULTIPLE state).

While the preceding examples have been described with respect to embodiments where the fingerprints are generated for a single content unit (e.g., a single video frame or a single image), it should be understood that fingerprints could be generated in a similar fashion by combining multiple content units (e.g., by addition, averaging, subtraction, etc), so as to generate a single combined unit that corresponds to the multiple units of content, and performing any combination of the steps described above on the combined unit (e.g., the unit of content that represents multiple video frames).

Note that details of other processes described herein with respect to methods 900, 1100, 1200 and 1300 (e.g., FIGS. 9A-9F, 11A-11F, 12A-12E and 13A-13D) are also applicable in an analogous manner to method 1400 described above. For example, the fingerprints described above with reference to method 1400 may have one or more of the characteristics of the various fingerprints described herein with reference to methods 900, 1100, 1200 and/or 1300. For brevity, these details are not repeated here.

The foregoing description, for purpose of explanation, has been described with reference to specific embodiments. However, the illustrative discussions above are not intended to be exhaustive or to limit the disclosed system and method to the precise forms disclosed. Many modifications and variations are possible in view of the above teachings. The embodiments were chosen and described in order to best explain the principles of the disclosed system and method and its practical applications, to thereby enable others skilled in the art to best utilize the disclosed system and method and various embodiments with various modifications as are suited to the particular use contemplated.

What is claimed is:

1. A method comprising:
receiving, by a server system from a media system, a request for additional media content, wherein the request includes data indicative of a sequence of first media content comprising a weak fingerprint generated based on a subset of blocks of a single frame of the first media content;
determining, by the server system using the data indicative of the sequence of first media content, that a portion of the sequence of first media content is associated with a content selection parameter stored in a database of the server system, wherein the content selection parameter is indicative of a circumstance under which the portion of the sequence of first media content is to be replaced or supplemented with additional media content, wherein the content selection parameter is associated with the portion of the sequence of first media content in the database of the server system based on instructions provided by a content provider of the sequence of first media content;
selecting, by the server system based on the weak fingerprint and the content selection parameter, second media content for display by the media system in place of or overlaying the portion of the sequence of first media content;
generating a strong fingerprint for the first media content based on a larger subset of the blocks of one or more frames of the first media content, relative to the subset of blocks associated with the weak fingerprint;
verifying the selection of the second media content for display by the media system in place of or overlaying the portion of the sequence of first media content based on a determination that the strong fingerprint of the first media content and the weak fingerprint of the first media content match; and
sending, by the server system to the media system, responsive to the verifying the match between the strong fingerprint and the weak fingerprint, a response to the request, wherein the response includes information enabling the media system to display the second media content in place of or overlaying the portion of the sequence of first media content at an insertion point in the first media content while the sequence of first media content continues to advance at the media system, wherein the information comprises data indicative of the insertion point for the second media content such that the media system is enabled to make a determination, based on the data, when to begin displaying the second media content.

2. The method of claim 1, wherein the second media content comprises a sequence of replacement media content for display in place of the portion of the sequence of first media content.

3. The method of claim 2, wherein the portion of the sequence of first media content comprises a generic advertisement, and wherein the sequence of replacement media content comprises a targeted advertisement for display by the media system in place of the generic advertisement.

4. The method of claim 1, wherein the second media content comprises supplemental content for display overlaying the portion of the sequence of first media content.

5. The method of claim 4, wherein the supplemental content comprises interactive supplemental content.

6. The method of claim 1, wherein the data indicative of the sequence of first media content comprises a channel identifier and a timestamp.

7. The method of claim 1, wherein the request includes data indicative of a reference position within the sequence of first media content, and wherein the selecting is further based on the reference position within the sequence of first media content.

8. The method of claim 1, further comprising obtaining information about an end-user of the media system, wherein the selecting is further based on the information about the end-user of the media system.

9. The method of claim 8, wherein the content selection parameter comprises a target demographic, and wherein the information about the end-user of the media system comprises demographic information about the end-user of the media system.

10. The method of claim 1, wherein the request includes data indicative of a technical limitation of the media system, and wherein the selecting is further based on the technical limitation of the media system.

11. The method of claim 1, wherein the data indicative of the sequence of first media content comprises a fingerprint, and wherein determining the content selection parameter using the data indicative of the sequence of first media content comprises:
determining an identifier of the sequence of first media content using the fingerprint; and
determining the content selection parameter using the identifier of the sequence of first media content.

12. The method of claim 1, wherein the server system comprises a processing unit and a network communication interface, and wherein sending the response to the media system comprises sending the response to the media system using the network communication interface.

13. The method of claim 1, wherein the weak fingerprint is generated based on sampling a luminance of a plurality of blocks.

14. The method of claim 1, wherein the second media content comprises an advertisement, and wherein the method further comprises:
generating a strong fingerprint for the advertisement based on sampling every block of a first frame of the advertisement.

15. A non-transitory computer-readable medium having stored therein instructions that are executable to cause a server system to perform functions comprising:
receiving, from a media system, a request for additional media content, wherein the request includes data indicative of a sequence of first media content comprising a weak fingerprint generated based on a subset of blocks of a single frame of the first media content;
determining, using the data indicative of the sequence of first media content, that a portion of the sequence of first media content is associated with a content selection parameter stored in a database of the server system, wherein the content selection parameter is indicative of a circumstance under which the portion of the sequence of first media content is to be replaced or supplemented with additional media content, wherein the content selection parameter is associated with the portion of the sequence of first media content in the database of the server system based on instructions provided by a content provider of the sequence of first media content;
selecting, based on the weak fingerprint and the content selection parameter, second media content for display by the media system in place of or overlaying the portion of the sequence of first media content;
generating a strong fingerprint for the first media content based on a larger subset of the blocks of one or more frames of the first media content, relative to the subset of blocks associated with the weak fingerprint;

verifying the selection of the second media content for display by the media system in place of or overlaying the portion of the sequence of first media content based on a determination that the strong fingerprint of the first media content and the weak fingerprint of the first media content match; and sending, to the media system, responsive to the verifying the match between the strong fingerprint and the weak fingerprint, a response to the request, wherein the response includes information enabling the media system to display the second media content in place of or overlaying the portion of the sequence of first media content at an insertion point in the first media content while the sequence of first media content continues to advance at the media system, wherein the information comprises data indicative of the insertion point for the second media content such that the media system is enabled to make a determination, based on the data, when to begin displaying the second media content.

16. The non-transitory computer-readable medium of claim 15, wherein the second media content comprises a sequence of replacement media content for display in place of the portion of the sequence of first media content.

17. A server system comprising:
a processing unit; and
a computer-readable medium having stored therein instructions that are executable to cause the server system to perform functions comprising:
receiving, from a media system, a request for additional media content, wherein the request includes data indicative of a sequence of first media content comprising a weak fingerprint generated based on a subset of blocks of a single frame of the first media content;
determining, using the data indicative of the sequence of first media content, that a portion of the sequence of first media content is associated with a content selection parameter stored in a database of the server system, wherein the content selection parameter is indicative of a circumstance under which the portion of the sequence of first media content is to be replaced or supplemented with additional media content, wherein the content selection parameter is associated with the portion of the sequence of first media content in the database of the server system based on instructions provided by a content provider of the sequence of first media content;

selecting, based on the weak fingerprint and the content selection parameter, second media content for display by the media system in place of or overlaying the portion of the sequence of first media content;

generating a strong fingerprint for the first media content based on a larger subset of the blocks of one or more frames of the first media content, relative to the subset of blocks associated with the weak fingerprint;

verifying the selection of the second media content for display by the media system in place of or overlaying the portion of the sequence of first media content based on a determination that the strong fingerprint of the first media content and the weak fingerprint of the first media content match; and sending, to the media system, responsive to the verifying the match between the strong fingerprint and the weak fingerprint, a response to the request, wherein the response includes information enabling the media system to display the second media content in place of or overlaying the portion of the sequence of first media content at an insertion point in the first media content, wherein the information comprises data indicative of the insertion point for the second media content such that the media system is enabled to make a determination, based on the data, when to begin displaying the second media content.

18. The server system of claim 17, wherein the second media content comprises a sequence of replacement media content for display in place of the portion of the sequence of first media content.

19. The server system of claim 18, wherein the portion of the sequence of first media content comprises a generic advertisement, and wherein the sequence of replacement media content comprises a targeted advertisement for display by the media system in place of the generic advertisement.

20. The server system of claim 17, wherein the second media content comprises supplemental content for display overlaying the portion of the sequence of first media content.

21. The server system of claim 17, wherein the data indicative of the insertion point comprises data indicating a position in the first media content relative to a frame of the sequence of first media content used to generate the data indicative of the sequence of first media content.

* * * * *

UNITED STATES PATENT AND TRADEMARK OFFICE
CERTIFICATE OF CORRECTION

PATENT NO. : 11,889,155 B2
APPLICATION NO. : 16/017900
DATED : January 30, 2024
INVENTOR(S) : Gordon Page 1 of 2

It is certified that error appears in the above-identified patent and that said Letters Patent is hereby corrected as shown below:

On the Title Page

Item (72), in "Inventor", Line 1, delete "Hills" and insert -- Hill --, therefor.

In the Drawings

Figure 9A:
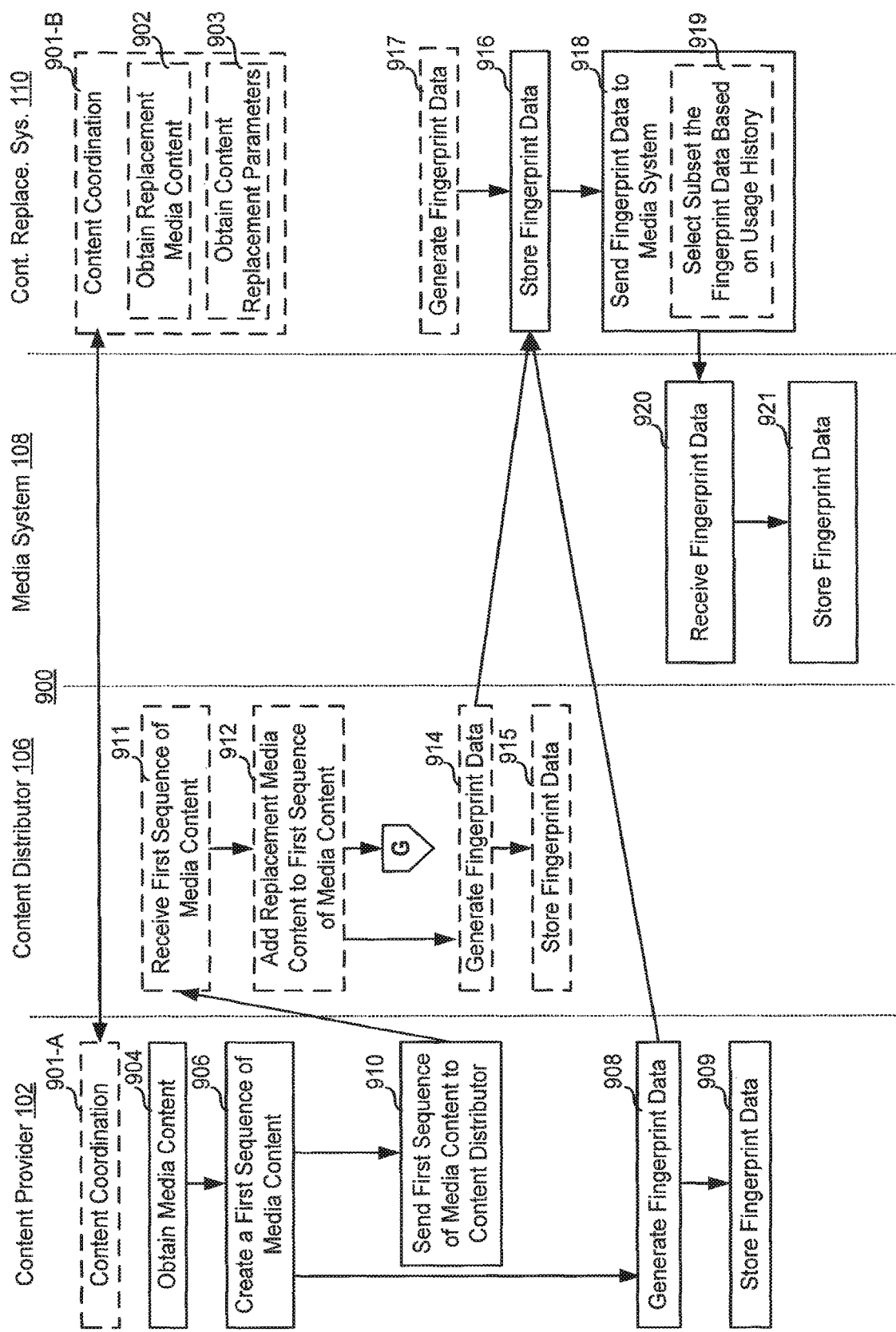
FIG. 9A-9F include a flow diagram of a process for remotely controlling media systems using detected fingerprints in accordance with some embodiments.
Figure 9B:
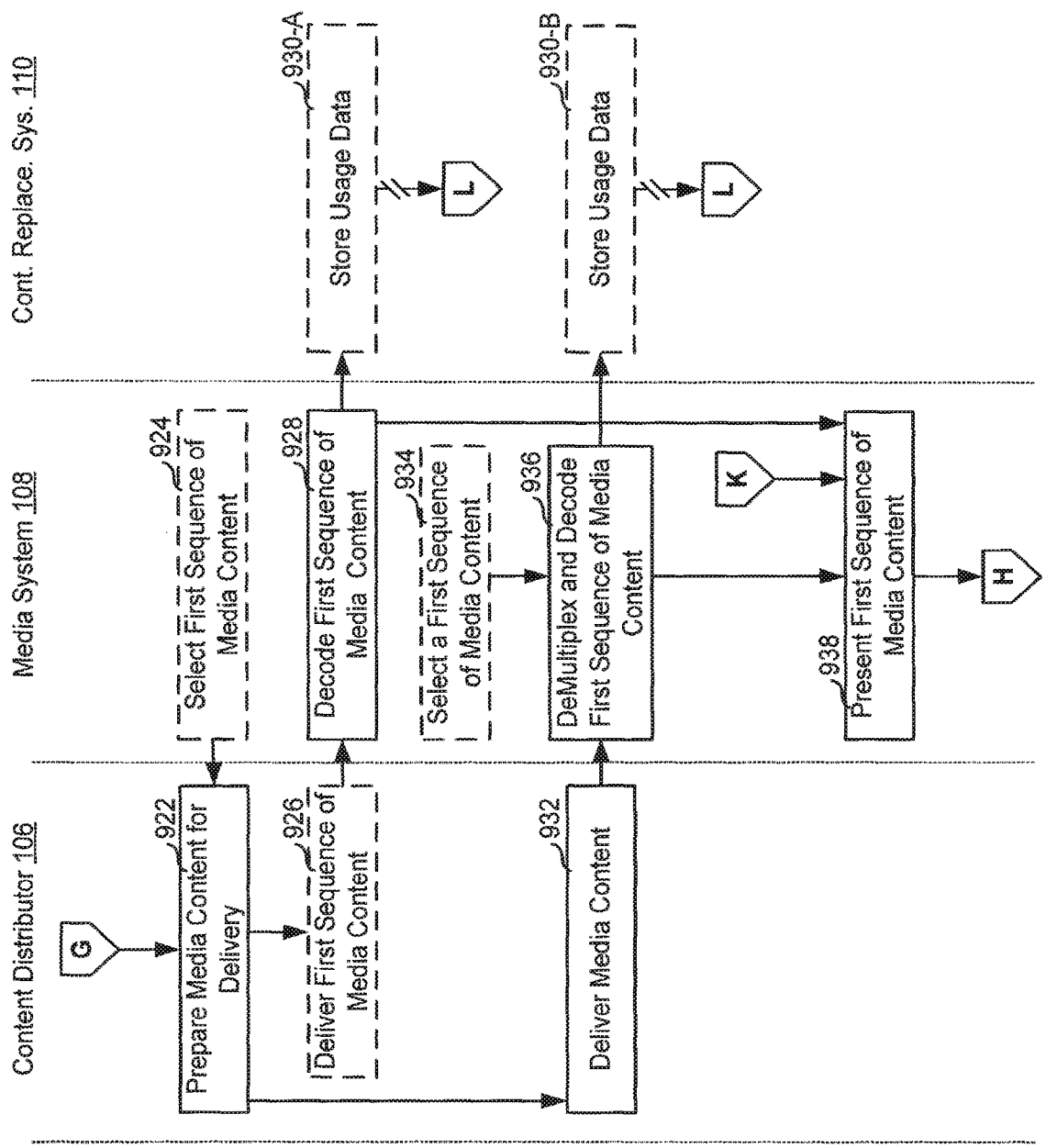
Figure 9C:
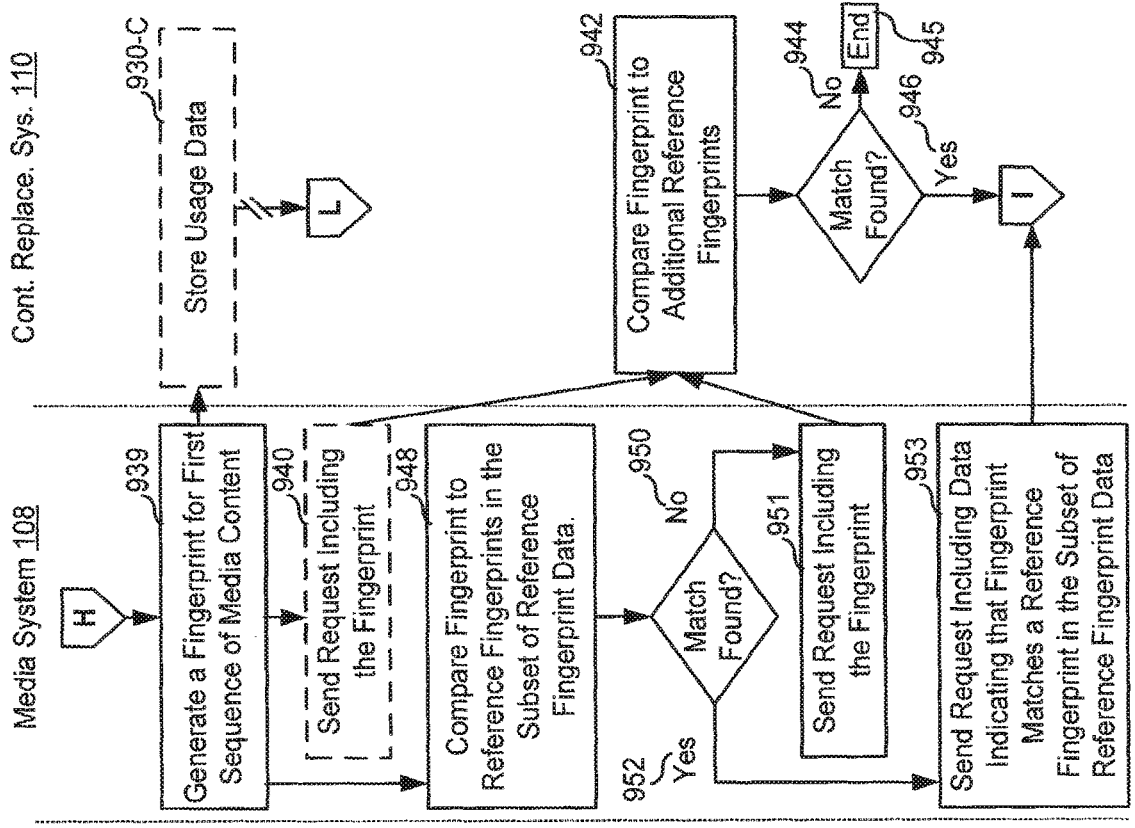
Figure 9D:
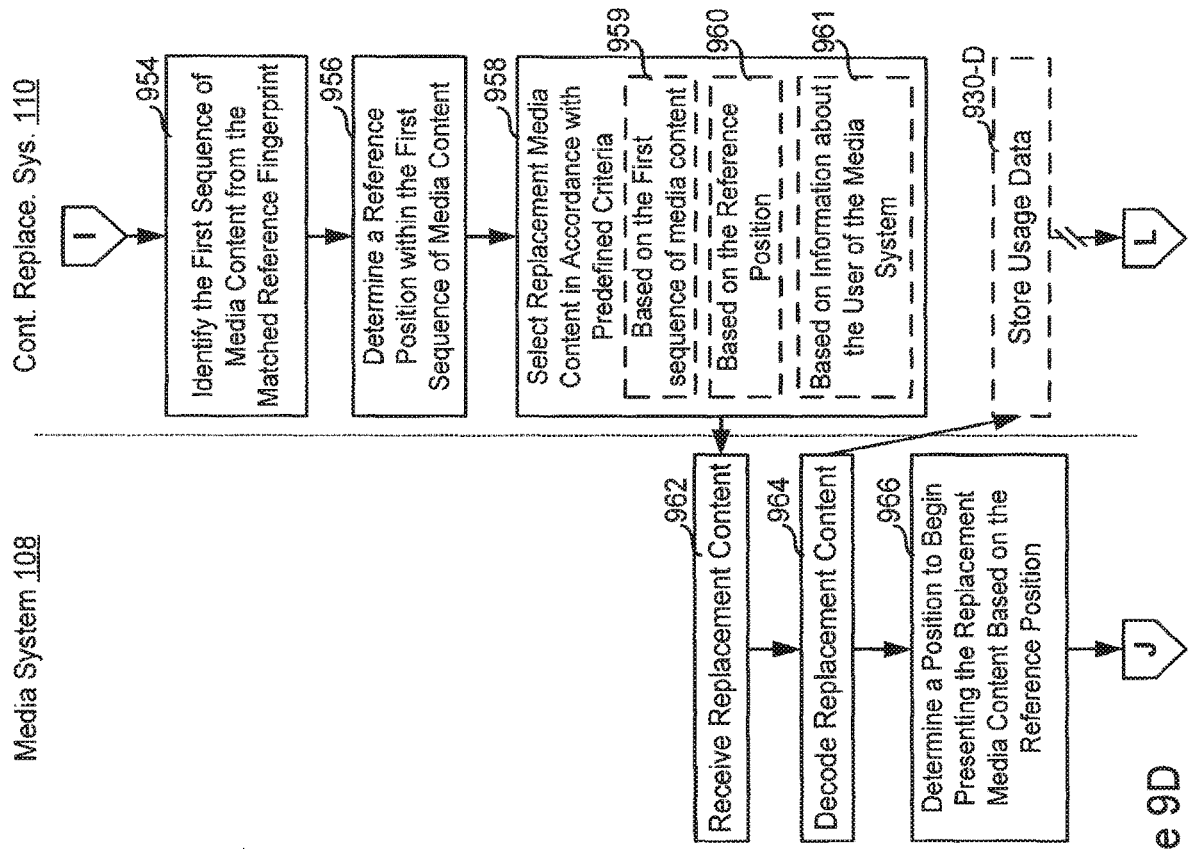
Figure 9E:
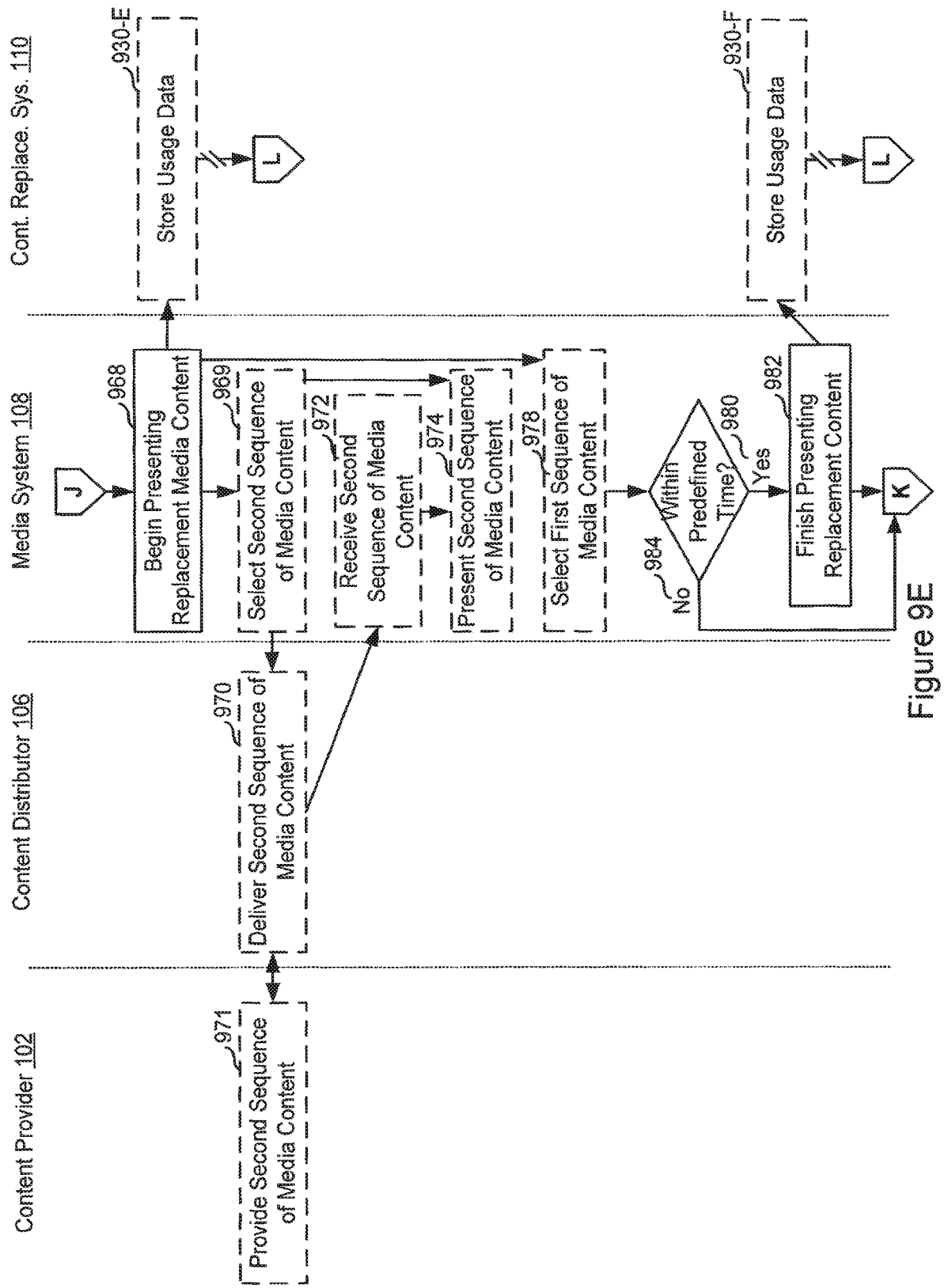
Figure 9F:
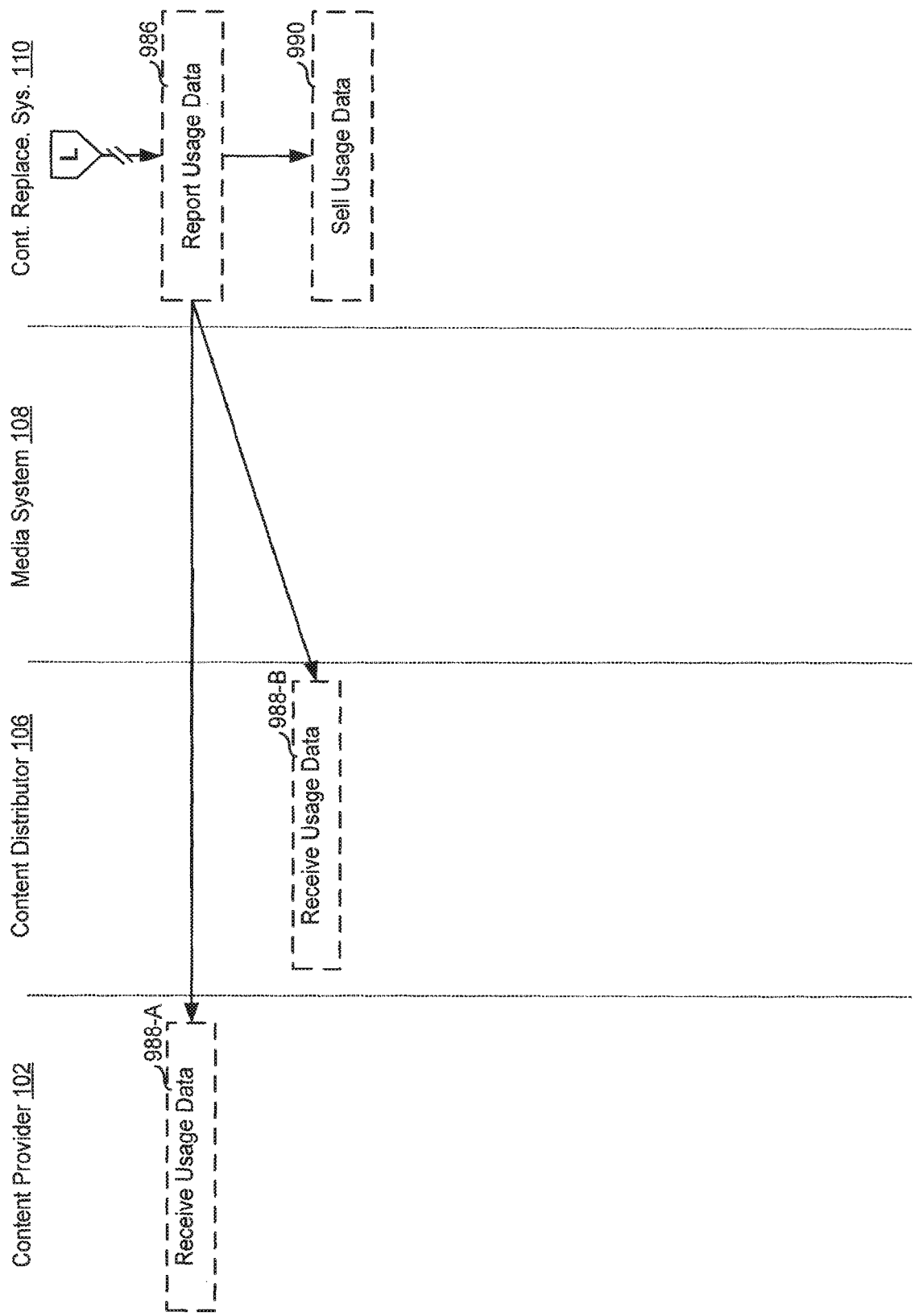

On Sheet 13 of 40, FIG. 9A, Tag 919, Line 1, after "Subset" insert -- to --.

Figure 11A:
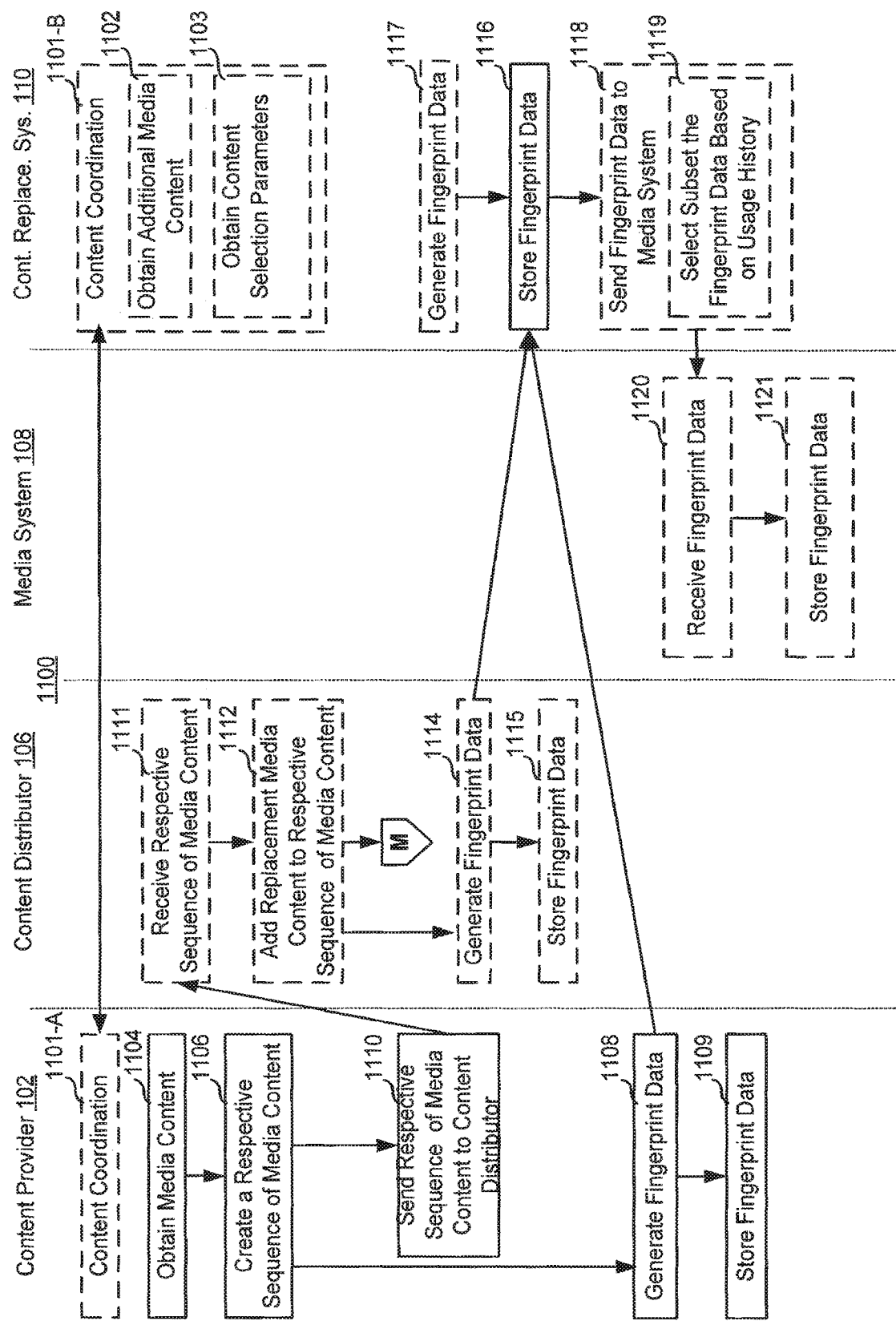
Figure 11B:
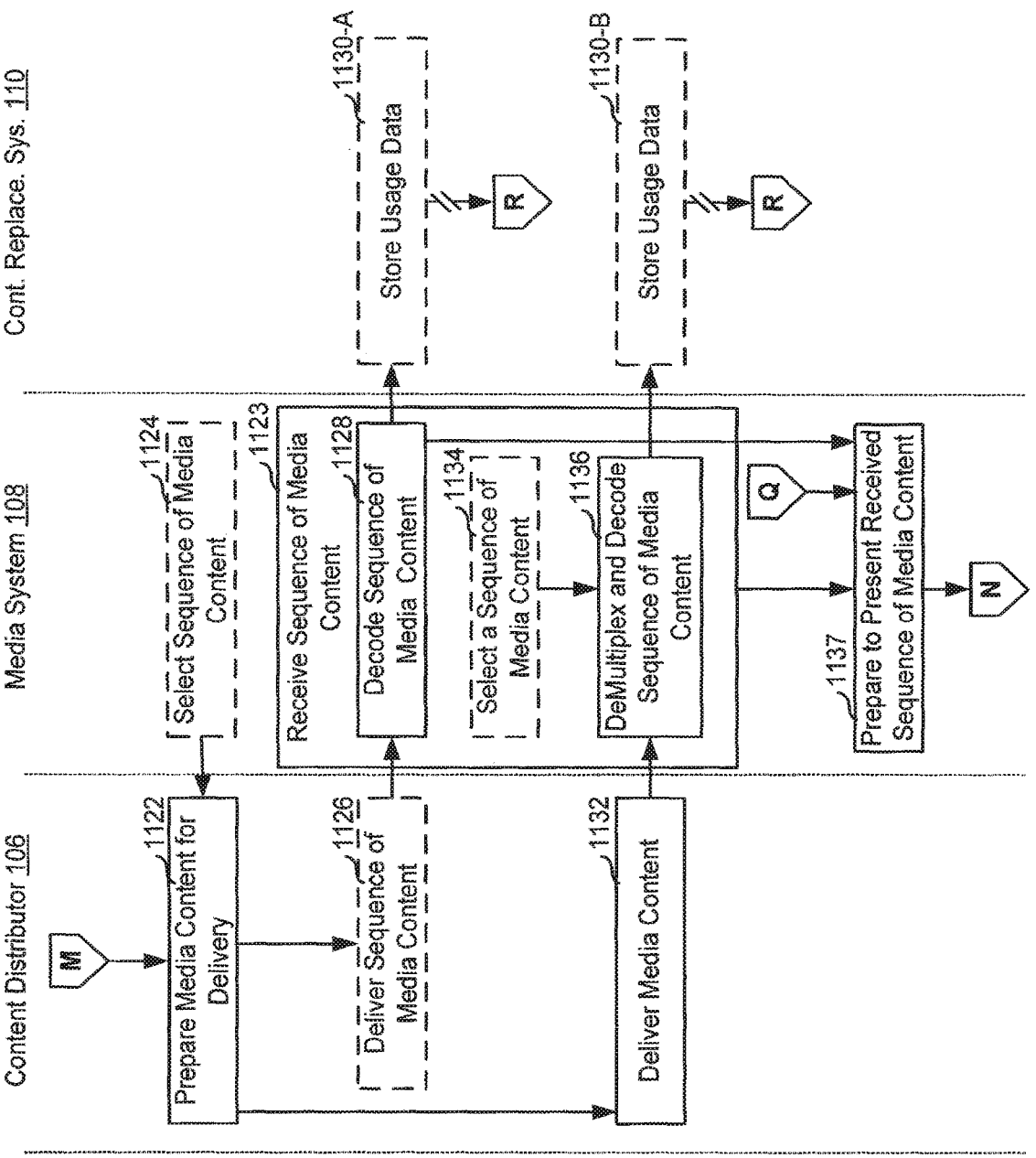
Figure 11C:
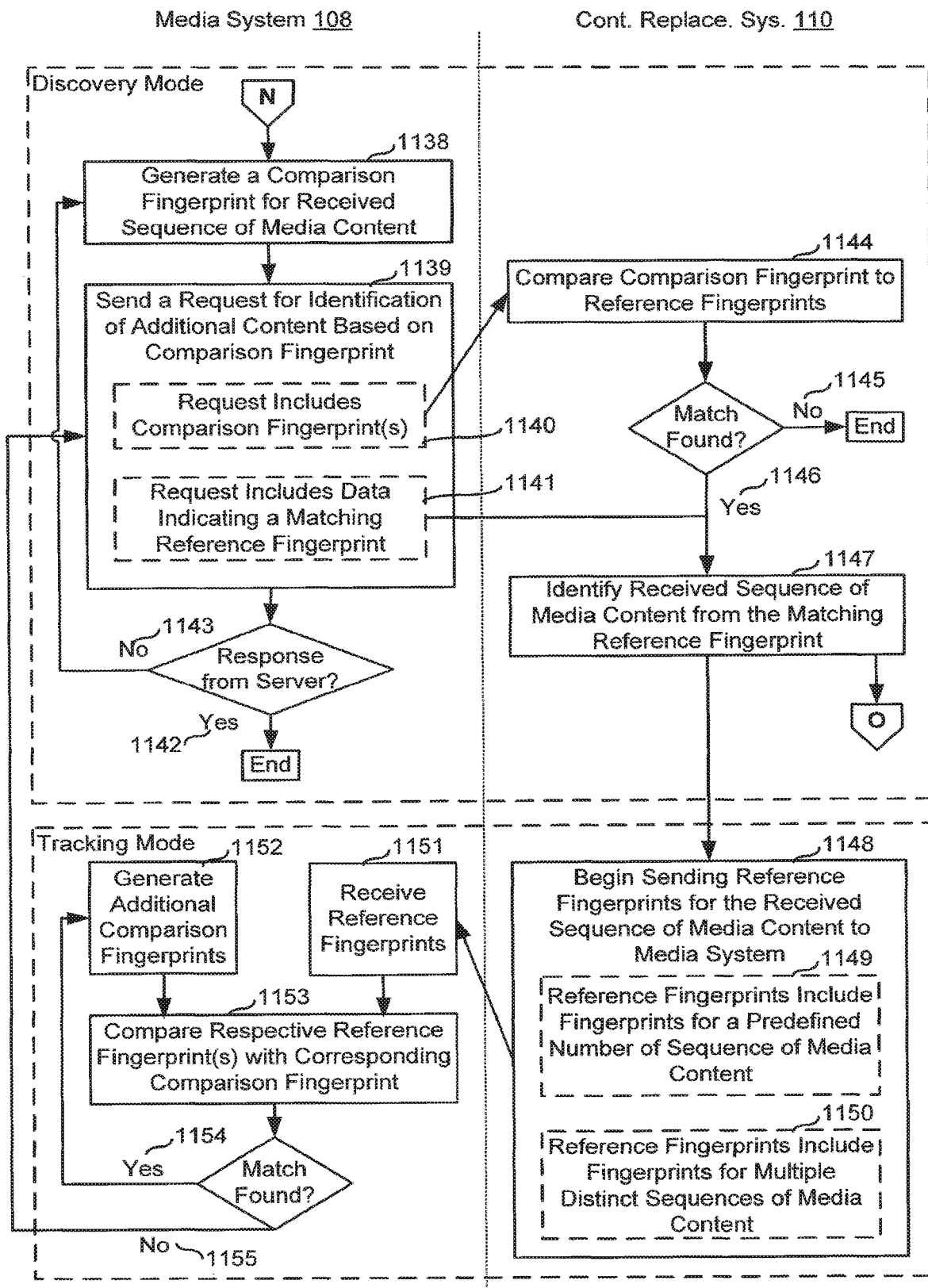
Figure 11D:
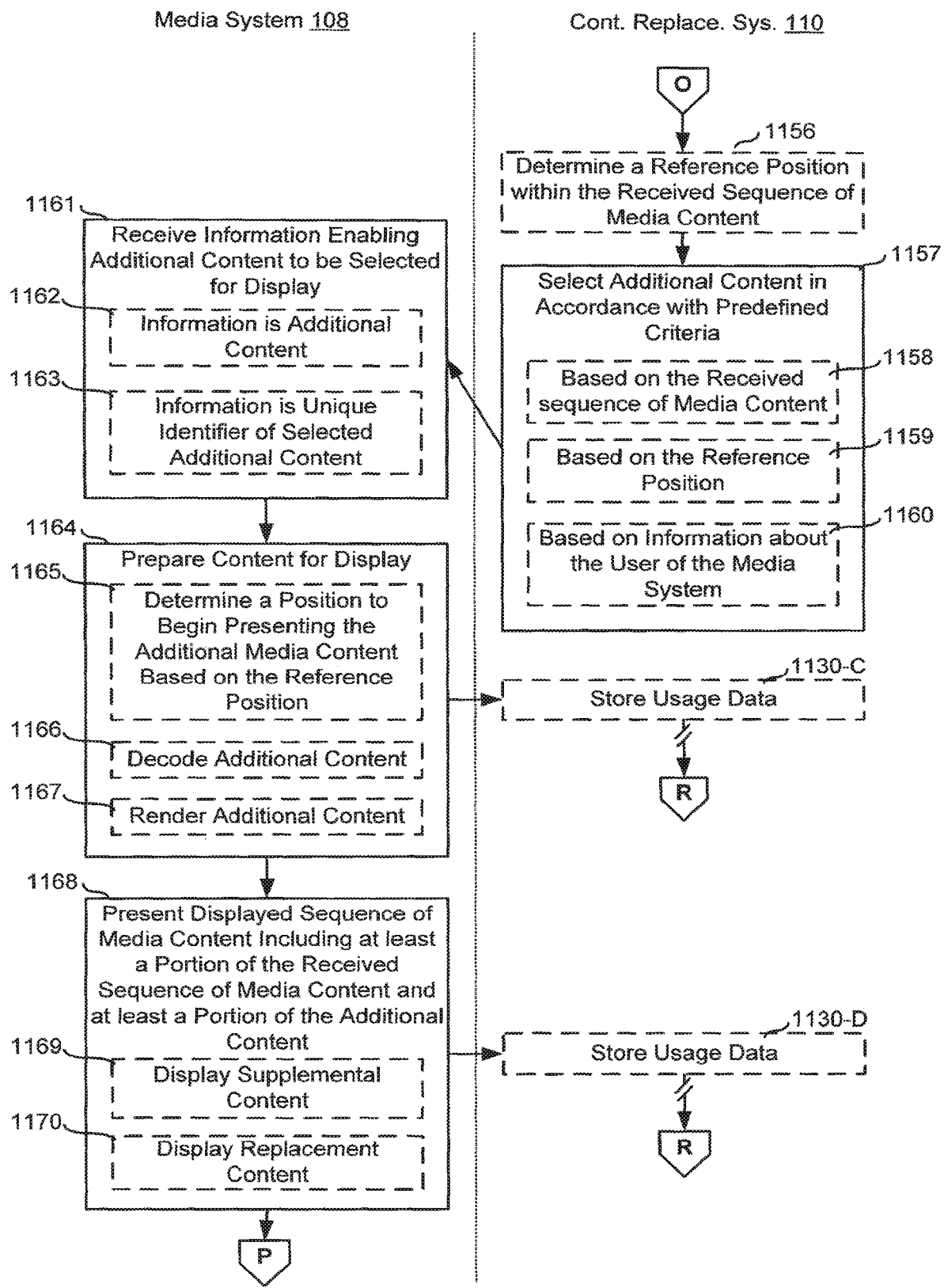
Figure 11F:
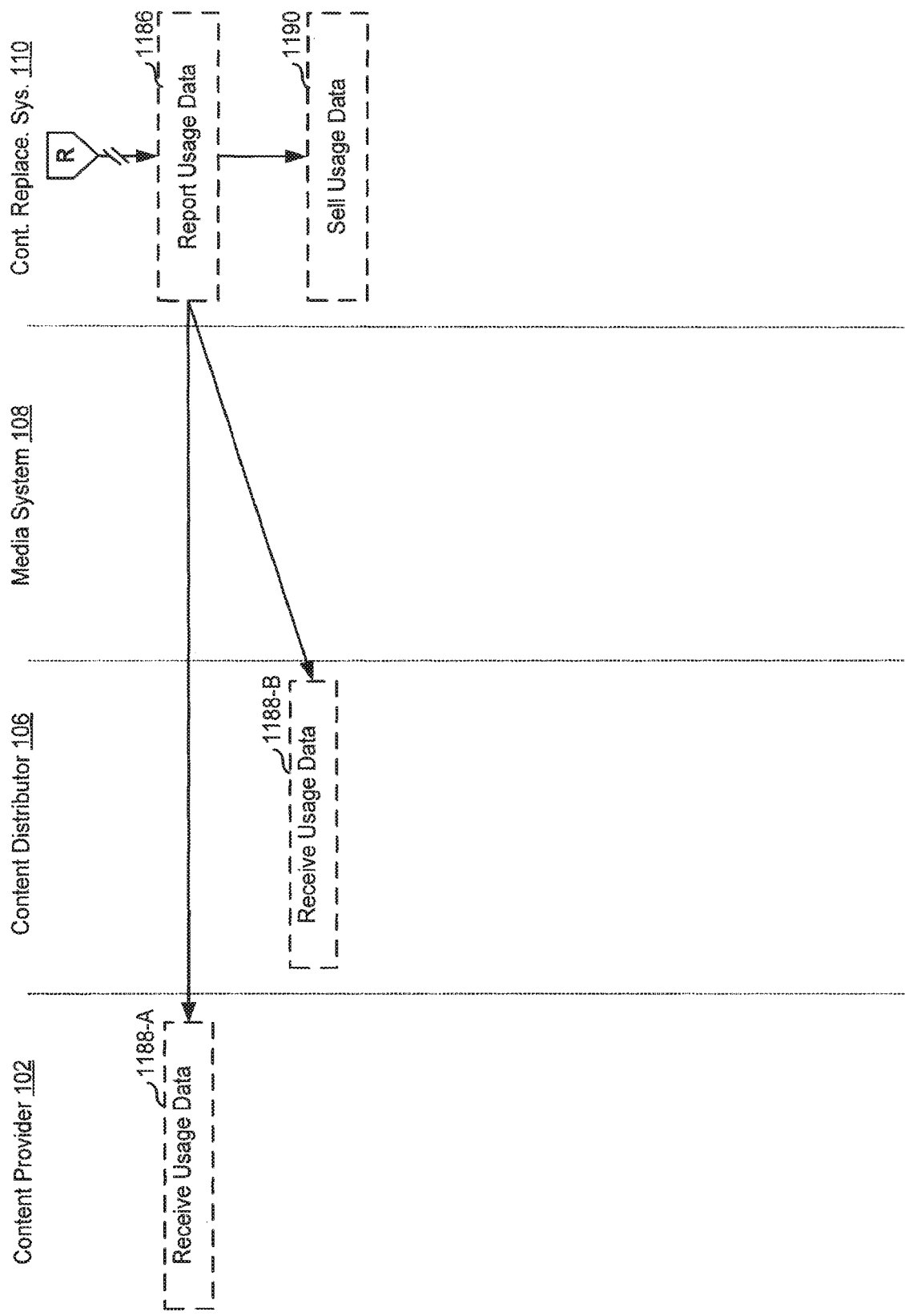
Figure 12A:
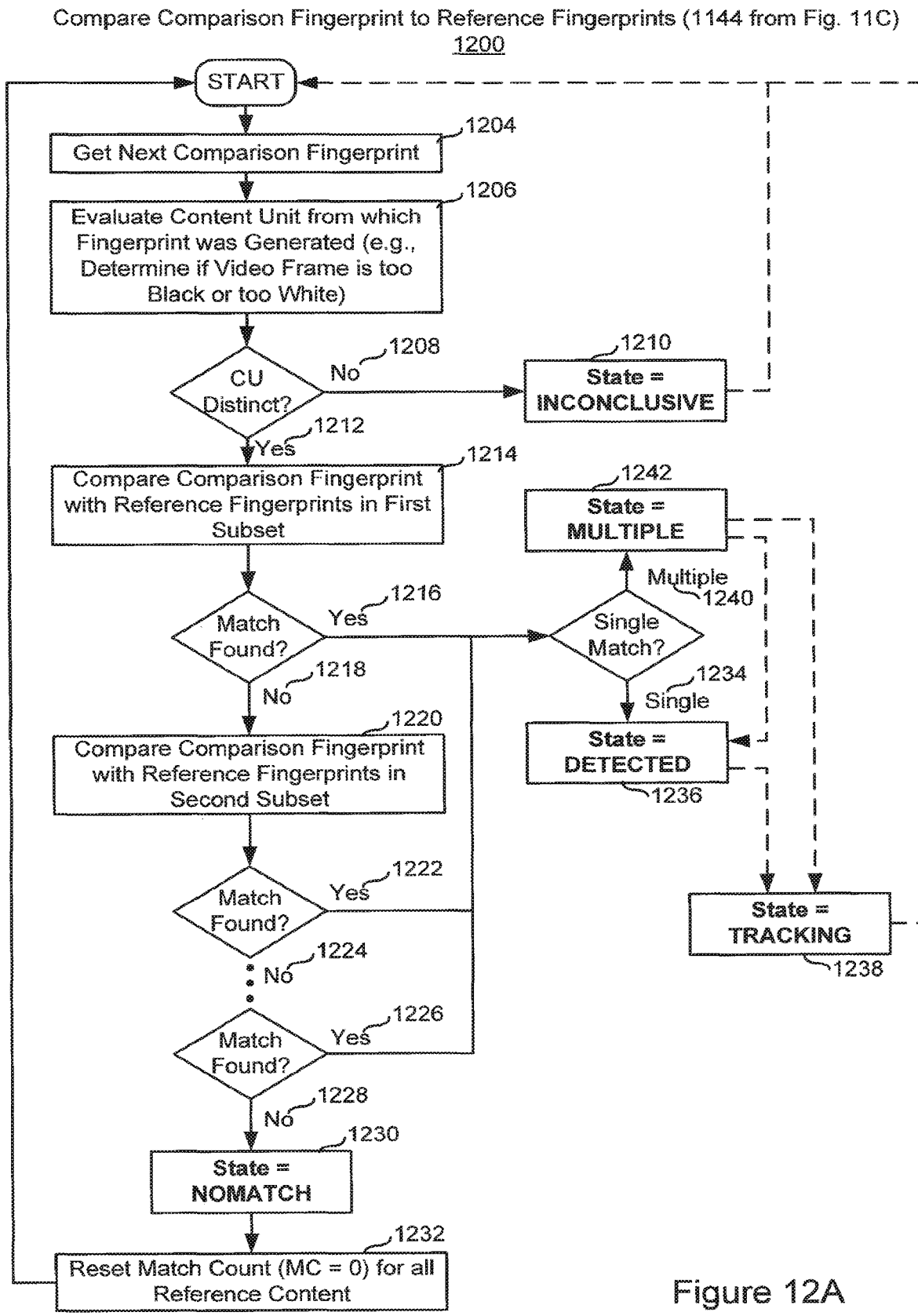
FIGS. 12A-12E include a flow diagram of a process for comparing comparison fingerprints to reference fingerprints in accordance with some embodiments.
Figure 12B:
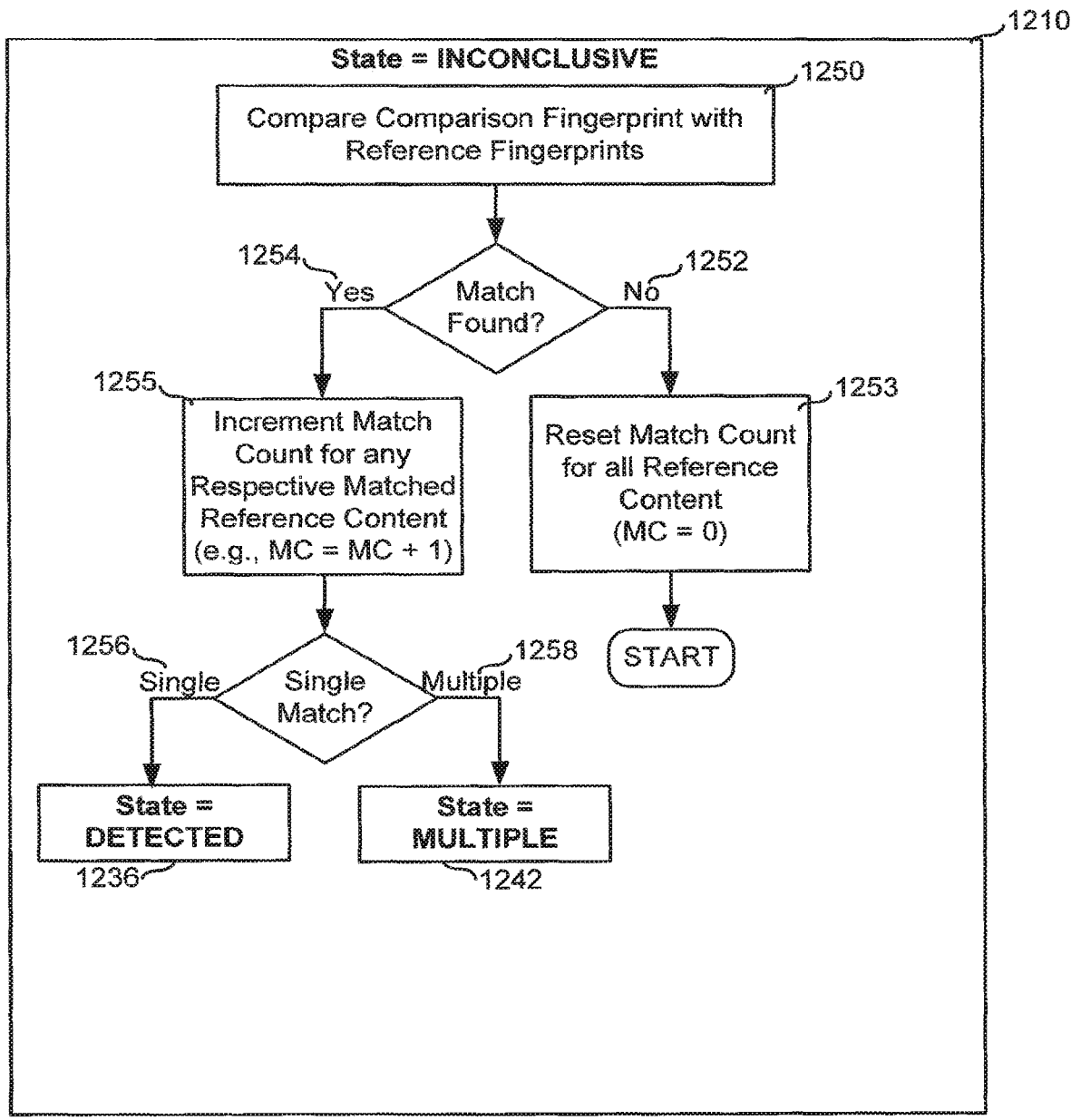
Figure 12C:
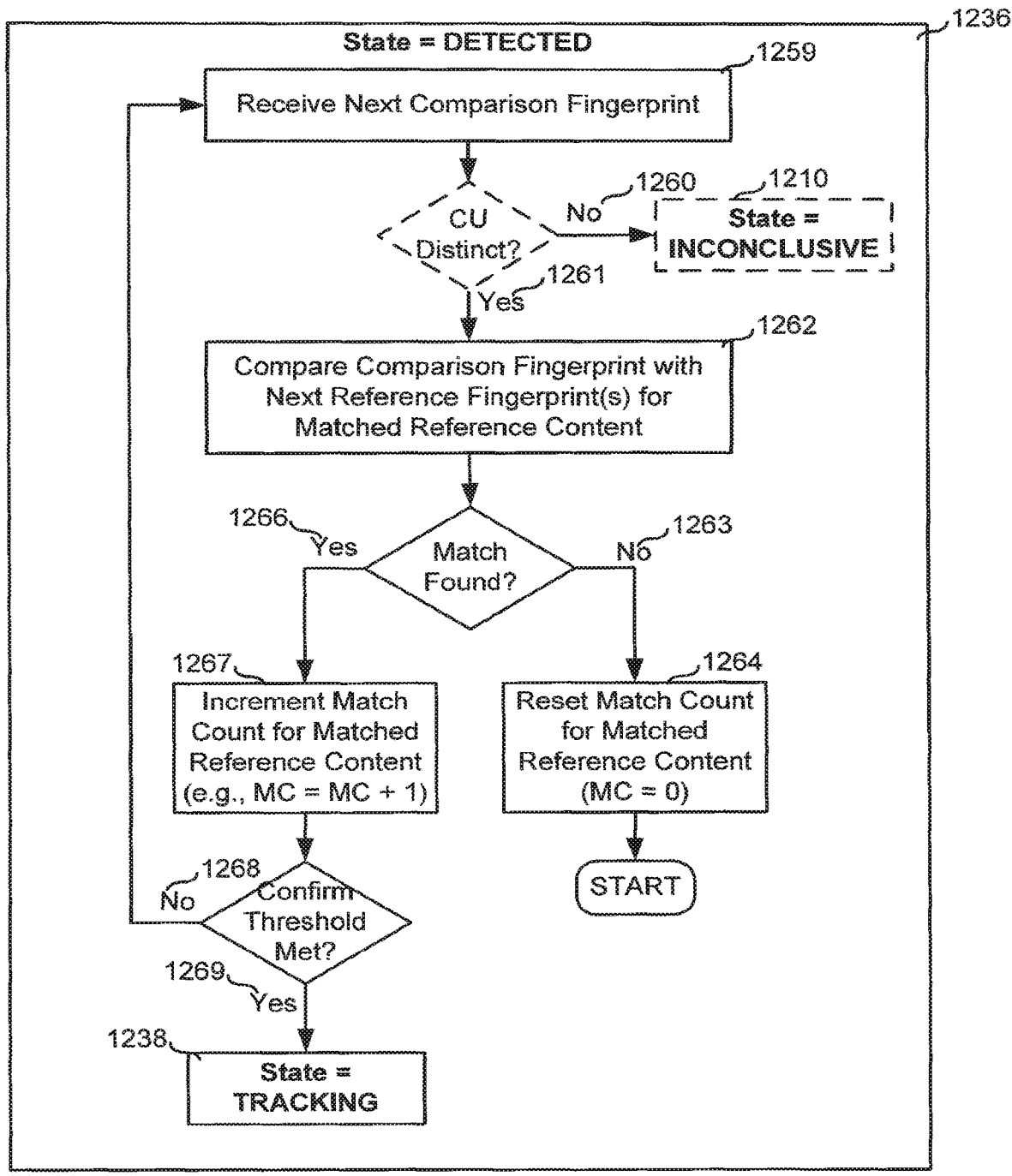
Figure 12D:
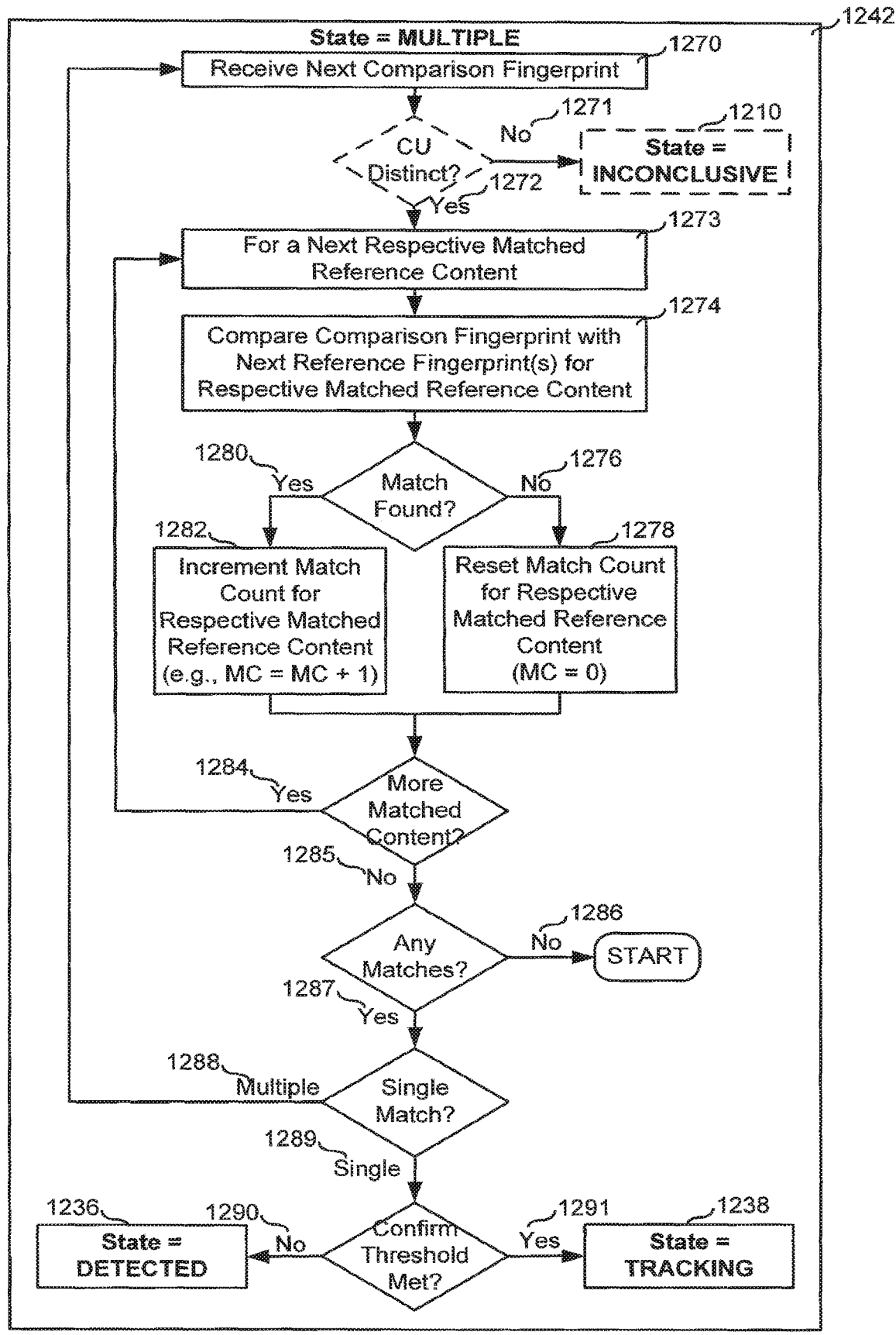
Figure 12E:
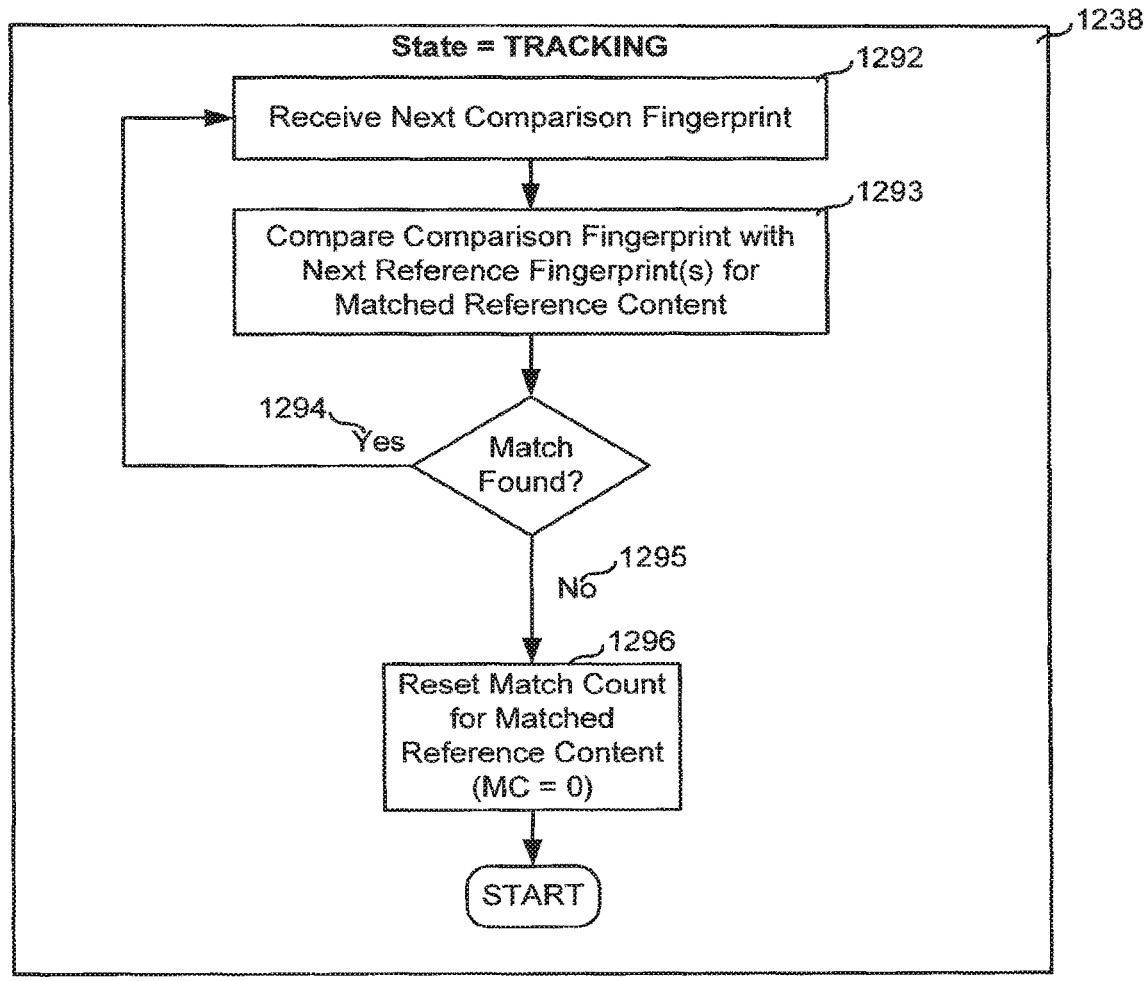

On Sheet 20 of 40, FIG. 11A, Tag 1119, Line 1, after "Subset" insert -- to --.

On Sheet 32 of 40, FIG. 13B, Tag 1324, Line 5, after "history" insert -- of --.

Figure 13A:
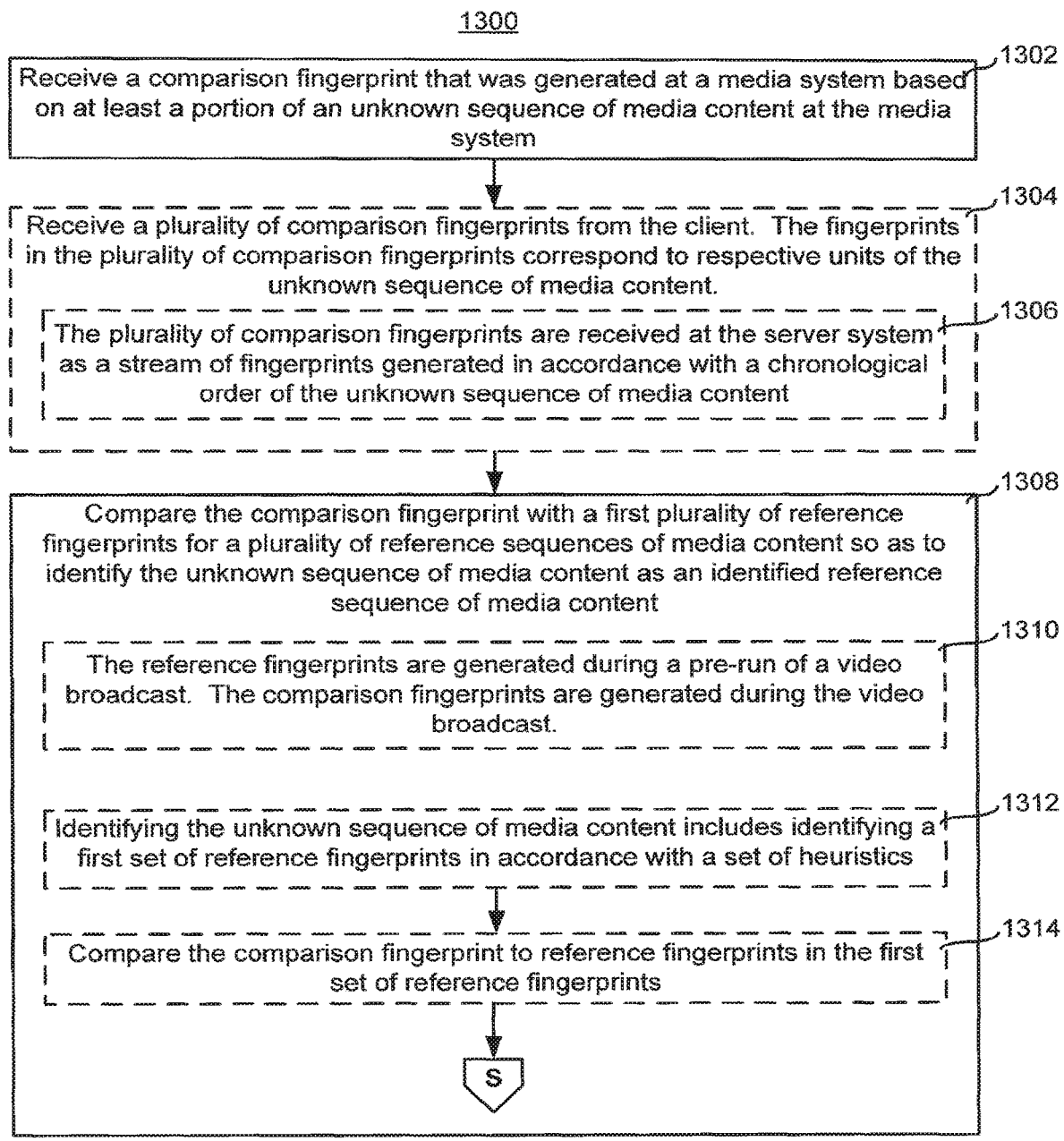
Figure 13C:
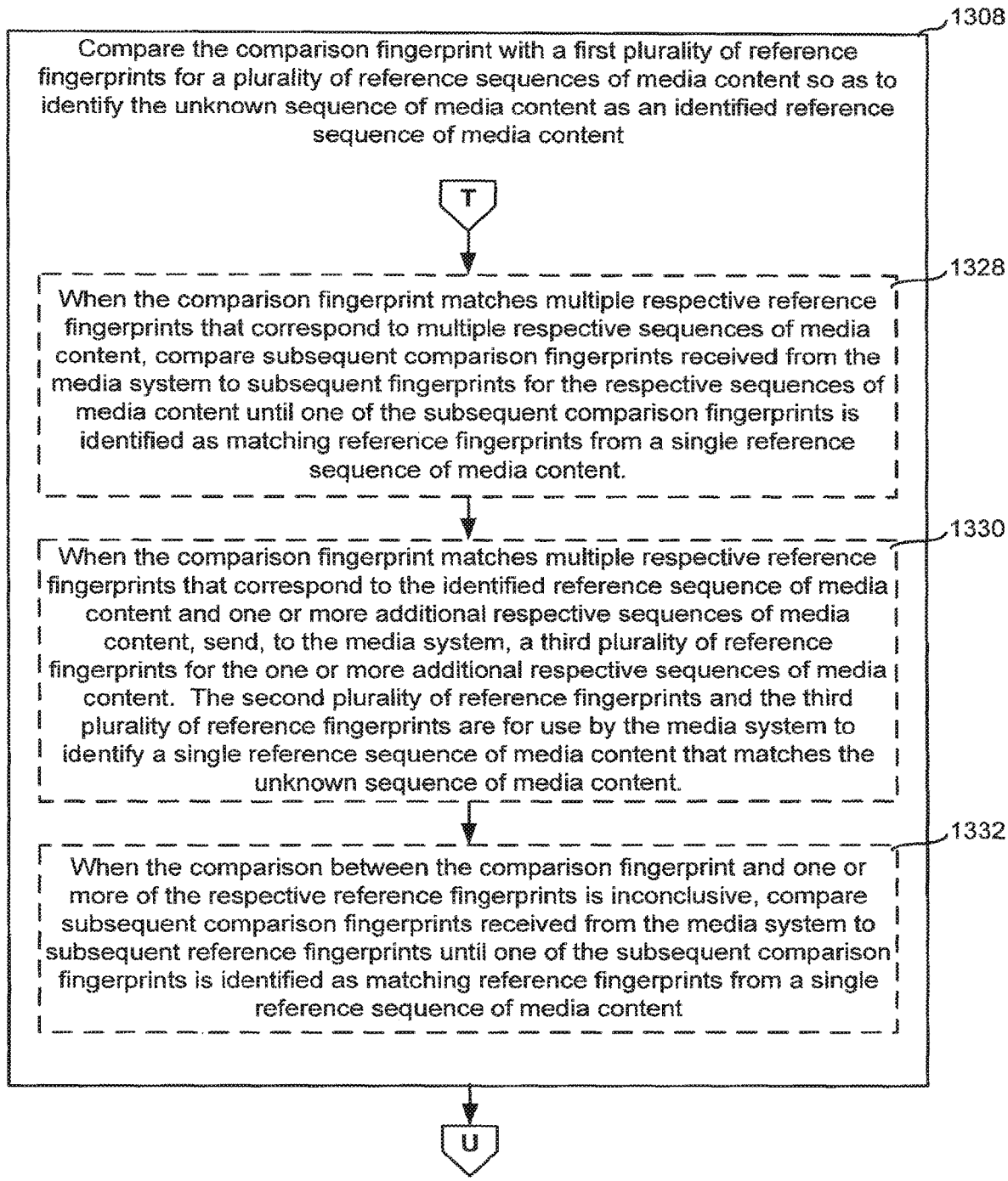
Figure 13D:
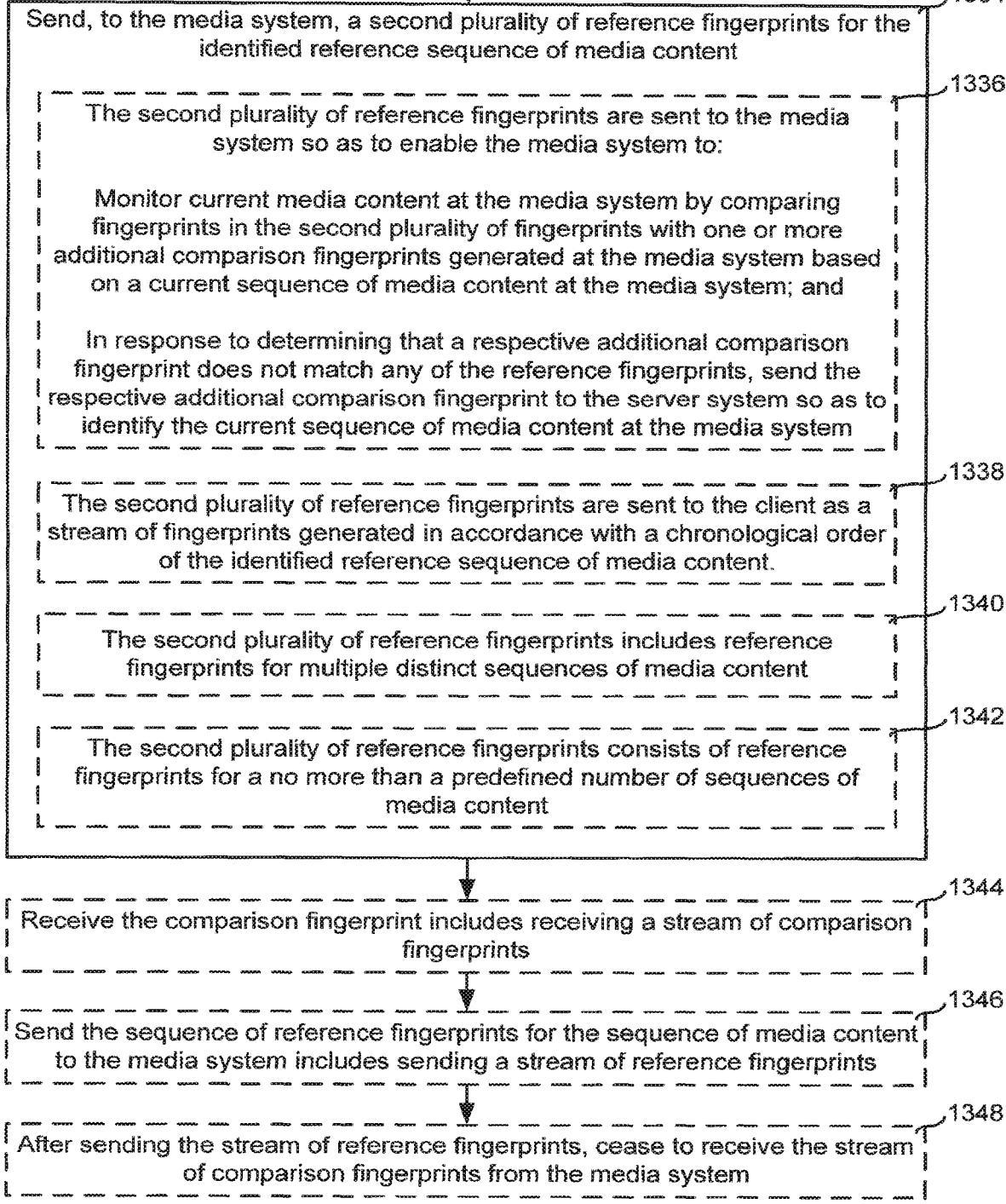

On Sheet 34 of 40, FIG. 13D, Tag 1342, Line 2, delete "a no" and insert -- no --, therefor.

Figure 14A:
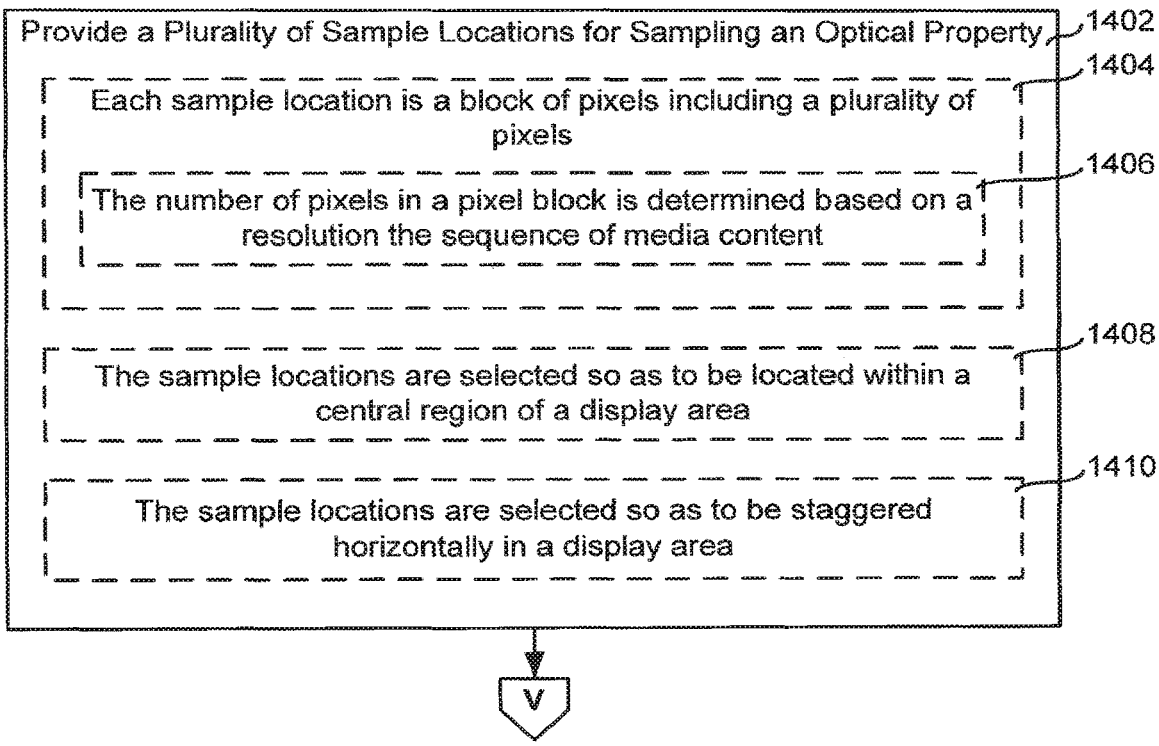
FIGS. 14A-14F include a flow diagram of a process for generating fingerprints for identifying an unknown sequence of media content in accordance with some embodiments.

On Sheet 35 of 40, FIG. 14A, Tag 1406, Line 2, after "resolution" insert -- to --.

Figure 14B:
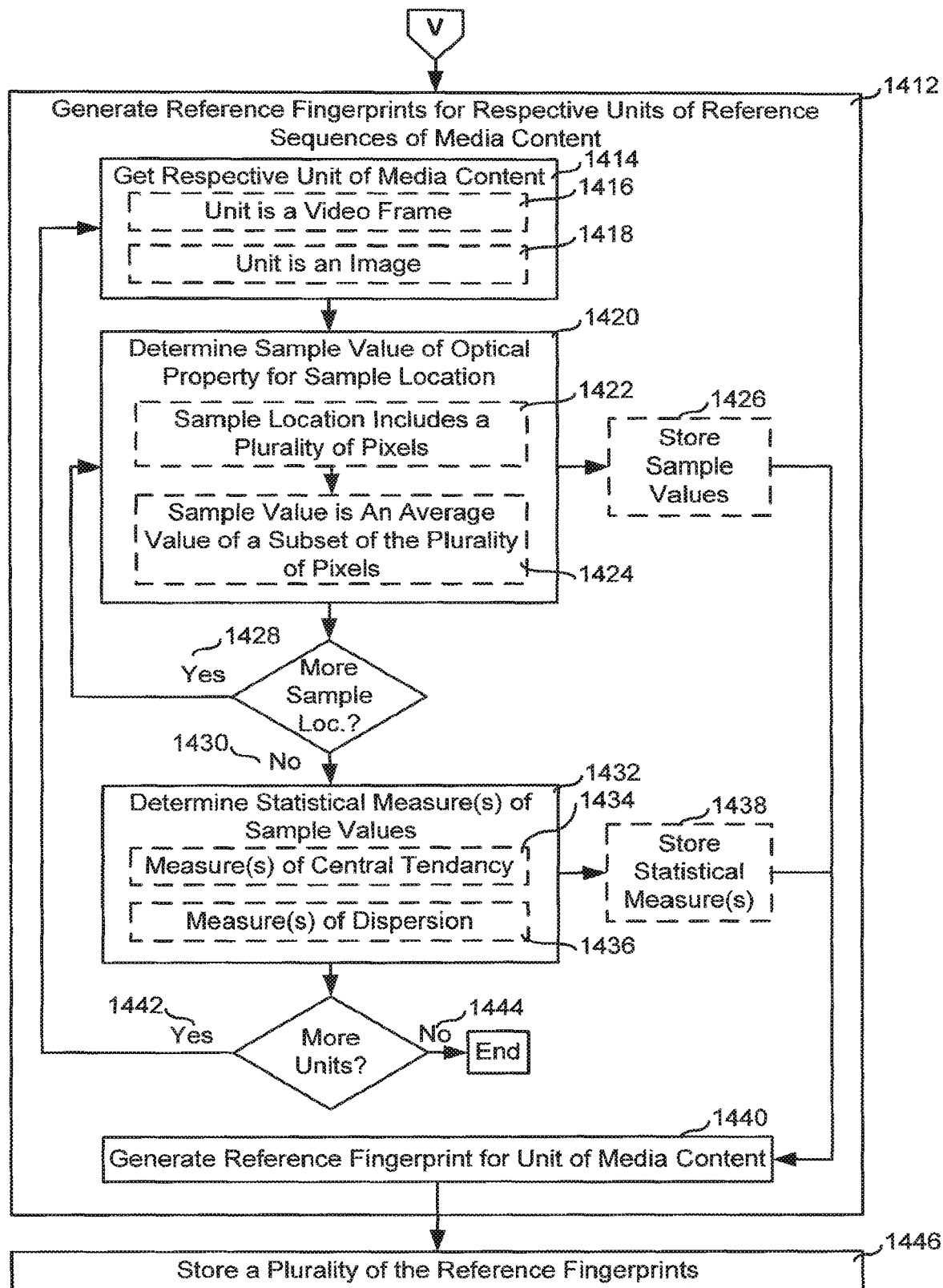
Figure 14C:
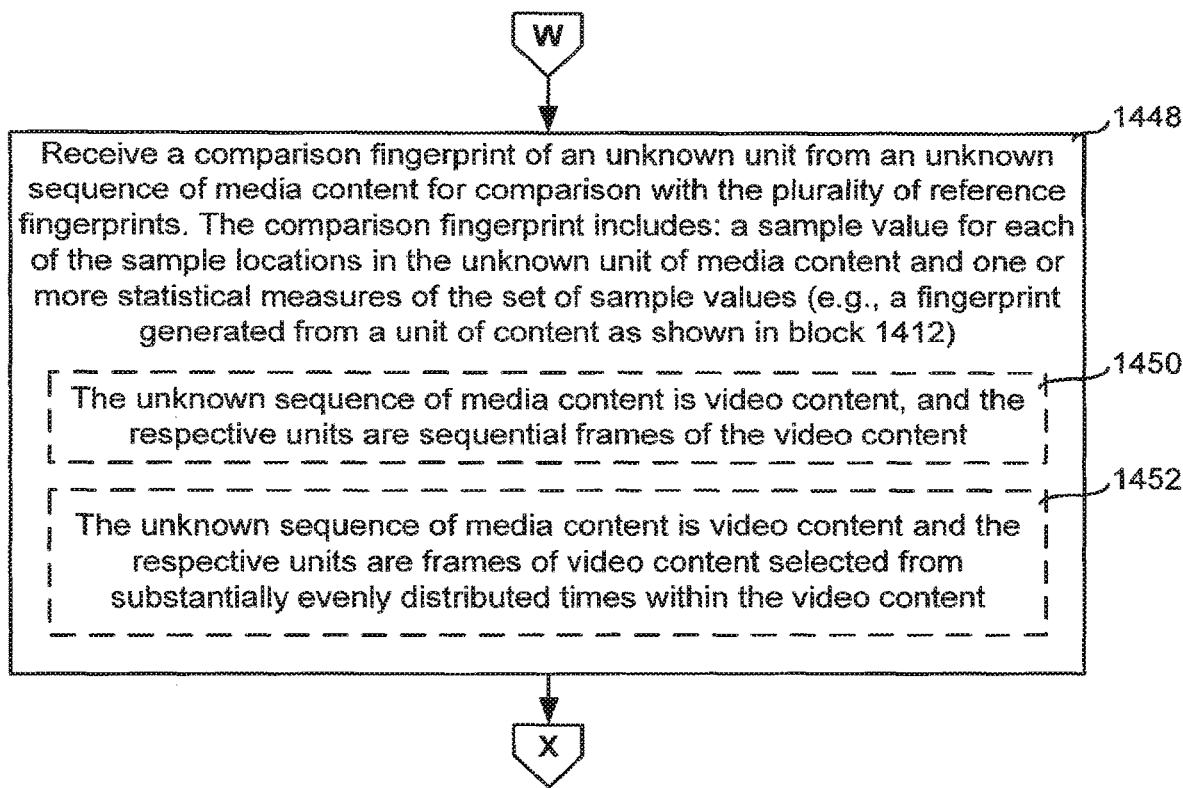
Figure 14D:
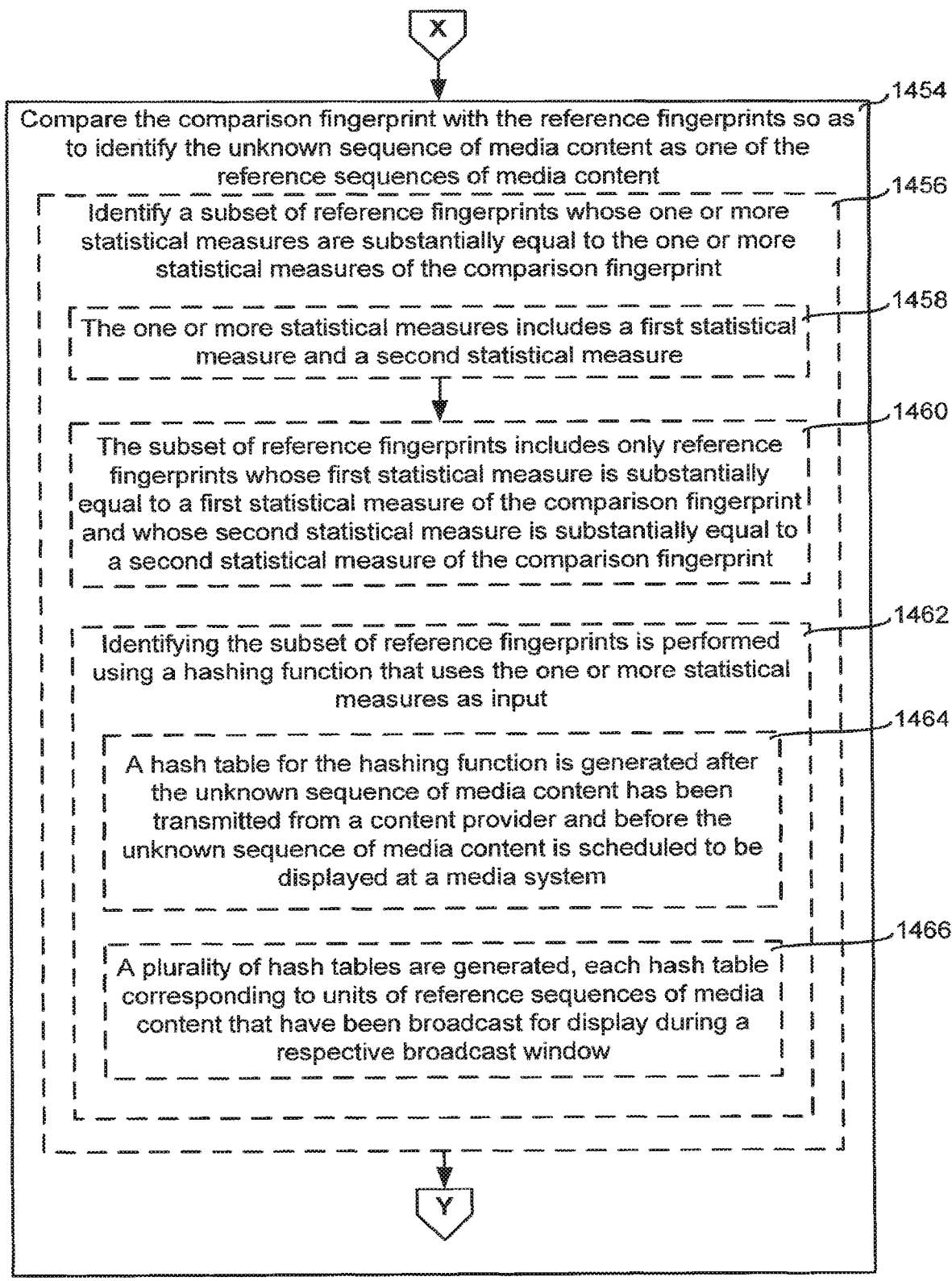
Figure 14E:
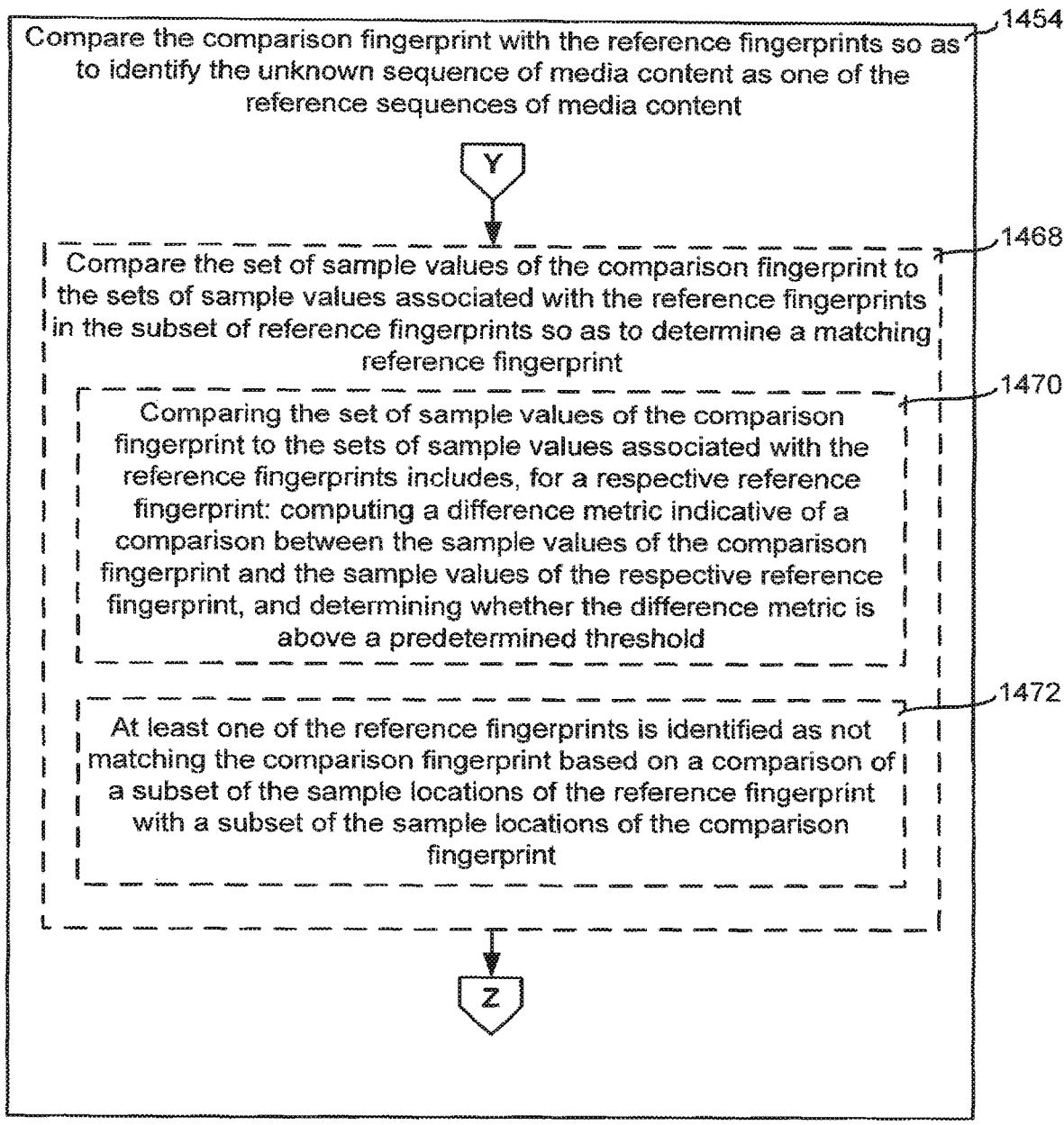
Figure 14F:
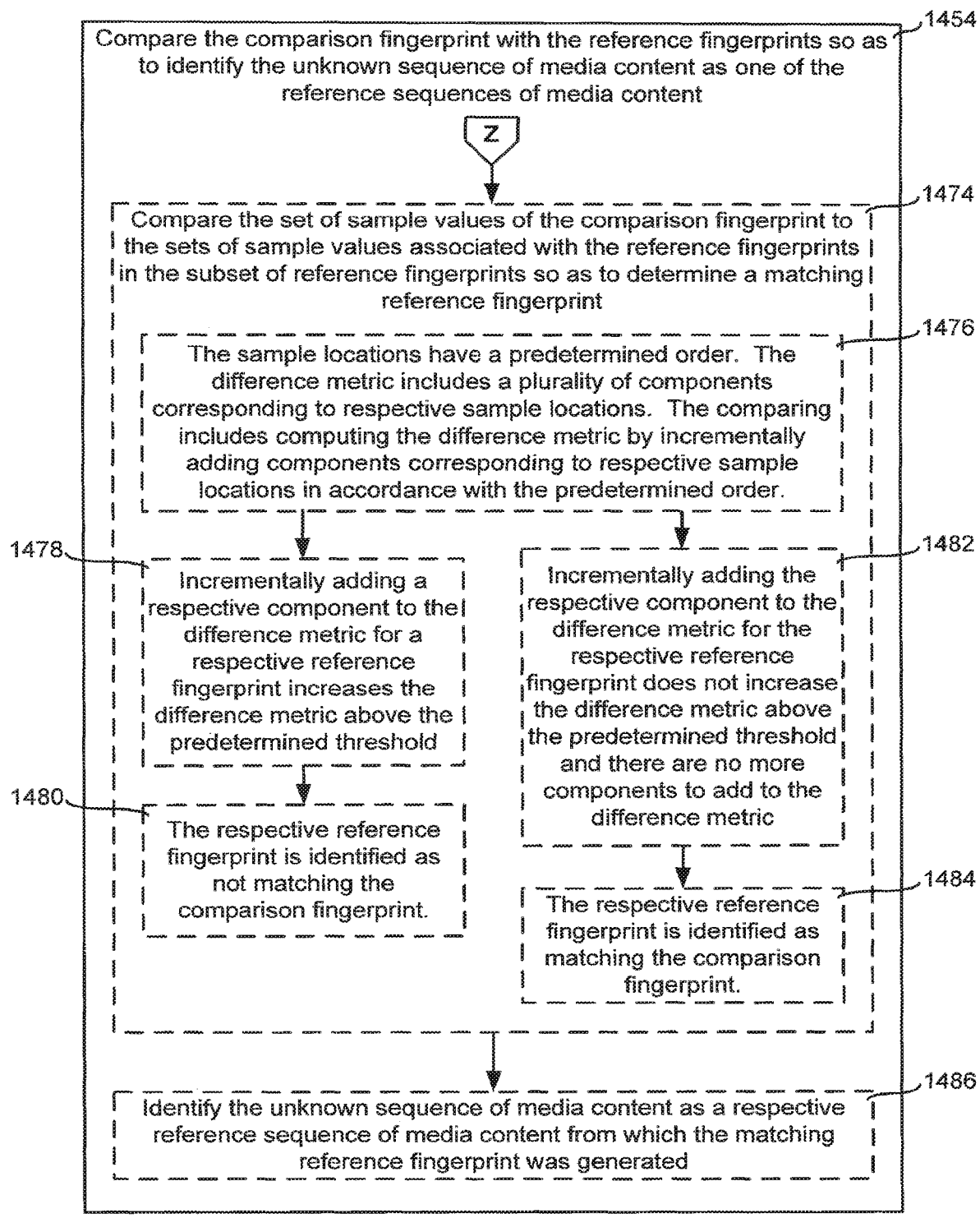

On Sheet 36 of 40, FIG. 14B, Tag 1424, Line 1, delete "An" and insert -- an --, therefor.

In the Specification

In Column 2, Line 49, delete "a at a" and insert -- a --, therefor.

In Column 3, Line 44, delete "FIG." and insert -- FIGS. --, therefor.

In Column 3, Line 54, delete "FIG." and insert -- FIGS. --, therefor.

In Column 5, Line 54, delete "104,-B," and insert -- 104-B, --, therefor.

In Column 11, Line 55, delete "flame" and insert -- frame --, therefor.

Signed and Sealed this
Twenty-eighth Day of May, 2024

Katherine Kelly Vidal
*Director of the United States Patent and Trademark Office*

CERTIFICATE OF CORRECTION (continued)
U.S. Pat. No. 11,889,155 B2

In Column 48, Line 53, delete "a" and insert -- an --, therefor.

In Column 53, Line 59, delete "realtime)" and insert -- real time) --, therefor.

In Column 59, Line 9, delete "100%," and insert -- 100% --, therefor.

In Column 70, Line 13, delete "a" and insert -- an --, therefor.